US011901663B2

(12) United States Patent
Cohen

(10) Patent No.: US 11,901,663 B2
(45) Date of Patent: *Feb. 13, 2024

(54) HIGH-FREQUENCY ELECTRICAL CONNECTOR

(71) Applicant: Amphenol Corporation, Wallingford, CT (US)

(72) Inventor: Thomas S. Cohen, New Boston, NH (US)

(73) Assignee: Amphenol Corporation, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,313

(22) Filed: Dec. 5, 2022

(65) Prior Publication Data

US 2023/0099389 A1 Mar. 30, 2023

Related U.S. Application Data

(63) Continuation of application No. 17/181,639, filed on Feb. 22, 2021, now Pat. No. 11,522,310, which is a
(Continued)

(51) Int. Cl.
*H01R 13/20* (2006.01)
*H01R 12/72* (2011.01)
(Continued)

(52) U.S. Cl.
CPC ........... *H01R 13/20* (2013.01); *H01R 12/724* (2013.01); *H01R 13/04* (2013.01); *H01R 13/11* (2013.01);
(Continued)

(58) Field of Classification Search
CPC ....................... H01R 13/6471; H01R 13/6585; H01R 13/20; H01R 13/04; H01R 13/6467; H01R 13/6588
See application file for complete search history.

(56) References Cited

U.S. PATENT DOCUMENTS 2,124,207 A 7/1938 Carl
2,996,710 A 8/1961 Pratt
(Continued)

FOREIGN PATENT DOCUMENTS

CN 1075390 A 8/1993
CN 1098549 A 2/1995
(Continued)

OTHER PUBLICATIONS

Chinese Invalidation Request dated Aug. 17, 2021 in connection with Chinese Application No. 200580040906.5.
(Continued)

*Primary Examiner* — Oscar C Jimenez
*Assistant Examiner* — Paul D Baillargeon
(74) *Attorney, Agent, or Firm* — Wolf, Greenfield & Sacks, P.C.

(57) ABSTRACT

An electrical connector with improved high frequency performance. The connector has conductive elements, forming both signal and ground conductors, that have multiple points of contact distributed along an elongated dimension. The ground conductors may be formed with multiple beams of different length. The signal conductors may be formed with multiple contact regions on a single beam, with different characteristics. Signal conductors may have beams that are jogged to provide both a desired impedance and mating contact pitch. Additionally, electromagnetic radiation, inside and/or outside the connector, may be shaped with an insert electrically connecting multiple ground structures and/or a contact feature coupling ground conductors to a stiffener. The conductive elements in different columns may be shaped differently to reduce crosstalk.

23 Claims, 12 Drawing Sheets

Related U.S. Application Data continuation of application No. 15/823,494, filed on Nov. 27, 2017, now Pat. No. 10,931,050, which is a continuation of application No. 13/973,921, filed on Aug. 22, 2013, now Pat. No. 9,831,588.

(60) Provisional application No. 61/691,901, filed on Aug. 22, 2012.

(51) Int. Cl.

| | |
|---|---|
| ***H01R 13/11*** | (2006.01) |
| ***H01R 13/6471*** | (2011.01) |
| ***H01R 13/6467*** | (2011.01) |
| ***H01R 13/6588*** | (2011.01) |
| ***H01R 13/04*** | (2006.01) |
| ***H01R 13/6585*** | (2011.01) |

(52) U.S. Cl.
CPC ..... *H01R 13/6467* (2013.01); *H01R 13/6471* (2013.01); *H01R 13/6588* (2013.01); *H01R 13/6585* (2013.01)

(56) References Cited

U.S. PATENT DOCUMENTS 3,002,162 A 9/1961 Garstang
3,007,131 A 10/1961 Dahlgren et al.
3,134,950 A 5/1964 Cook
3,229,240 A 1/1966 Harrison et al.
3,243,756 A 3/1966 Ruete et al.
3,322,885 A 5/1967 May et al.
3,390,369 A 6/1968 Zavertnik et al.
3,390,389 A 6/1968 Bluish
3,505,619 A 4/1970 Bishop
3,573,677 A 4/1971 Detar
3,594,613 A 7/1971 Prietula
3,715,706 A 2/1973 Michel et al.
3,731,259 A 5/1973 Occhipinti
3,743,978 A 7/1973 Fritz
3,745,509 A 7/1973 Woodward et al.
3,786,372 A 1/1974 Epis et al.
3,825,874 A 7/1974 Peverill
3,848,073 A 11/1974 Simons et al.
3,863,181 A 1/1975 Glance et al.
3,999,830 A 12/1976 Herrmann, Jr. et al.
4,083,615 A 4/1978 Volinskie
4,155,613 A 5/1979 Brandeau
4,157,612 A 6/1979 Rainal
4,175,821 A 11/1979 Hunter
4,195,272 A 3/1980 Boutros
4,215,910 A 8/1980 Walter
4,272,148 A 6/1981 Knack, Jr.
4,276,523 A 6/1981 Boutros et al.
4,307,926 A 12/1981 Smith
4,371,742 A 2/1983 Manly
4,408,255 A 10/1983 Adkins
4,447,105 A 5/1984 Ruehl
4,457,576 A 7/1984 Cosmos et al.
4,471,015 A 9/1984 Ebneth et al.
4,472,765 A 9/1984 Hughes
4,484,159 A 11/1984 Whitley
4,490,283 A 12/1984 Kleiner
4,518,651 A 5/1985 Wolfe, Jr.
4,519,664 A 5/1985 Tillotson
4,519,665 A 5/1985 Althouse et al.
4,571,014 A 2/1986 Robin et al.
4,605,914 A 8/1986 Harman
4,607,907 A 8/1986 Bogursky
4,615,578 A 10/1986 Stadler et al.
4,632,476 A 12/1986 Schell
4,636,752 A 1/1987 Saito
4,639,054 A 1/1987 Kersbergen
4,655,518 A 4/1987 Johnson et al.
4,674,812 A 6/1987 Thom et al.
4,678,260 A 7/1987 Gallusser et al.
4,682,129 A 7/1987 Bakermans et al.
4,686,607 A 8/1987 Johnson
4,697,862 A 10/1987 Hasircoglu
4,708,660 A 11/1987 Claeys et al.
4,724,409 A 2/1988 Lehman
4,728,762 A 3/1988 Roth et al.
4,737,598 A 4/1988 O'Connor
4,751,479 A 6/1988 Parr
4,761,147 A 8/1988 Gauthier
4,795,375 A 1/1989 Williams
4,806,107 A 2/1989 Arnold et al.
4,824,383 A 4/1989 Lemke
4,826,443 A 5/1989 Lockard
4,836,791 A 6/1989 Grabbe et al.
4,846,724 A 7/1989 Sasaki et al.
4,846,727 A 7/1989 Glover et al.
4,871,316 A 10/1989 Herrell et al.
4,876,630 A 10/1989 Dara
4,878,155 A 10/1989 Conley
4,889,500 A 12/1989 Lazar et al.
4,902,243 A 2/1990 Davis
4,913,667 A 4/1990 Muz
4,924,179 A 5/1990 Sherman
4,948,922 A 8/1990 Varadan et al.
4,949,379 A 8/1990 Cordell
4,970,354 A 11/1990 Iwasa et al.
4,971,726 A 11/1990 Maeno et al.
4,975,084 A 12/1990 Fedder et al.
4,984,992 A 1/1991 Beamenderfer et al.
4,990,099 A 2/1991 Marin et al.
4,992,060 A 2/1991 Meyer
5,000,700 A 3/1991 Masubuchi et al.
5,046,084 A 9/1991 Barrett et al.
5,046,952 A 9/1991 Cohen et al.
5,046,960 A 9/1991 Fedder
5,066,236 A 11/1991 Broeksteeg
5,135,405 A 8/1992 Fusselman et al.
5,141,454 A 8/1992 Garrett et al.
5,150,086 A 9/1992 Ito
5,166,527 A 11/1992 Solymar
5,168,252 A 12/1992 Naito
5,168,432 A 12/1992 Murphy et al.
5,176,538 A 1/1993 Hansell, III et al.
5,190,472 A 3/1993 Voltz et al.
5,197,893 A 3/1993 Morlion et al.
5,246,388 A 9/1993 Collins et al.
5,259,773 A 11/1993 Champion et al.
5,266,055 A 11/1993 Naito et al.
5,280,257 A 1/1994 Cravens et al.
5,281,762 A 1/1994 Long et al.
5,287,076 A 2/1994 Johnescu et al.
5,306,171 A 4/1994 Marshall
5,323,299 A 6/1994 Weber
5,332,979 A 7/1994 Roskewitsch et al.
5,334,050 A 8/1994 Andrews
5,335,146 A 8/1994 Stucke
5,340,334 A 8/1994 Nguyen
5,346,410 A 9/1994 Moore, Jr.
5,352,123 A 10/1994 Sample et al.
5,387,130 A 2/1995 Fedder et al.
5,402,088 A 3/1995 Pierro et al.
5,403,206 A 4/1995 McNamara et al.
5,407,622 A 4/1995 Cleveland et al.
5,429,520 A 7/1995 Morlion et al.
5,429,521 A 7/1995 Morlion et al.
5,433,617 A 7/1995 Morlion et al.
5,433,618 A 7/1995 Morlion et al.
5,435,757 A 7/1995 Fedder et al.
5,441,424 A 8/1995 Morlion et al.
5,456,619 A 10/1995 Belopolsky et al.
5,461,392 A 10/1995 Mott et al.
5,474,472 A 12/1995 Niwa et al.
5,484,310 A 1/1996 McNamara et al.
5,487,673 A 1/1996 Hurtarte
5,490,372 A 2/1996 Schlueter
5,496,183 A 3/1996 Soes et al.
5,499,935 A 3/1996 Powell
5,509,827 A 4/1996 Huppenthal et al.
5,539,148 A 7/1996 Konishi et al.

(56) References Cited

U.S. PATENT DOCUMENTS 5,551,893 A 9/1996 Johnson
5,554,038 A 9/1996 Morlion et al.
5,554,050 A 9/1996 Marpoe, Jr.
5,562,497 A 10/1996 Yagi et al.
5,564,949 A 10/1996 Wellinsky
5,571,991 A 11/1996 Highum et al.
5,597,328 A 1/1997 Mouissie
5,598,627 A 2/1997 Saka et al.
5,605,469 A 2/1997 Wellinsky et al.
5,620,340 A 4/1997 Andrews
5,632,634 A 5/1997 Soes
5,651,702 A 7/1997 Hanning et al.
5,660,551 A 8/1997 Sakurai
5,669,789 A 9/1997 Law
5,691,506 A 11/1997 Miyazaki et al.
5,702,258 A 12/1997 Provencher et al.
5,733,148 A 3/1998 Kaplan et al.
5,743,765 A 4/1998 Andrews et al.
5,755,597 A 5/1998 Panis et al.
5,781,759 A 7/1998 Kashiwabara
5,795,191 A 8/1998 Preputnick et al.
5,796,323 A 8/1998 Uchikoba et al.
5,803,768 A 9/1998 Zell et al.
5,831,491 A 11/1998 Buer et al.
5,833,486 A 11/1998 Shinozaki
5,833,496 A 11/1998 Hollander et al.
5,842,887 A 12/1998 Andrews
5,870,528 A 2/1999 Fukuda
5,885,095 A 3/1999 Cohen et al.
5,887,158 A 3/1999 Sample et al.
5,904,594 A 5/1999 Longueville et al.
5,924,899 A 7/1999 Paagman
5,931,686 A 8/1999 Sasaki et al.
5,959,591 A 9/1999 Aurand
5,961,355 A 10/1999 Morlion et al.
5,971,809 A 10/1999 Ho
5,980,321 A 11/1999 Cohen et al.
5,981,869 A 11/1999 Kroger
5,982,253 A 11/1999 Perrin et al.
5,993,259 A 11/1999 Stokoe et al.
5,997,361 A 12/1999 Driscoll et al.
6,019,616 A 2/2000 Yagi et al.
6,042,394 A 3/2000 Mitra et al.
6,053,770 A 4/2000 Blom
6,083,046 A 7/2000 Wu et al.
6,083,047 A 7/2000 Paagman
6,095,825 A 8/2000 Liao
6,095,872 A 8/2000 Lang et al.
6,102,747 A 8/2000 Paagman
6,116,926 A 9/2000 Ortega et al.
6,120,306 A 9/2000 Evans
6,123,554 A 9/2000 Ortega et al.
6,132,255 A 10/2000 Verhoeven
6,132,355 A 10/2000 Derie
6,135,824 A 10/2000 Okabe et al.
6,144,559 A 11/2000 Johnson et al.
6,146,202 A 11/2000 Ramey et al.
6,152,274 A 11/2000 Blard et al.
6,152,742 A 11/2000 Cohen et al.
6,152,747 A 11/2000 McNamara
6,163,464 A 12/2000 Ishibashi et al.
6,168,466 B1 1/2001 Chiou
6,168,469 B1 1/2001 Lu
6,171,115 B1 1/2001 Mickievicz et al.
6,171,149 B1 1/2001 van Zanten
6,174,202 B1 1/2001 Mitra
6,174,203 B1 1/2001 Asao
6,174,944 B1 1/2001 Chiba et al.
6,179,651 B1 1/2001 Huang
6,179,663 B1 1/2001 Bradley et al.
6,196,853 B1 3/2001 Harting et al.
6,203,376 B1 3/2001 Magajne et al.
6,203,396 B1 3/2001 Asmussen et al.
6,206,729 B1 3/2001 Bradley et al.
6,210,182 B1 4/2001 Elco et al.
6,210,227 B1 4/2001 Yamasaki et al.
6,217,372 B1 4/2001 Reed
6,227,875 B1 5/2001 Wu et al.
6,231,391 B1 5/2001 Ramey et al.
6,238,245 B1 5/2001 Stokoe et al.
6,267,604 B1 7/2001 Mickievicz et al.
6,273,753 B1 8/2001 Ko
6,273,758 B1 8/2001 Lloyd et al.
6,285,542 B1 9/2001 Kennedy, III et al.
6,293,827 B1 9/2001 Stokoe
6,296,496 B1 10/2001 Trammel
6,299,438 B1 10/2001 Sahagian et al.
6,299,483 B1 10/2001 Cohen et al.
6,299,484 B2 10/2001 Van Woensel
6,299,492 B1 10/2001 Pierini et al.
6,322,379 B1 11/2001 Ortega et al.
6,328,572 B1 12/2001 Higashida et al.
6,328,601 B1 12/2001 Yip et al.
6,333,468 B1 12/2001 Endoh et al.
6,343,955 B2 2/2002 Billman et al.
6,343,957 B1 2/2002 Kuo et al.
6,347,962 B1 2/2002 Kline
6,350,134 B1 2/2002 Fogg et al.
6,358,088 B1 3/2002 Nishio et al.
6,358,092 B1 3/2002 Siemon et al.
6,364,711 B1 4/2002 Berg et al.
6,364,713 B1 4/2002 Kuo
6,364,718 B1 4/2002 Polgar et al.
6,366,471 B1 4/2002 Edwards et al.
6,371,788 B1 4/2002 Bowling et al.
6,375,510 B2 4/2002 Asao
6,379,188 B1 4/2002 Cohen et al.
6,380,485 B1 4/2002 Beaman et al.
6,392,142 B1 5/2002 Uzuka et al.
6,394,839 B2 5/2002 Reed
6,396,712 B1 5/2002 Kuijk
6,398,588 B1 6/2002 Bickford
6,409,543 B1 6/2002 Astbury, Jr. et al.
6,413,119 B1 7/2002 Gabrisko, Jr. et al.
6,428,344 B1 8/2002 Reed
6,431,914 B1 8/2002 Billman
6,435,913 B1 8/2002 Billman
6,435,914 B1 8/2002 Billman
6,441,313 B1 8/2002 Novak
6,452,789 B1 9/2002 Pallotti et al.
6,454,605 B1 9/2002 Bassler et al.
6,461,202 B2 10/2002 Kline
6,471,549 B1 10/2002 Lappohn
6,478,624 B2 11/2002 Ramey et al.
6,482,017 B1 11/2002 Van Doorn
6,489,563 B1 12/2002 Zhao et al.
6,491,545 B1 12/2002 Spiegel et al.
6,503,103 B1 1/2003 Cohen et al.
6,506,076 B2 1/2003 Cohen et al.
6,517,360 B1 2/2003 Cohen
6,520,803 B1 2/2003 Dunn
6,527,587 B1 3/2003 Ortega et al.
6,528,737 B1 3/2003 Kwong et al.
6,530,790 B1 3/2003 McNamara et al.
6,533,613 B1 3/2003 Turner et al.
6,535,367 B1 3/2003 Carpenter et al.
6,537,086 B1 3/2003 Mac Mullin
6,537,087 B2 3/2003 McNamara et al.
6,538,524 B1 3/2003 Miller
6,538,899 B1 3/2003 Krishnamurthi et al.
6,540,522 B2 4/2003 Sipe
6,540,558 B1 4/2003 Paagman
6,540,559 B1 4/2003 Kemmick et al.
6,541,712 B1 4/2003 Gately et al.
6,544,072 B2 4/2003 Olson
6,544,647 B1 4/2003 Hayashi et al.
6,551,140 B2 4/2003 Billman et al.
6,554,647 B1 4/2003 Cohen et al.
6,565,387 B2 5/2003 Cohen
6,565,390 B2 5/2003 Wu
6,574,115 B2 6/2003 Asano et al.
6,575,772 B1 6/2003 Soubh et al.
6,579,116 B2 6/2003 Brennan et al.
6,582,244 B2 6/2003 Fogg et al.

(56) References Cited

U.S. PATENT DOCUMENTS

| | | | |
|---|---|---|---|
| 6,585,540 | B2 | 7/2003 | Gutierrez et al. |
| 6,592,381 | B2 | 7/2003 | Cohen et al. |
| 6,592,390 | B1 | 7/2003 | Davis et al. |
| 6,592,401 | B1 | 7/2003 | Gardner et al. |
| 6,595,802 | B1 | 7/2003 | Watanabe et al. |
| 6,602,095 | B2 | 8/2003 | Astbury, Jr. et al. |
| 6,607,402 | B2 | 8/2003 | Cohen et al. |
| 6,608,762 | B2 | 8/2003 | Patriche |
| 6,609,933 | B2 | 8/2003 | Yamasaki |
| 6,612,871 | B1 | 9/2003 | Givens |
| 6,616,482 | B2 | 9/2003 | De La Cruz et al. |
| 6,616,864 | B1 | 9/2003 | Jiang et al. |
| 6,621,373 | B1 | 9/2003 | Mullen et al. |
| 6,652,296 | B2 | 11/2003 | Kuroda et al. |
| 6,652,318 | B1 | 11/2003 | Winings et al. |
| 6,652,319 | B1 | 11/2003 | Billman |
| 6,655,966 | B2 | 12/2003 | Rothermel et al. |
| 6,663,427 | B1 | 12/2003 | Billman et al. |
| 6,663,429 | B1 | 12/2003 | Korsunsky et al. |
| 6,685,501 | B1 | 2/2004 | Wu et al. |
| 6,692,262 | B1 | 2/2004 | Loveless |
| 6,692,272 | B2 | 2/2004 | Lemke et al. |
| 6,705,893 | B1 | 3/2004 | Ko |
| 6,705,895 | B2 | 3/2004 | Hasircoglu |
| 6,706,974 | B2 | 3/2004 | Chen et al. |
| 6,709,294 | B1 | 3/2004 | Cohen et al. |
| 6,712,648 | B2 | 3/2004 | Padro et al. |
| 6,713,672 | B1 | 3/2004 | Stickney |
| 6,717,825 | B2 | 4/2004 | Volstorf |
| 6,722,897 | B1 | 4/2004 | Wu |
| 6,741,141 | B2 | 5/2004 | Kormanyos |
| 6,743,057 | B2 | 6/2004 | Davis et al. |
| 6,749,444 | B2 | 6/2004 | Murr et al. |
| 6,762,941 | B2 | 7/2004 | Roth |
| 6,764,341 | B2 | 7/2004 | Lappoehn |
| 6,776,645 | B2 | 8/2004 | Roth et al. |
| 6,776,659 | B1 | 8/2004 | Stokoe et al. |
| 6,786,771 | B2 | 9/2004 | Gailus |
| 6,792,941 | B2 | 9/2004 | Andersson |
| 6,797,891 | B1 | 9/2004 | Blair et al. |
| 6,806,109 | B2 | 10/2004 | Furuya et al. |
| 6,808,419 | B1 | 10/2004 | Korsunsky et al. |
| 6,808,420 | B2 | 10/2004 | Whiteman, Jr. et al. |
| 6,814,519 | B2 | 11/2004 | Policicchio et al. |
| 6,814,619 | B1 | 11/2004 | Stokoe et al. |
| 6,816,486 | B1 | 11/2004 | Rogers |
| 6,817,870 | B1 | 11/2004 | Kwong et al. |
| 6,823,587 | B2 | 11/2004 | Reed |
| 6,824,426 | B1 | 11/2004 | Spink, Jr. |
| 6,830,478 | B1 | 12/2004 | Ko et al. |
| 6,830,483 | B1 | 12/2004 | Wu |
| 6,830,489 | B2 | 12/2004 | Aoyama |
| 6,843,657 | B2 | 1/2005 | Driscoll et al. |
| 6,857,899 | B2 | 2/2005 | Reed et al. |
| 6,872,085 | B1 | 3/2005 | Cohen et al. |
| 6,875,031 | B1 | 4/2005 | Korsunsky et al. |
| 6,899,566 | B2 | 5/2005 | Kline et al. |
| 6,903,934 | B2 | 6/2005 | Lo et al. |
| 6,903,939 | B1 | 6/2005 | Chea, Jr. et al. |
| 6,913,490 | B2 | 7/2005 | Whiteman, Jr. et al. |
| 6,916,183 | B2 | 7/2005 | Alger et al. |
| 6,932,649 | B1 | 8/2005 | Rothermel et al. |
| 6,955,565 | B2 | 10/2005 | Lloyd et al. |
| 6,957,967 | B2 | 10/2005 | Petersen et al. |
| 6,960,103 | B2 | 11/2005 | Tokunaga |
| 6,971,887 | B1 | 12/2005 | Trobough |
| 6,971,916 | B2 | 12/2005 | Tokunaga |
| 6,979,202 | B2 | 12/2005 | Benham et al. |
| 6,979,226 | B2 | 12/2005 | Otsu et al. |
| 6,982,378 | B2 | 1/2006 | Dickson |
| 7,004,793 | B2 | 2/2006 | Scherer et al. |
| 7,021,969 | B2 | 4/2006 | Matsunaga |
| 7,044,794 | B2 | 5/2006 | Consoli et al. |
| 7,056,128 | B2 | 6/2006 | Driscoll et al. |
| 7,057,570 | B2 | 6/2006 | Irion, II et al. |
| 7,070,446 | B2 | 7/2006 | Henry et al. |
| 7,074,086 | B2 | 7/2006 | Cohen et al. |
| 7,077,658 | B1 | 7/2006 | Ashman et al. |
| 7,094,102 | B2 | 8/2006 | Cohen et al. |
| 7,108,556 | B2 | 9/2006 | Cohen et al. |
| 7,120,327 | B2 | 10/2006 | Bozso et al. |
| 7,137,849 | B2 | 11/2006 | Nagata |
| 7,148,428 | B2 | 12/2006 | Meier et al. |
| 7,163,421 | B1 | 1/2007 | Cohen et al. |
| 7,182,643 | B2 | 2/2007 | Winings et al. |
| 7,214,097 | B1 | 5/2007 | Hsu et al. |
| 7,223,915 | B2 | 5/2007 | Hackman |
| 7,229,318 | B2 | 6/2007 | Winings et al. |
| 7,234,944 | B2 | 6/2007 | Nordin et al. |
| 7,244,137 | B2 | 7/2007 | Renfro et al. |
| 7,261,591 | B2 | 8/2007 | Korsunsky et al. |
| 7,267,515 | B2 | 9/2007 | Lappohn |
| 7,270,573 | B2 | 9/2007 | Houtz |
| 7,280,372 | B2 | 10/2007 | Grundy et al. |
| 7,285,018 | B2 | 10/2007 | Kenny et al. |
| 7,303,427 | B2 | 12/2007 | Swain |
| 7,307,293 | B2 | 12/2007 | Fjelstad et al. |
| 7,309,239 | B2 | 12/2007 | Shuey et al. |
| 7,309,257 | B1 | 12/2007 | Minich |
| 7,316,585 | B2 | 1/2008 | Smith et al. |
| 7,322,855 | B2 | 1/2008 | Mongold et al. |
| 7,331,816 | B2 | 2/2008 | Krohn et al. |
| 7,331,830 | B2 | 2/2008 | Minich |
| 7,335,063 | B2 | 2/2008 | Cohen et al. |
| 7,347,721 | B2 | 3/2008 | Kameyama |
| 7,351,114 | B2 | 4/2008 | Benham et al. |
| 7,354,274 | B2 | 4/2008 | Minich |
| 7,365,269 | B2 | 4/2008 | Donazzi et al. |
| 7,371,117 | B2 | 5/2008 | Gailus |
| 7,384,275 | B2 | 6/2008 | Ngo |
| 7,390,218 | B2 | 6/2008 | Smith et al. |
| 7,390,220 | B1 | 6/2008 | Wu |
| 7,402,048 | B2 | 7/2008 | Meier et al. |
| 7,407,413 | B2 | 8/2008 | Minich |
| 7,422,483 | B2 | 9/2008 | Avery et al. |
| 7,431,608 | B2 | 10/2008 | Sakaguchi et al. |
| 7,445,471 | B1 | 11/2008 | Scherer et al. |
| 7,462,942 | B2 | 12/2008 | Tan et al. |
| 7,485,012 | B2 | 2/2009 | Daugherty et al. |
| 7,494,383 | B2 | 2/2009 | Cohen et al. |
| 7,534,142 | B2 | 5/2009 | Avery et al. |
| 7,540,781 | B2 | 6/2009 | Kenny et al. |
| 7,549,897 | B2 | 6/2009 | Fedder et al. |
| 7,554,096 | B2 | 6/2009 | Ward et al. |
| 7,581,990 | B2 | 9/2009 | Kirk et al. |
| 7,585,186 | B2 | 9/2009 | McAlonis et al. |
| 7,588,464 | B2 | 9/2009 | Kim |
| 7,588,467 | B2 | 9/2009 | Chang |
| 7,594,826 | B2 | 9/2009 | Kobayashi et al. |
| 7,604,490 | B2 | 10/2009 | Chen et al. |
| 7,604,502 | B2 | 10/2009 | Pan |
| 7,613,011 | B2 | 11/2009 | Grundy et al. |
| 7,621,779 | B2 | 11/2009 | Laurx et al. |
| 7,652,381 | B2 | 1/2010 | Grundy et al. |
| 7,654,831 | B1 | 2/2010 | Wu |
| 7,658,654 | B2 | 2/2010 | Ohyama et al. |
| 7,674,133 | B2 | 3/2010 | Fogg et al. |
| 7,686,659 | B2 | 3/2010 | Peng |
| 7,690,930 | B2 | 4/2010 | Chen et al. |
| 7,690,946 | B2 | 4/2010 | Knaub et al. |
| 7,699,644 | B2 | 4/2010 | Szczesny et al. |
| 7,699,663 | B1 | 4/2010 | Little et al. |
| 7,713,077 | B1 | 5/2010 | McGowan et al. |
| 7,719,843 | B2 | 5/2010 | Dunham |
| 7,722,401 | B2 | 5/2010 | Kirk et al. |
| 7,731,537 | B2 | 6/2010 | Amleshi et al. |
| 7,744,414 | B2 | 6/2010 | Scherer et al. |
| 7,753,731 | B2 | 7/2010 | Cohen et al. |
| 7,758,357 | B2 | 7/2010 | Pan et al. |
| 7,771,233 | B2 | 8/2010 | Gailus |
| 7,775,802 | B2 | 8/2010 | Defibaugh et al. |
| 7,789,676 | B2 | 9/2010 | Morgan et al. |
| 7,794,240 | B2 | 9/2010 | Cohen et al. |
| 7,794,278 | B2 | 9/2010 | Cohen et al. |

(56) References Cited

U.S. PATENT DOCUMENTS 7,806,729 B2 10/2010 Nguyen et al.
7,811,129 B2 10/2010 Glover et al.
7,819,675 B2 10/2010 Ko et al.
7,824,197 B1 11/2010 Westman et al.
7,828,595 B2 11/2010 Mathews
7,833,068 B2 11/2010 Bright et al.
7,857,630 B2 12/2010 Hermant et al.
7,862,344 B2 1/2011 Morgan et al.
7,871,296 B2 1/2011 Fowler et al.
7,874,873 B2 1/2011 Do et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,927,143 B2 4/2011 Helster et al.
7,967,637 B2 6/2011 Fedder et al.
7,976,318 B2 7/2011 Fedder et al.
7,985,097 B2 7/2011 Gulla
8,002,581 B1 8/2011 Whiteman, Jr. et al.
8,016,616 B2 9/2011 Glover et al.
8,018,733 B2 9/2011 Jia
8,036,500 B2 10/2011 McColloch
8,057,267 B2 11/2011 Johnescu
8,083,553 B2 12/2011 Manter et al.
8,100,699 B1 1/2012 Costello
8,157,573 B2 4/2012 Tanaka
8,162,675 B2 4/2012 Regnier et al.
8,167,631 B2 5/2012 Ito et al.
8,167,651 B2 5/2012 Glover et al.
8,182,289 B2 5/2012 Stokoe et al.
8,192,222 B2 6/2012 Kameyama
8,197,285 B2 6/2012 Farmer
8,210,877 B2 7/2012 Droesbeke
8,215,968 B2 7/2012 Cartier et al.
8,216,001 B2 7/2012 Kirk
8,226,441 B2 7/2012 Regnier et al.
8,251,745 B2 8/2012 Johnescu
8,267,721 B2 9/2012 Minich
8,272,877 B2 9/2012 Stokoe et al.
8,308,491 B2 11/2012 Nichols et al.
8,308,512 B2 11/2012 Ritter et al.
8,328,565 B2 12/2012 Westman et al.
8,337,243 B2 12/2012 Elkhatib et al.
8,338,713 B2 12/2012 Fjelstad et al.
8,348,701 B1 1/2013 Lan et al.
8,371,875 B2 2/2013 Gailus
8,371,876 B2 2/2013 Davis
8,382,524 B2 2/2013 Khilchenko et al.
8,398,433 B1 3/2013 Yang
8,419,472 B1 4/2013 Swanger et al.
8,439,704 B2 5/2013 Reed
8,449,312 B2 5/2013 Lang et al.
8,449,330 B1 5/2013 Schroll et al.
8,465,302 B2 6/2013 Regnier et al.
8,469,745 B2 6/2013 Davis et al.
8,475,209 B1 7/2013 Whiteman, Jr. et al.
8,535,065 B2 9/2013 Costello
8,540,525 B2 9/2013 Regnier et al.
8,545,240 B2 10/2013 Casher et al.
8,550,861 B2 10/2013 Cohen et al.
8,553,102 B2 10/2013 Yamada
8,556,657 B1 10/2013 Nichols
8,588,561 B2 11/2013 Zbinden et al.
8,588,562 B2 11/2013 Zbinden et al.
8,597,055 B2 12/2013 Regnier et al.
8,657,627 B2 2/2014 McNamara et al.
8,662,924 B2 3/2014 Davis et al.
8,672,707 B2 3/2014 Nichols et al.
8,678,860 B2 3/2014 Minich et al.
8,690,604 B2 4/2014 Davis
8,715,003 B2 5/2014 Buck et al.
8,715,005 B2 5/2014 Pan
8,740,644 B2 6/2014 Long
8,753,145 B2 6/2014 Lang et al.
8,758,051 B2 6/2014 Nonen et al.
8,764,460 B2 7/2014 Smink et al.
8,764,488 B2 7/2014 Zeng
8,771,016 B2 7/2014 Atkinson et al.
8,787,711 B2 7/2014 Zbinden et al.
8,804,342 B2 8/2014 Behziz et al.
8,814,595 B2 8/2014 Cohen et al.
8,845,364 B2 9/2014 Wanha et al.
8,864,521 B2 10/2014 Atkinson et al.
8,888,531 B2 11/2014 Jeon
8,888,533 B2 11/2014 Westman et al.
8,911,255 B2 12/2014 Scherer et al.
8,926,377 B2 1/2015 Kirk et al.
8,944,831 B2 2/2015 Stoner et al.
8,944,863 B1 2/2015 Yang
8,992,236 B2 3/2015 Wittig et al.
8,992,237 B2 3/2015 Regnier et al.
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,035,183 B2 5/2015 Kodama et al.
9,040,824 B2 5/2015 Guetig et al.
9,065,230 B2 6/2015 Milbrand, Jr.
9,071,001 B2 6/2015 Scherer et al.
9,077,115 B2 7/2015 Yang
9,083,130 B2 7/2015 Casher et al.
9,118,151 B2 8/2015 Tran et al.
9,119,292 B2 8/2015 Gundel
9,124,009 B2 9/2015 Atkinson et al.
9,142,896 B2 9/2015 Wickes et al.
9,142,921 B2 9/2015 Wanha et al.
9,166,317 B2 10/2015 Briant et al.
9,203,171 B2 12/2015 Yu et al.
9,214,768 B2 12/2015 Pao et al.
9,219,335 B2 12/2015 Atkinson et al.
9,225,083 B2 12/2015 Krenceski et al.
9,225,085 B2 12/2015 Cartier, Jr. et al.
9,232,676 B2 1/2016 Sechrist et al.
9,246,251 B2 1/2016 Regnier et al.
9,257,778 B2 2/2016 Buck et al.
9,257,794 B2 2/2016 Wanha et al.
9,300,074 B2 3/2016 Gailus
9,312,618 B2 4/2016 Regnier et al.
9,350,108 B2 5/2016 Long
9,356,401 B1 5/2016 Horning et al.
9,362,678 B2 6/2016 Wanha et al.
9,373,917 B2 6/2016 Sypolt et al.
9,374,165 B2 6/2016 Zbinden et al.
9,385,455 B2 7/2016 Regnier et al.
9,391,407 B1 7/2016 Bucher et al.
9,401,570 B2 7/2016 Phillips et al.
9,413,112 B2 8/2016 Helster et al.
9,450,344 B2 9/2016 Cartier, Jr. et al.
9,461,378 B1 10/2016 Chen
9,484,674 B2 11/2016 Cartier, Jr. et al.
9,490,558 B2 11/2016 Wanha et al.
9,490,585 B2 11/2016 Yang
9,490,587 B1 11/2016 Phillips et al.
9,509,101 B2 11/2016 Cartier, Jr. et al.
9,520,689 B2 12/2016 Cartier, Jr. et al.
9,531,133 B1 12/2016 Horning et al.
9,553,381 B2 1/2017 Regnier
9,559,446 B1 1/2017 Wetzel et al.
9,564,696 B2 2/2017 Gulla
9,608,348 B2 3/2017 Wanha et al.
9,634,432 B2 4/2017 Su et al.
9,651,752 B2 5/2017 Zbinden et al.
9,660,364 B2 5/2017 Wig et al.
9,666,961 B2 5/2017 Horning et al.
9,685,736 B2 6/2017 Gailus et al.
9,692,183 B2 6/2017 Phillips
9,692,188 B2 6/2017 Godana et al.
9,705,218 B2 7/2017 Ito
9,705,255 B2 7/2017 Atkinson et al.
9,728,903 B2 8/2017 Long et al.
9,742,132 B1 8/2017 Hsueh
9,748,698 B1 8/2017 Morgan et al.

(56) References Cited

U.S. PATENT DOCUMENTS 9,774,144 B2 9/2017 Cartier, Jr. et al.
9,801,301 B1 10/2017 Costello
9,831,588 B2 * 11/2017 Cohen .................. H01R 12/724
9,841,572 B2 12/2017 Zbinden et al.
9,843,135 B2 12/2017 Guetig et al.
9,876,319 B2 1/2018 Zhao et al.
9,899,774 B2 2/2018 Gailus
9,923,309 B1 3/2018 Aizawa et al.
9,929,512 B1 3/2018 Trout et al.
9,972,945 B1 5/2018 Huang et al.
9,979,136 B1 5/2018 Wu et al.
9,985,367 B2 5/2018 Wanha et al.
9,985,389 B1 5/2018 Morgan et al.
10,038,284 B2 7/2018 Krenceski et al.
10,056,706 B2 8/2018 Wanha et al.
10,062,984 B2 8/2018 Regnier
10,069,225 B2 9/2018 Wanha et al.
10,096,921 B2 10/2018 Johnescu et al.
10,096,945 B2 10/2018 Cartier, Jr. et al.
10,122,129 B2 11/2018 Milbrand, Jr. et al.
10,148,025 B1 12/2018 Trout et al.
10,170,869 B2 1/2019 Gailus et al.
10,181,663 B2 1/2019 Regnier
10,186,814 B2 1/2019 Khilchenko et al.
10,205,286 B2 2/2019 Provencher et al.
10,211,577 B2 2/2019 Milbrand, Jr. et al.
10,243,304 B2 3/2019 Kirk et al.
RE47,342 E 4/2019 Lloyd et al.
10,270,191 B1 4/2019 Li et al.
10,283,910 B1 5/2019 Chen et al.
10,283,914 B1 5/2019 Morgan et al.
10,305,224 B2 5/2019 Girard, Jr.
10,348,040 B2 7/2019 Cartier, Jr. et al.
10,355,416 B1 7/2019 Pickel et al.
10,381,767 B1 8/2019 Milbrand, Jr. et al.
10,431,936 B2 10/2019 Horning et al.
10,446,983 B2 10/2019 Krenceski et al.
10,511,128 B2 12/2019 Kirk et al.
10,601,181 B2 3/2020 Lu et al.
10,651,603 B2 5/2020 Kurudamannil et al.
10,720,735 B2 7/2020 Provencher et al.
RE48,230 E 9/2020 Lloyd et al.
10,777,921 B2 9/2020 Lu et al.
10,797,417 B2 10/2020 Scholeno et al.
10,847,936 B2 11/2020 Tang et al.
10,916,894 B2 2/2021 Kirk et al.
10,931,050 B2 2/2021 Cohen
10,931,062 B2 2/2021 Cohen et al.
10,938,162 B2 3/2021 Lin
10,965,063 B2 3/2021 Krenceski et al.
11,189,971 B2 11/2021 Lu
11,251,558 B1 2/2022 Lee
11,381,039 B2 7/2022 Hsiao et al.
11,469,553 B2 10/2022 Johnescu et al.
11,469,554 B2 10/2022 Ellison et al.
11,522,310 B2 12/2022 Cohen
11,539,171 B2 12/2022 Kirk et al.
11,600,950 B2 3/2023 Takai et al.
2001/0012730 A1 8/2001 Ramey et al.
2001/0041477 A1 11/2001 Billman et al.
2001/0042632 A1 11/2001 Manov et al.
2001/0046810 A1 11/2001 Cohen et al.
2002/0042223 A1 4/2002 Belopolsky et al.
2002/0086582 A1 7/2002 Nitta et al.
2002/0088628 A1 7/2002 Chen
2002/0089464 A1 7/2002 Joshi
2002/0098738 A1 7/2002 Astbury et al.
2002/0102885 A1 8/2002 Kline
2002/0111068 A1 8/2002 Cohen et al.
2002/0111069 A1 8/2002 Astbury et al.
2002/0115335 A1 8/2002 Saito
2002/0123266 A1 9/2002 Ramey et al.
2002/0136506 A1 9/2002 Asada et al.
2002/0146926 A1 10/2002 Fogg et al.
2002/0157865 A1 10/2002 Noda
2002/0168898 A1 11/2002 Billman et al.
2002/0172469 A1 11/2002 Benner et al.
2002/0181215 A1 12/2002 Guenthner
2002/0187688 A1 12/2002 Marvin et al.
2002/0192988 A1 12/2002 Droesbeke et al.
2003/0003803 A1 1/2003 Billman et al.
2003/0008561 A1 1/2003 Lappoehn
2003/0008562 A1 1/2003 Yamasaki
2003/0022555 A1 1/2003 Vicich et al.
2003/0027439 A1 2/2003 Johnescu et al.
2003/0073331 A1 4/2003 Peloza et al.
2003/0109174 A1 6/2003 Korsunsky et al.
2003/0119362 A1 6/2003 Nelson et al.
2003/0143894 A1 7/2003 Kline et al.
2003/0147227 A1 8/2003 Egitto et al.
2003/0162441 A1 8/2003 Nelson et al.
2003/0220018 A1 11/2003 Winings et al.
2003/0220021 A1 11/2003 Whiteman et al.
2004/0001299 A1 1/2004 van Haaster et al.
2004/0005815 A1 1/2004 Mizumura et al.
2004/0018757 A1 1/2004 Lang et al.
2004/0020674 A1 2/2004 McFadden et al.
2004/0043661 A1 3/2004 Okada et al.
2004/0072473 A1 4/2004 Wu
2004/0094328 A1 5/2004 Fjelstad et al.
2004/0097112 A1 5/2004 Minich et al.
2004/0110421 A1 6/2004 Broman et al.
2004/0115968 A1 6/2004 Cohen
2004/0121633 A1 6/2004 David et al.
2004/0121652 A1 6/2004 Gailus
2004/0155328 A1 8/2004 Kline
2004/0171305 A1 9/2004 McGowan et al.
2004/0196112 A1 10/2004 Welbon et al.
2004/0224559 A1 11/2004 Nelson et al.
2004/0229510 A1 11/2004 Lloyd et al.
2004/0235352 A1 11/2004 Takemasa
2004/0259419 A1 12/2004 Payne et al.
2004/0264894 A1 12/2004 Cooke et al.
2005/0006119 A1 1/2005 Cunningham et al.
2005/0006126 A1 1/2005 Aisenbrey
2005/0020135 A1 1/2005 Whiteman et al.
2005/0032430 A1 2/2005 Otsu et al.
2005/0039331 A1 2/2005 Smith
2005/0048838 A1 3/2005 Korsunsky et al.
2005/0048842 A1 3/2005 Benham et al.
2005/0070160 A1 3/2005 Cohen et al.
2005/0090299 A1 4/2005 Tsao et al.
2005/0093127 A1 5/2005 Fjelstad et al.
2005/0118869 A1 6/2005 Evans
2005/0133245 A1 6/2005 Katsuyama et al.
2005/0142944 A1 6/2005 Ling et al.
2005/0148239 A1 7/2005 Hull et al.
2005/0176300 A1 8/2005 Hsu et al.
2005/0176835 A1 8/2005 Kobayashi et al.
2005/0215121 A1 9/2005 Tokunaga
2005/0233610 A1 10/2005 Tutt et al.
2005/0239339 A1 10/2005 Pepe
2005/0277315 A1 12/2005 Mongold et al.
2005/0283974 A1 12/2005 Richard et al.
2005/0287869 A1 12/2005 Kenny et al.
2006/0001163 A1 1/2006 Kolbehdari et al.
2006/0009080 A1 1/2006 Regnier et al.
2006/0019517 A1 1/2006 Raistrick et al.
2006/0019538 A1 1/2006 Davis et al.
2006/0024983 A1 2/2006 Cohen et al.
2006/0024984 A1 2/2006 Cohen et al.
2006/0068640 A1 3/2006 Gailus
2006/0073709 A1 4/2006 Reid
2006/0079119 A1 4/2006 Wu
2006/0091507 A1 5/2006 Fjelstad et al.
2006/0104010 A1 5/2006 Donazzi et al.
2006/0110977 A1 5/2006 Matthews
2006/0141866 A1 6/2006 Shiu
2006/0166551 A1 7/2006 Korsunsky et al.
2006/0216969 A1 9/2006 Bright et al.
2006/0228922 A1 10/2006 Morriss
2006/0255876 A1 11/2006 Kushta et al.
2006/0292932 A1 12/2006 Benham et al.
2007/0004282 A1 1/2007 Cohen et al.

(56) References Cited

U.S. PATENT DOCUMENTS

2007/0004828 A1 1/2007 Khabbaz
2007/0021000 A1 1/2007 Laurx
2007/0021001 A1 1/2007 Laurx et al.
2007/0021002 A1 1/2007 Laurx et al.
2007/0021003 A1 1/2007 Laurx et al.
2007/0021004 A1 1/2007 Laurx et al.
2007/0032104 A1 2/2007 Yamada et al.
2007/0037419 A1 2/2007 Sparrowhawk
2007/0042639 A1 2/2007 Manter et al.
2007/0054554 A1 3/2007 Do et al.
2007/0059961 A1 3/2007 Cartier et al.
2007/0111597 A1 5/2007 Kondou et al.
2007/0141872 A1 6/2007 Szczesny et al.
2007/0155241 A1 7/2007 Lappohn
2007/0197095 A1 8/2007 Feldman et al.
2007/0207641 A1 9/2007 Minich
2007/0218765 A1 9/2007 Cohen et al.
2007/0243741 A1 10/2007 Yang
2007/0254517 A1 11/2007 Olson et al.
2007/0275583 A1 11/2007 McNutt et al.
2008/0026638 A1 1/2008 Cohen et al.
2008/0050968 A1 2/2008 Chang
2008/0194146 A1 8/2008 Gailus
2008/0200955 A1 8/2008 Tepic
2008/0207023 A1 8/2008 Tuin et al.
2008/0246555 A1 10/2008 Kirk et al.
2008/0248658 A1 10/2008 Cohen et al.
2008/0248659 A1 10/2008 Cohen et al.
2008/0248660 A1 10/2008 Kirk et al.
2008/0264673 A1 10/2008 Chi et al.
2008/0267620 A1 10/2008 Cole et al.
2008/0297988 A1 12/2008 Chau
2008/0305689 A1 12/2008 Zhang et al.
2008/0318455 A1 12/2008 Beaman et al.
2009/0011641 A1 1/2009 Cohen et al.
2009/0011643 A1 1/2009 Amleshi et al.
2009/0011645 A1 1/2009 Laurx et al.
2009/0011664 A1 1/2009 Laurx et al.
2009/0017682 A1 1/2009 Amleshi et al.
2009/0023330 A1 1/2009 Stoner et al.
2009/0029602 A1 1/2009 Cohen et al.
2009/0035955 A1 2/2009 McNamara
2009/0051558 A1 2/2009 Dorval
2009/0061661 A1 3/2009 Shuey et al.
2009/0098767 A1 4/2009 Long
2009/0117386 A1 5/2009 Vacanti et al.
2009/0124101 A1 5/2009 Minich et al.
2009/0130913 A1 5/2009 Yi et al.
2009/0130918 A1 5/2009 Nguyen et al.
2009/0149045 A1 6/2009 Chen et al.
2009/0166082 A1 7/2009 Liu et al.
2009/0176400 A1 7/2009 Davis et al.
2009/0203259 A1 8/2009 Nguyen et al.
2009/0205194 A1 8/2009 Semba et al.
2009/0215309 A1 8/2009 Mongold et al.
2009/0227141 A1 9/2009 Pan
2009/0239395 A1 9/2009 Cohen et al.
2009/0247012 A1 10/2009 Pan
2009/0258516 A1 10/2009 Hiew et al.
2009/0291593 A1 11/2009 Atkinson et al.
2009/0305530 A1 12/2009 Ito et al.
2009/0305533 A1 12/2009 Feldman et al.
2009/0305553 A1 12/2009 Thomas et al.
2009/0311908 A1 12/2009 Fogg et al.
2010/0009571 A1 1/2010 Scherer et al.
2010/0048058 A1 2/2010 Morgan et al.
2010/0081302 A1 4/2010 Atkinson et al.
2010/0099299 A1 4/2010 Moriyama et al.
2010/0112850 A1 5/2010 Rao et al.
2010/0144167 A1 6/2010 Fedder et al.
2010/0144168 A1 6/2010 Glover et al.
2010/0144175 A1 6/2010 Helster et al.
2010/0144201 A1 6/2010 Defibaugh et al.
2010/0144203 A1 6/2010 Glover et al.
2010/0144204 A1 6/2010 Knaub et al.
2010/0177489 A1 7/2010 Yagisawa
2010/0183141 A1 7/2010 Arai et al.
2010/0203768 A1 8/2010 Kondo et al.
2010/0221951 A1 9/2010 Pepe et al.
2010/0273359 A1 10/2010 Walker et al.
2010/0291806 A1 11/2010 Minich et al.
2010/0294530 A1 11/2010 Atkinson et al.
2011/0003509 A1 1/2011 Gailus
2011/0067237 A1* 3/2011 Cohen .................... H01R 13/28 29/857
2011/0074213 A1 3/2011 Schaffer et al.
2011/0104948 A1 5/2011 Girard, Jr. et al.
2011/0130038 A1 6/2011 Cohen et al.
2011/0177699 A1 7/2011 Crofoot et al.
2011/0212632 A1 9/2011 Stokoe et al.
2011/0212633 A1 9/2011 Regnier et al.
2011/0212649 A1 9/2011 Stokoe et al.
2011/0212650 A1 9/2011 Amleshi et al.
2011/0223807 A1 9/2011 Jeon et al.
2011/0230095 A1 9/2011 Atkinson et al.
2011/0230096 A1 9/2011 Atkinson et al.
2011/0230104 A1 9/2011 Lang et al.
2011/0256739 A1 10/2011 Toshiyuki et al.
2011/0263156 A1 10/2011 Ko
2011/0287663 A1 11/2011 Gailus et al.
2011/0300757 A1 12/2011 Regnier et al.
2012/0003848 A1 1/2012 Casher et al.
2012/0034820 A1 2/2012 Lang et al.
2012/0077369 A1 3/2012 Andersen
2012/0077380 A1 3/2012 Minich et al.
2012/0094536 A1 4/2012 Khilchenko et al.
2012/0115371 A1 5/2012 Chuang et al.
2012/0135643 A1 5/2012 Lange et al.
2012/0156929 A1 6/2012 Manter et al.
2012/0184136 A1 7/2012 Ritter
2012/0184154 A1 7/2012 Frank et al.
2012/0202363 A1 8/2012 McNamara et al.
2012/0202386 A1 8/2012 McNamara et al.
2012/0202387 A1 8/2012 McNamara
2012/0214343 A1 8/2012 Buck et al.
2012/0214344 A1 8/2012 Cohen et al.
2012/0329294 A1 12/2012 Raybold et al.
2013/0012038 A1 1/2013 Kirk et al.
2013/0017715 A1 1/2013 Laarhoven et al.
2013/0017733 A1 1/2013 Kirk et al.
2013/0065454 A1 3/2013 Milbrand Jr.
2013/0078870 A1 3/2013 Milbrand, Jr.
2013/0078871 A1 3/2013 Milbrand, Jr.
2013/0089993 A1 4/2013 Jeon
2013/0090001 A1 4/2013 Kagotani
2013/0092429 A1 4/2013 Ellison
2013/0109232 A1 5/2013 Paniaqua
2013/0143442 A1 6/2013 Cohen et al.
2013/0178107 A1 7/2013 Costello et al.
2013/0196553 A1 8/2013 Gailus
2013/0210246 A1 8/2013 Davis et al.
2013/0217263 A1 8/2013 Pan
2013/0223036 A1 8/2013 Herring et al.
2013/0225006 A1 8/2013 Khilchenko et al.
2013/0237092 A1 9/2013 Rubens
2013/0273781 A1 10/2013 Buck et al.
2013/0288513 A1 10/2013 Masubuchi et al.
2013/0288521 A1 10/2013 McClellan et al.
2013/0288525 A1 10/2013 McClellan et al.
2013/0288539 A1 10/2013 McClellan et al.
2013/0316590 A1 11/2013 Hon
2013/0340251 A1 12/2013 Regnier et al.
2014/0004724 A1 1/2014 Cartier, Jr. et al.
2014/0004726 A1 1/2014 Cartier, Jr. et al.
2014/0004746 A1 1/2014 Cartier, Jr. et al.
2014/0041937 A1 2/2014 Lloyd et al.
2014/0057493 A1 2/2014 De Geest et al.
2014/0057494 A1 2/2014 Cohen
2014/0057498 A1 2/2014 Cohen
2014/0065883 A1 3/2014 Cohen et al.
2014/0073174 A1 3/2014 Yang
2014/0073181 A1 3/2014 Yang
2014/0080331 A1 3/2014 Jeon
2014/0194004 A1 7/2014 Pickel et al.

(56) References Cited

U.S. PATENT DOCUMENTS

2014/0242844 A1 8/2014 Wanha et al.
2014/0273551 A1 9/2014 Resendez et al.
2014/0273557 A1 9/2014 Cartier, Jr. et al.
2014/0273627 A1 9/2014 Cartier, Jr. et al.
2014/0287627 A1 9/2014 Cohen
2014/0308852 A1 10/2014 Gulla
2014/0322974 A1 10/2014 Chang et al.
2014/0335707 A1 11/2014 Johnescu et al.
2014/0335736 A1 11/2014 Regnier et al.
2015/0031238 A1 1/2015 Davis et al.
2015/0056856 A1 2/2015 Atkinson et al.
2015/0079829 A1 3/2015 Brodsgaard
2015/0079845 A1 3/2015 Wanha et al.
2015/0111427 A1 4/2015 Wu et al.
2015/0180578 A1 6/2015 Leigh et al.
2015/0188250 A1 7/2015 Liu et al.
2015/0194751 A1 7/2015 Herring
2015/0200496 A1 7/2015 Simpson et al.
2015/0207247 A1 7/2015 Regnier et al.
2015/0236450 A1 8/2015 Davis
2015/0236451 A1 8/2015 Cartier, Jr. et al.
2015/0236452 A1 8/2015 Cartier, Jr. et al.
2015/0255926 A1 9/2015 Paniagua
2015/0280351 A1 10/2015 Bertsch
2015/0303608 A1 10/2015 Zerebilov et al.
2015/0357736 A1 12/2015 Tran et al.
2015/0357761 A1 12/2015 Wanha et al.
2015/0380868 A1 12/2015 Chen et al.
2016/0000616 A1 1/2016 Lavoie
2016/0013594 A1 1/2016 Costello et al.
2016/0013596 A1 1/2016 Regnier
2016/0028189 A1 1/2016 Resendez et al.
2016/0104956 A1 4/2016 Santos et al.
2016/0111825 A1 4/2016 Wanha et al.
2016/0134057 A1 5/2016 Buck et al.
2016/0141807 A1 5/2016 Gailus et al.
2016/0149343 A1 5/2016 Atkinson et al.
2016/0149362 A1 5/2016 Ritter et al.
2016/0150633 A1 5/2016 Cartier, Jr.
2016/0150639 A1 5/2016 Gailus et al.
2016/0150645 A1 5/2016 Gailus et al.
2016/0156133 A1 6/2016 Masubuchi et al.
2016/0172794 A1 6/2016 Sparrowhawk et al.
2016/0181713 A1 6/2016 Peloza et al.
2016/0181732 A1 6/2016 Laurx et al.
2016/0190747 A1 6/2016 Regnier et al.
2016/0197423 A1 7/2016 Regnier
2016/0211618 A1 7/2016 Gailus
2016/0218455 A1 7/2016 Sayre et al.
2016/0233598 A1 8/2016 Wittig
2016/0268714 A1 9/2016 Wanha et al.
2016/0274316 A1 9/2016 Verdiell
2016/0308296 A1 10/2016 Pitten et al.
2016/0322770 A1 11/2016 Zerebilov
2016/0344141 A1 11/2016 Cartier, Jr. et al.
2017/0025783 A1 1/2017 Astbury et al.
2017/0033478 A1 2/2017 Wanha et al.
2017/0042070 A1 2/2017 Baumler et al.
2017/0047692 A1 2/2017 Cartier, Jr. et al.
2017/0077643 A1 3/2017 Zbinden et al.
2017/0093093 A1 3/2017 Cartier, Jr. et al.
2017/0098901 A1 4/2017 Regnier
2017/0162960 A1 6/2017 Wanha et al.
2017/0294743 A1 10/2017 Gailus et al.
2017/0302011 A1 10/2017 Wanha et al.
2017/0338595 A1 11/2017 Girard, Jr.
2017/0352970 A1 12/2017 Liang et al.
2017/0365942 A1 12/2017 Regnier
2017/0365943 A1 12/2017 Wanha et al.
2018/0006416 A1 1/2018 Lloyd et al.
2018/0034175 A1 2/2018 Lloyd et al.
2018/0034190 A1 2/2018 Ngo
2018/0040989 A1 2/2018 Chen
2018/0062323 A1 3/2018 Kirk et al.
2018/0109043 A1 4/2018 Provencher et al.
2018/0145438 A1 5/2018 Cohen
2018/0166828 A1 6/2018 Gailus
2018/0198220 A1 7/2018 Sasame et al.
2018/0205177 A1 7/2018 Zhou et al.
2018/0212376 A1 7/2018 Wang et al.
2018/0219331 A1 8/2018 Cartier, Jr. et al.
2018/0219332 A1 8/2018 Brungard et al.
2018/0269607 A1 9/2018 Wu et al.
2018/0366880 A1 12/2018 Zerebilov et al.
2019/0013625 A1 1/2019 Gailus et al.
2019/0020155 A1 1/2019 Trout et al.
2019/0036256 A1 1/2019 Martens et al.
2019/0044284 A1 2/2019 Dunham
2019/0052019 A1 2/2019 Huang et al.
2019/0067854 A1 2/2019 Ju et al.
2019/0131743 A1 5/2019 Hsu et al.
2019/0157812 A1 5/2019 Gailus et al.
2019/0173209 A1 6/2019 Lu et al.
2019/0173232 A1 6/2019 Lu et al.
2019/0173236 A1 6/2019 Provencher et al.
2019/0221973 A1 7/2019 Kirk et al.
2019/0296469 A1 9/2019 Stokoe et al.
2019/0312389 A1 10/2019 Little
2019/0334292 A1 10/2019 Cartier, Jr. et al.
2020/0021052 A1 1/2020 Milbrand, Jr. et al.
2020/0076132 A1 3/2020 Yang et al.
2020/0161811 A1 5/2020 Lu
2020/0194940 A1 6/2020 Cohen et al.
2020/0212632 A1 7/2020 Liong et al.
2020/0220289 A1 7/2020 Scholeno et al.
2020/0235529 A1 7/2020 Kirk et al.
2020/0251841 A1 8/2020 Stokoe et al.
2020/0259294 A1 8/2020 Lu
2020/0266584 A1 8/2020 Lu
2020/0266585 A1 8/2020 Paniagua et al.
2020/0303879 A1 9/2020 Provencher et al.
2020/0315027 A1 10/2020 Muronoi et al.
2020/0350717 A1 11/2020 Dong et al.
2020/0350732 A1 11/2020 Hsueh et al.
2020/0395698 A1 12/2020 Hou et al.
2020/0403350 A1 12/2020 Hsu
2020/0412060 A1 12/2020 Hsieh et al.
2021/0036465 A1 2/2021 Tang et al.
2021/0050683 A1 2/2021 Sasame et al.
2021/0159643 A1 5/2021 Kirk et al.
2021/0175670 A1 6/2021 Cartier, Jr. et al.
2021/0184404 A1 6/2021 Cohen et al.
2021/0194187 A1 6/2021 Chen et al.
2021/0203096 A1 7/2021 Cohen
2021/0234314 A1 7/2021 Johnescu et al.
2021/0234315 A1 7/2021 Ellison et al.
2021/0242632 A1 8/2021 Trout et al.
2021/0320461 A1 10/2021 Buck et al.
2021/0336362 A1 10/2021 Shen et al.
2022/0094099 A1 3/2022 Liu et al.
2022/0102916 A1 3/2022 Liu et al.
2022/0399663 A1 12/2022 Chang et al.
2022/0407269 A1 12/2022 Ellison et al.
2023/0062661 A1 3/2023 Johnescu et al.

FOREIGN PATENT DOCUMENTS

CN 1237652 A 12/1999
CN 1265470 A 9/2000
CN 2400938 Y 10/2000
CN 1276597 A 12/2000
CN 1280405 A 1/2001
CN 1299524 A 6/2001
CN 2513247 Y 9/2002
CN 2519434 Y 10/2002
CN 2519458 Y 10/2002
CN 2519592 Y 10/2002
CN 1394829 A 2/2003
CN 1398446 A 2/2003
CN 1401147 A 3/2003
CN 1126212 C 10/2003
CN 1127783 C 11/2003
CN 1471749 A 1/2004
CN 1489810 A 4/2004

(56) References Cited

FOREIGN PATENT DOCUMENTS

| | | | |
|---|---|---|---|
| CN | 1491465 | A | 4/2004 |
| CN | 1502151 | A | 6/2004 |
| CN | 1516723 | A | 7/2004 |
| CN | 1179448 | C | 12/2004 |
| CN | 1561565 | A | 1/2005 |
| CN | 1203341 | C | 5/2005 |
| CN | 1639866 | A | 7/2005 |
| CN | 1650479 | A | 8/2005 |
| CN | 1764020 | A | 4/2006 |
| CN | 1799290 | A | 7/2006 |
| CN | 2798361 | Y | 7/2006 |
| CN | 2865050 | Y | 1/2007 |
| CN | 1985199 | A | 6/2007 |
| CN | 101032060 | A | 9/2007 |
| CN | 201000949 | Y | 1/2008 |
| CN | 101124697 | A | 2/2008 |
| CN | 201022125 | Y | 2/2008 |
| CN | 201038469 | Y | 3/2008 |
| CN | 101164204 | A | 4/2008 |
| CN | 101176389 | A | 5/2008 |
| CN | 101208837 | A | 6/2008 |
| CN | 101273501 | A | 9/2008 |
| CN | 201112782 | Y | 9/2008 |
| CN | 101312275 | A | 11/2008 |
| CN | 101316012 | A | 12/2008 |
| CN | 201222548 | Y | 4/2009 |
| CN | 201252183 | Y | 6/2009 |
| CN | 101471515 | A | 7/2009 |
| CN | 101552410 | A | 10/2009 |
| CN | 101600293 | A | 12/2009 |
| CN | 201374433 | Y | 12/2009 |
| CN | 101752700 | A | 6/2010 |
| CN | 101790818 | A | 7/2010 |
| CN | 201562814 | U | 8/2010 |
| CN | 101854748 | A | 10/2010 |
| CN | 101120490 | B | 11/2010 |
| CN | 101964463 | A | 2/2011 |
| CN | 101124697 | B | 3/2011 |
| CN | 201846527 | U | 5/2011 |
| CN | 102106041 | A | 6/2011 |
| CN | 102157860 | A | 8/2011 |
| CN | 102195173 | A | 9/2011 |
| CN | 201966361 | U | 9/2011 |
| CN | 102232259 | A | 11/2011 |
| CN | 102239605 | A | 11/2011 |
| CN | 102282731 | A | 12/2011 |
| CN | 102292881 | A | 12/2011 |
| CN | 102299429 | A | 12/2011 |
| CN | 101600293 | B | 5/2012 |
| CN | 102570100 | A | 7/2012 |
| CN | 102598430 | A | 7/2012 |
| CN | 101258649 | B | 9/2012 |
| CN | 102738621 | A | 10/2012 |
| CN | 102176586 | B | 11/2012 |
| CN | 102859805 | A | 1/2013 |
| CN | 202678544 | U | 1/2013 |
| CN | 202695788 | U | 1/2013 |
| CN | 202695861 | U | 1/2013 |
| CN | 102986091 | A | 3/2013 |
| CN | 103036081 | A | 4/2013 |
| CN | 103151651 | A | 6/2013 |
| CN | 103594871 | A | 2/2014 |
| CN | 103915727 | A | 7/2014 |
| CN | 104241973 | A | 12/2014 |
| CN | 204190038 | U | 3/2015 |
| CN | 104577577 | A | 4/2015 |
| CN | 205212085 | U | 5/2016 |
| CN | 102820589 | B | 8/2016 |
| CN | 106099546 | A | 11/2016 |
| CN | 107069274 | A | 8/2017 |
| CN | 304240766 | S | 8/2017 |
| CN | 304245430 | S | 8/2017 |
| CN | 206712089 | U | 12/2017 |
| CN | 207677189 | U | 7/2018 |
| CN | 108832338 | A | 11/2018 |
| CN | 109994892 | A | 7/2019 |
| CN | 111555069 | A | 8/2020 |
| CN | 112134095 | A | 12/2020 |
| CN | 213636403 | U | 7/2021 |
| DE | 3447556 | A1 | 7/1986 |
| DE | 4109863 | A1 | 10/1992 |
| DE | 4238777 | A1 | 5/1993 |
| DE | 19853837 | C1 | 2/2000 |
| DE | 102006044479 | A1 | 5/2007 |
| DE | 60216728 | T2 | 11/2007 |
| EP | 0560551 | A1 | 9/1993 |
| EP | 0774807 | A2 | 5/1997 |
| EP | 0903816 | A2 | 3/1999 |
| EP | 1018784 | A1 | 7/2000 |
| EP | 1207587 | A2 | 5/2002 |
| EP | 1779472 | A1 | 5/2007 |
| EP | 1794845 | A1 | 6/2007 |
| EP | 2169770 | A2 | 3/2010 |
| EP | 2262061 | A1 | 12/2010 |
| EP | 2388867 | A2 | 11/2011 |
| EP | 2390958 | A1 | 11/2011 |
| EP | 2405537 | A1 | 1/2012 |
| EP | 1794845 | B1 | 3/2013 |
| EP | 2811589 | A1 | 12/2014 |
| GB | 1272347 | A | 4/1972 |
| GB | 2161658 | A | 1/1986 |
| GB | 2283620 | A | 5/1995 |
| HK | 1043254 | A1 | 9/2002 |
| JP | H02-079571 | U | 6/1990 |
| JP | H05-54201 | A | 3/1993 |
| JP | H05-234642 | A | 9/1993 |
| JP | H07-57813 | A | 3/1995 |
| JP | H07-302649 | A | 11/1995 |
| JP | H09-63703 | A | 3/1997 |
| JP | H09-274969 | A | 10/1997 |
| JP | 2711601 | B2 | 2/1998 |
| JP | H11-67367 | A | 3/1999 |
| JP | 2896836 | B2 | 5/1999 |
| JP | H11-233200 | A | 8/1999 |
| JP | H11-260497 | A | 9/1999 |
| JP | 2000-013081 | A | 1/2000 |
| JP | 2000-311749 | A | 11/2000 |
| JP | 2001-068888 | A | 3/2001 |
| JP | 2001-510627 | A | 7/2001 |
| JP | 2001-217052 | A | 8/2001 |
| JP | 2002-042977 | A | 2/2002 |
| JP | 2002-053757 | A | 2/2002 |
| JP | 2002-075052 | A | 3/2002 |
| JP | 2002-075544 | A | 3/2002 |
| JP | 2002-117938 | A | 4/2002 |
| JP | 2002-246107 | A | 8/2002 |
| JP | 2003-017193 | A | 1/2003 |
| JP | 2003-309395 | A | 10/2003 |
| JP | 2004-192939 | A | 7/2004 |
| JP | 2004-259621 | A | 9/2004 |
| JP | 3679470 | B2 | 8/2005 |
| JP | 2006-108115 | A | 4/2006 |
| JP | 2006-344524 | A | 12/2006 |
| JP | 2008-515167 | A | 5/2008 |
| JP | 2009-043717 | A | 2/2009 |
| JP | 2009-110956 | A | 5/2009 |
| JP | 2011-018651 | A | 1/2011 |
| JP | 2012-516021 | A | 7/2012 |
| JP | 2016-528688 | A | 9/2016 |
| MX | 9907324 | A1 | 8/2000 |
| TW | 466650 | B | 12/2001 |
| TW | 517002 | B | 1/2003 |
| TW | 534494 | U | 5/2003 |
| TW | 200501874 | A | 1/2005 |
| TW | 200515773 | A | 5/2005 |
| TW | M274675 | U | 9/2005 |
| TW | M329891 | U | 4/2008 |
| TW | M357771 | U | 5/2009 |
| TW | 200926536 | A | 6/2009 |
| TW | M403141 | U | 5/2011 |
| TW | M494411 | U | 1/2015 |
| TW | I475770 | B | 3/2015 |
| TW | M518837 | U | 3/2016 |
| TW | M558481 | U | 4/2018 |

(56) References Cited

FOREIGN PATENT DOCUMENTS

| | | | |
|---|---|---|---|
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M623128 | U | 2/2022 |
| WO | WO 85/02265 | A1 | 5/1985 |
| WO | WO 88/05218 | A1 | 7/1988 |
| WO | WO 98/35409 | A1 | 8/1998 |
| WO | WO 99/56352 | A2 | 11/1999 |
| WO | WO 01/39332 | A1 | 5/2001 |
| WO | WO 01/57963 | A2 | 8/2001 |
| WO | WO 2002/061892 | A1 | 8/2002 |
| WO | WO 03/013199 | A2 | 2/2003 |
| WO | WO 03/047049 | A1 | 6/2003 |
| WO | WO 2004/034539 | A1 | 4/2004 |
| WO | WO 2004/051809 | A2 | 6/2004 |
| WO | WO 2004/059794 | A2 | 7/2004 |
| WO | WO 2004/059801 | A1 | 7/2004 |
| WO | WO 2004/114465 | A2 | 12/2004 |
| WO | WO 2005/011062 | A2 | 2/2005 |
| WO | WO 2005/114274 | A1 | 12/2005 |
| WO | WO 2006/002356 | A1 | 1/2006 |
| WO | WO 2006/039277 | A1 | 4/2006 |
| WO | WO 2007/005597 | A2 | 1/2007 |
| WO | WO 2007/005598 | A2 | 1/2007 |
| WO | WO 2007/005599 | A1 | 1/2007 |
| WO | WO 2008/072322 | A1 | 6/2008 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/0601236 | A1 | 5/2011 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |
| WO | WO 2011/140438 | A3 | 12/2011 |
| WO | WO 2012/078434 | A2 | 6/2012 |
| WO | WO 2012/106554 | A2 | 8/2012 |
| WO | WO 2013/006592 | A2 | 1/2013 |
| WO | WO 2013/059317 | A1 | 4/2013 |
| WO | WO 2013/013430 | A1 | 1/2015 |
| WO | WO 2015/112717 | A1 | 7/2015 |
| WO | WO 2016/008473 | A1 | 1/2016 |
| WO | WO 2018/039164 | A1 | 3/2018 |

OTHER PUBLICATIONS

Chinese Invalidation Request dated Jun. 1, 2021 in connection with Chinese Application No. 200680023997.6.

Chinese Invalidation Request dated Sep. 9, 2021 in connection with Chinese Application No. 201110008089.2.

Chinese Invalidation Request dated Jun. 15, 2021 in connection with Chinese Application No. 201180033750.3.

Chinese Supplemental Observations dated Jun. 17, 2021 in connection with Chinese Application No. 201210249710.9.

Chinese communication for Chinese Application No. 201580014851.4, dated Jun. 1, 2020.

Chinese Office Action for Chinese Application No. 201580014851.4 dated Sep. 4, 2019.

Chinese Office Action for Application No. CN201580069567.7 dated Jun. 17, 2019.

Chinese Office Action for Application No. CN201580069567.7 dated Oct. 9, 2019.

Chinese Invalidation Request dated Mar. 17, 2021 in connection with Chinese Application No. 201610952606.4.

Chinese Office Action for Chinese Application No. 201780064531.9 dated Jan. 2, 2020.

Chinese Office Action for Chinese Application No. 202010467444.1 dated Apr. 2, 2021.

Chinese Office Action for Chinese Application No. 202010825662.8 dated Sep. 3, 2021.

Chinese Office Action for Chinese Application No. 202010922401.8 dated Aug. 6, 2021.

Extended European Search Report for European Application No. EP 11166820.8 dated Jan. 24, 2012.

International Search Report and Written Opinion dated Dec. 28, 2021 in connection with International Application No. PCT/CN2021/119849.

International Preliminary Report on Patentability for International Application No. PCT/US2005/034605 dated Apr. 3, 2007.

International Search Report and Written Opinion for International Application No. PCT/US2005/034605 dated Jan. 26, 2006.

International Preliminary Report on Patentability for International Application No. PCT/US2006/025562 dated Jan. 9, 2008.

International Search Report and Written Opinion for International Application No. PCT/US2006/25562 dated Oct. 31, 2007.

International Search Report with Written Opinion for International Application No. PCT/US2006/025562 dated Oct. 31, 2007.

International Preliminary Report on Patentability for International Application No. PCT/US2010/056482 dated May 24, 2012.

International Search Report and Written Opinion for International Application No. PCT/US2010/056482 dated Mar. 14, 2011.

International Search Report and Written Opinion for International Application No. PCT/US2010/056495 dated Jan. 25, 2011.

International Preliminary Report on Patentability for International Application No. PCT/US2011/026139 dated Sep. 7, 2012.

International Search Report and Written Opinion for International Application No. PCT/US2011/026139 dated Nov. 22, 2011.

International Search Report and Written Opinion for International Application No. PCT/US2011/034747 dated Jul. 28, 2011.

International Preliminary Report on Patentability for International Application No. PCT/US2012/023689 dated Aug. 15, 2013.

International Search Report and Written Opinion for International Application No. PCT/US2012/023689 dated Sep. 12, 2012.

International Preliminary Report on Patentability for International Application No. PCT/US2012/060610 dated May 1, 2014.

International Search Report and Written Opinion for International Application No. PCT/US2012/060610 dated Mar. 29, 2013.

International Search Report and Written Opinion for International Application No. PCT/US2014/026381 dated Aug. 12, 2014.

International Preliminary Report on Patentability for International Application No. PCT/US2015/012463 dated Aug. 4, 2016.

International Search Report and Written Opinion for International Application No. PCT/US2015/012463 dated May 13, 2015.

International Search Report and Written Opinion for International Application No. PCT/US2015/012542 dated Apr. 30, 2015.

International Search Report and Written Opinion for International Application No. PCT/US2015/060472 dated Mar. 11, 2016.

International Search Report and Written Opinion for International Application No. PCT/US2016/043358 dated Nov. 3, 2016.

International Search Report and Written Opinion for International Application No. PCT/US2017/033122 dated Aug. 8, 2017.

International Preliminary Report on Patentability for International Application No. PCT/US2017/047905, dated Mar. 7, 2019.

International Search Report and Written Opinion for International Application No. PCT/US2017/047905 dated Dec. 4, 2017.

International Preliminary Report on Patentability for International Application No. PCT/US2017/057402 dated May 2, 2019.

International Search Report and Written Opinion for International Application No. PCT/US2017/057402 dated Jan. 19, 2018.

International Search Report and Written Opinion for International Application No. PCT/US2018/045207 dated Nov. 29, 2018.

International Preliminary Report on Patentability Chapter II dated Apr. 5, 2022 in connection with International Application No. PCT/US2021/015048.

(56) References Cited

OTHER PUBLICATIONS

International Search Report and Written Opinion dated Jul. 1, 2021 in connection with International Application No. PCT/US2021/015048.
International Preliminary Report on Patentability Chapter II dated Apr. 1, 2022 in connection with International Application No. PCT/US2021/015073.
International Search Report and Written Opinion dated May 17, 2021 in connection with International Application No. PCT/US2021/015073.
Taiwanese Office Action dated Mar. 5, 2021 in connection with Taiwanese Application No. 106128439.
Taiwanese Office Action dated Mar. 15, 2022 in connection with Taiwanese Application No. 110140608.
Decision Invalidating CN Patent Application No. 201610952606.4, which issued as CN Utility Model Patent No. 107069274B, and Certified Translation.
In re Certain Electrical Connectors and Cages, Components Thereof, and Prods. Containing the Same, Inv. No. 337-TA-1241, Order No. 31 (Oct. 19, 2021): Construing Certain Terms of the Asserted Claims of the Patents at Issue.
In re Matter of Certain Electrical Connectors and Cages, Components Thereof, and Products Containing the Same, Inv. No. 337-TA-1241, Complainant Amphenol Corporation's Corrected Initial Post-Hearing Brief. Public Version. Jan. 5, 2022. 451 pages.
In re Matter of Certain Electrical Connectors and Cages, Components Thereof, and Products Containing the Same, Inv. No. 337-TA-1241, Complainant Amphenol Corporation's Post-Hearing Reply Brief. Public Version. Dec. 6, 2021. 159 pages.
In re Matter of Certain Electrical Connectors and Cages, Components Thereof, and Products Containing the Same, Inv. No. 337-TA-1241, Luxshare Respondents' Initial Post-Hearing Brief. Public Version. Nov. 23, 2021. 348 pages.
In re Matter of Certain Electrical Connectors and Cages, Components Thereof, and Products Containing the Same, Inv. No. 337-TA-1241, Luxshare Respondents' Reply Post-Hearing Brief. Public Version. Dec. 6, 2021. 165 pages.
In re Matter of Certain Electrical Connectors and Cages, Components Thereof, and Products Containing the Same, Inv. No. 337-TA-1241, Notice of Prior Art. Jun. 3, 2021. 319 pages.
In re Matter of Certain Electrical Connectors and Cages, Components Thereof, and Products Containing the Same, Inv. No. 337-TA-1241, Respondents' Pre-Hearing Brief. Redacted. Oct. 21, 2021. 219 pages.
In the Matter of Certain Electrical Connectors and Cages, Components Thereof, and Products Containing the Same, Inv. No. 337-TA-1241, Final Initial Determination on Violation of Section 337. Public Version. Mar. 11, 2022. 393 pages.
Invalidity Claim Charts Based on CN 201112782Y ("Cai"). Luxshare Respondents' Supplemental Responses to Interrogatories Nos. 13 and 14, Exhibit 25. May 7, 2021. 147 pages.
Invalidity Claim Charts Based on U.S. Pat. No. 6,179,651 ("Huang"). Luxshare Respondents' Supplemental Responses to Interrogatories Nos. 13 and 14, Exhibit 26. May 7, 2021. 153 pages.
Invalidity Claim Charts Based on U.S. Pat. No. 7,261,591 ("Korsunsky"). Luxshare Respondents' Supplemental Responses to Interrogatories Nos. 13 and 14, Exhibit 27. May 7, 2021. 150 pages.
Petition for Inter Partes Review. *Luxshare Precision Industry Co., Ltd* v. *Amphenol Corp*. U.S. Pat. No. 10,381,767. IPR2022-00132. Nov. 4, 2021. 112 pages.
[No Author Listed], Amphenol TCS expands the Xcede Platform with 85 Ohm Connectors and High-Speed Cable Solutions. Press Release. Published Feb. 25, 2009. http://www.amphenol.com/about/news_archive/2009/58 [Retrieved on Mar. 26, 2019 from Wayback Machine]. 4 pages.
[No Author Listed], Agilent. Designing Scalable 10G Backplane Interconnect Systems Utilizing Advanced Verification Methodologies. White Paper, Published May 5, 2012. 24 pages.
[No Author Listed], All About ESD Plastics. Evaluation Engineering. Jul. 1, 1998. 8 pages. https://www.evaluationengineering.com/home/article/13001136/all-about-esdplastics [last accessed Mar. 14, 2021].
[No Author Listed], AMP Incorporated Schematic, Cable Assay, 2 Pair, HMZD. Oct. 3, 2002. 1 page.
[No Author Listed], Board to Backplane Electrical Connector. The Engineer. Mar. 13, 2001, [last accessed Apr. 30, 2021]. 2 pages.
[No Author Listed], Borosil Vision Mezzo Mug Set of 2. Zola. 3 pages. https://www.zola.com/shop/product/borosil_vision_mezzao_mug_setof2_3.25. [date retrieved May 4, 2021].
[No Author Listed], Cable Systems. Samtec. Aug. 2010. 148 pages.
[No Author Listed], Carbon Nanotubes For Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.
[No Author Listed], Coating Electrical Contacts. Brush Wellman Engineered Materials. Jan. 2002;4(1). 2 pages.
[No Author Listed], Common Management Interface Specification. Rev 4.0. MSA Group. May 8, 2019. 265 pages.
[No Author Listed], Electronics Connector Overview. FCI. Sep. 23, 2009. 78 pages.
[No Author Listed], Emi Shielding Compounds Instead of Metal. RTP Company. Last Accessed Apr. 30, 2021. 2 pages.
[No Author Listed], EMI Shielding Solutions and EMC Testing Services from Laird Technologies. Laird Technologies. Last acessed Apr. 30, 2021. 1 page.
[No Author Listed], Emi Shielding, Dramatic Cost Reductions for Electronic Device Protection. RTP. Jan. 2000. 10 pages.
[No Author Listed], Excerpt from The Concise Oxford Dictionary, Tenth Edition. 1999. 3 pages.
[No Author Listed], Excerpt from The Merriam-Webster Dictionary, Between. 2005. 4 pages.
[No Author Listed], Excerpt from Webster's Third New International Dictionary, Contact. 1986. 3 pages.
[No Author Listed], FCI—High Speed Interconnect Solutions, Backpanel Connectors. FCI. [last accessed Apr. 30, 2021). 2 pages.
[No Author Listed], File: Wrt54gl-layout.jpg Sep. 8, 2006. Retrieved from the Internet: https://xinu.mscs.mu.edu/File:Wrt54gl-layout.jpg [retrieved on Apr. 9, 2019]. 2 pages.
[No Author Listed], General Product Specification for GbX Backplane and Daughtercard Interconnect System. Revision "B". Teradyne. Aug. 23, 2005. 12 pages.
[No Author Listed], High Speed Backplane Connectors. Tyco Electronics. Product Catalog No. 1773095. Revised Dec. 2008. 1-40 pages.
[No Author Listed], Hitachi Cable America Inc. Direct Attach Cables. 8 pages. Retrieved Aug. 10, 2017 from http://www.hca.hitachi-cable.com/products/hca/catalog/pdfs/direct-attach-cable-assemblies.pdf [last accessed Mar. 6, 2019].
[No Author Listed], Hozox EMI Absorption Sheet and Tape. Molex. Laird Technologies. 2013. 2 pages.
[No Author Listed], INF-8074i Specification for SFP (Small Formfactor Pluggable) Transceiver. SFF Committee. Revision 1.0. May 12, 2001. 39 pages.
[No Author Listed], INF-8438i Specification for QSFP (Quad Small Formfactor Pluggable) Transceiver. Rev 1.0 Nov. 2006. SFF Committee. 76 pages.
[No Author Listed], Interconnect Signal Integrity Handbook. Samtec. Aug. 2007. 21 pages.
[No Author Listed], Metallized Conductive Products: Fabric-Over-Foam, Conductive Foam, Fabric, Tape. Laird Technologies. 2003. 32 pages.
[No Author Listed], Metral® 2000 Series. FCI. 2001. 2 pages.
[No Author Listed], Metral® 2mm High-Speed Connectors 1000, 2000, 3000 Series. FCI. 2000. 119 pages.
[No Author Listed], Metral® 3000 Series. FCI. 2001. 2 pages.
[No Author Listed], Metral® 4000 Series. FCI. 2002. 2 pages.
[No Author Listed], Metral® 4000 Series: High-Speed Backplane Connectors. FCI, Rev. 3. Nov. 30, 2001. 21 pages.
[No Author Listed], Military Fibre Channel High Speed Cable Assembly. www.gore.com. 2008. [last accessed Aug. 2, 2012 via

(56) References Cited

OTHER PUBLICATIONS

Internet Archive: Wayback Machine http://web.archive.org] Link archived: http://www.gore.com/en.sub .--xx/products/cables/copper/networking/militar-y/military.sub .-- fibre . . . Last archive date Apr. 6, 2008.
[No Author Listed], Molex Connectors as InfiniBand Solutions. Design World. Nov. 19, 2008. 7 pages. https://www.designworldonline.com/molex-connectors-as-infiniband-solutions/. [last accessed May 3, 2021].
[No Author Listed], OSFP MSA Specification for OSFP Octal Small Form Factor Pluggable Module. Revision 1.11. OSFP MSA. Jun. 26, 2017. 53 pages.
[No Author Listed], OSFP MSA Specification for OSFP Octal Small Form Factor Pluggable Module. Revision 1.12. OSFP MSA. Aug. 1, 2017. 53 pages.
[No Author Listed], OSFPA MSA Specification for OSFP Octal Small Form Factor Pluggable Module. Revision 2.0 OSFP MSA. Jan. 14, 2019. 80 pages.
[No Author Listed], OSFPA MSA Specification for OSFP Octal Small Form Factor Pluggable Module. Revision 3.0 OSFPA MSA. Mar. 14, 2020. 99 pages.
[No Author Listed], Photograph of Molex Connector. Oct. 2021. 1 page.
[No Author Listed], Photograph of TE Connector. Oct. 2021. 1 page.
[No Author Listed], Pluggable Form Products. Tyco Electronics. Mar. 5, 2006. 1 page.
[No Author Listed], Pluggable Input/Output Solutions. Tyco Electronics Catalog 1773408-1. Revised Feb. 2009. 40 pages.
[No Author Listed], QSFP Market Evolves, First Products Emerge. Lightwave. Jan. 2, 20082. pp. 1-8. https://www.lightwaveonline.com/home/article/16662662.
[No Author Listed], QSFP-DD Hardware Specification for QSFP Double Density 8X Pluggable Transceiver, Rev 3.0. QSFP-DD MSA. Sep. 19, 2017. 69 pages.
[No Author Listed], QSFP-DD Hardware Specification for QSFP Double Density 8X Pluggable Transceiver, Rev 4.0. QSFP-DD MSA. Sep. 18, 2018. 68 pages.
[No Author Listed], QSFP-DD MSA QSFP-DD Hardware Specification for QSFP Double Density 8X Pluggable Transceiever. Revision 5.0. QSFP-DD-MSA. Jul. 9, 2019. 82 pages.
[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.
[No Author Listed], QSFP-DD MSA QSFP-DD Specification for QSFP Double Density 8X Pluggable Transceiver. Revision 1.0. QSFP-DD-MSA. Sep. 15, 2016. 69 pages.
[No Author Listed], QSFP-DD Specification for QSFP Double Density 8X Pluggable Transceiver Specification, Rev. 2.0. QSFP-DD MSA. Mar. 13, 2017. 106 pages.
[No Author Listed], RTP Company Introduces "Smart" Plastics for Bluetooth Standard. Press Release. RTP. Jun. 4, 2001. 2 pages.
[No Author Listed], RTP Company Specialty Compounds. RTP. Mar. 2002. 2 pages.
[No Author Listed], RTP Company-EMI/RFI Shielding Compounds (Conductive) Data Sheets. RTP Company. Last accessed Apr. 30, 2021. 4 pages.
[No Author Listed], Samtec Board Interface Guide. Oct. 2002. 253 pages.
[No Author Listed], SFF Committee SFF-8079 Specification for SFP Rate and Application Selection. Revision 1.7. SFF Committee. Feb. 2, 2005. 21 pages.
[No Author Listed], SFF Committee SFF-8089 Specification for SFP (Small Formfactor Pluggable) Rate and Application Codes. Revision 1.3. SFF Committee. Feb. 3, 2005. 18 pages.
[No Author Listed], SFF Committee SFF-8436 Specification for QAFP+ 4X 10 GB/s Pluggable Transceiver. Revision 4.9. SFF Committee. Aug. 31, 2018. 88 pages.
[No Author Listed], SFF Committee SFF-8665 Specification for QSFP+ 28 GB/s 4X Pluggable Transceiver Solution (QSFP28). Revision 1.9. SFF Committee. Jun. 29, 2015. 14 pages.
[No Author Listed], SFF-8075 Specification for PCI Card Version of SFP Cage. Rev 1.0. SFF Committee. Jul. 3, 2001. 11 pages.
[No Author Listed], SFF-8431 Specifications for Enhanced Small Form Factor Pluggable Module SFP+. Revision 4.1. SFF Committee. Jul. 6, 2009. 132 pages.
[No Author Listed], SFF-8432 Specification for SFP+ Module and Cage. Rev 5.1. SFF Committee. Aug. 8, 2012. 18 pages.
[No Author Listed], SFF-8433 Specification for SFP+ Ganged Cage Footprints and Bezel Openings. Rev 0.7. SFF Committee. Jun. 5, 2009. 15 pages.
[No Author Listed], SFF-8477 Specification for Tunable XFP for ITU Frequency Grid Applications. Rev 1.4. SFF Committee. Dec. 4, 2009. 13 pages.
[No Author Listed], SFF-8672 Specification for QSFP+ 4x 28 GB/s Connector (Style B). Revision 1.2. SNIA. Jun. 8, 2018. 21 pages.
[No Author Listed], SFF-8679 Specification for QSFP+ 4X Base Electrical Specification. Rev 1.7. SFF Committee. Aug. 12, 2014. 31 pages.
[No Author Listed], SFF-8682 Specification for QSFP+ 4X Connector. Rev 1.1. SNIA SFF TWG Technology Affiliate. Jun. 8, 2018. 19 pages.
[No Author Listed], Shielding Theory and Design. Laird Technologies. Last accessed Apr. 30, 2021. 1 page.
[No Author Listed], Shielding Theory and Design. Laird Technologies. Last accessed Apr. 30, 2021. 2 pages. URL:web.archive.org/web/20030226182710/http://www.lairdtech.com/catalog/staticdata/shielding theorydesign/std_3.htm.
[No Author Listed], Shielding Theory and Design. Laird Technologies. Last accessed Apr. 30, 2021. 2 pages. URL:web.archive.org/web/20021223144443/http://www.lairdtech.com/catalog/staticdata/shielding theorydesign/std_2.htm.
[No Author Listed], Signal Integrity—Multi-Gigabit Transmission Over Backplane Systems. International Engineering Consortium. 2003;1-8.
[No Author Listed], Signal Integrity Considerations for 10Gbps Transmission over Backplane Systems. DesignCon2001. Teradyne Connections Systems, Inc. 2001. 47 pages.
[No Author Listed], Size 8 High Speed Quadrax and Differential Twinax Contacts for Use in MIL-DTL-38999 Special Subminiature Cylindrical and ARINC 600 Rectangular Connectors. Published May 2008. 10 pages. Retrieved from https://www.peigenesis.com/images/content/news/amphenol_quadrax.pdf.
[No Author Listed], Specification for OSFP Octal Small Form Factor Pluggable Module. Rev 1.0. OSFP MSA. Mar. 17, 2017. 53 pages.
[No Author Listed], TB-2092 GbX Backplane Signal and Power Connector Press-Fit Installation Process. Teradyne. Aug. 8, 2002;1-9.
[No Author Listed], Teradyne Beefs Up High-Speed GbX Connector Platform. EE Times. Sep. 20, 2005. 3 pages.
[No Author Listed], Teradyne Connection Systems Introduces the GbX L-Series Connector. Press Release. Teradyne. Mar. 22, 2004. 5 pages.
[No Author Listed], Teradyne Schematic, Daughtercard Connector Assembly 5 Pair GbX, Drawing No. C-163-5101-500. Nov. 6, 2002. 1 page.
[No Author Listed], Tin as a Coating Material. Brush Wellman Engineered Materials. Jan. 2002;4(2). 2 pages.
[No Author Listed], Two and Four Pair HM-Zd Connectors. Tyco Electronics. Oct. 14, 2003;1-8.
[No Author Listed], Tyco Electronics Schematic, Header Assembly, Right Angle, 4 Pair HMZd, Drawing No. C-1469048. Jan. 10, 2002. 1 page.
[No Author Listed], Tyco Electronics Schematic, Receptacle Assembly, 2 Pair 25mm HMZd, Drawing No. C-1469028. Apr. 24, 2002. 1 page.
[No Author Listed], Tyco Electronics Schematic, Receptacle Assembly, 3 Pair 25mm HMZd, Drawing No. C1469081. May 13, 2002. 1 page.
[No Author Listed], Tyco Electronics Schematic, Receptacle Assembly, 4 Pair HMZd, Drawing No. C1469001. Apr. 23, 2002. 1 page.
[No Author Listed], Tyco Electronics Z-Dok+ Connector. May 23, 2003. pp. 1-15. http://zdok.tycoelectronics.com.

(56) References Cited

OTHER PUBLICATIONS

[No Author Listed], Tyco Electronics, SFP System. Small Form-Factor Pluggable (SFP) System. Feb. 2001. 1 page.
[No Author Listed], Typical conductive additives—Conductive Compounds. RTP Company. https://www.rtpcompany.com/products/conductive/additives.htm. Last accessed Apr. 30, 2021. 2 pages.
[No Author Listed], Z-Pack HM-Zd Connector, High Speed Backplane Connectors. Tyco Electronics. Catalog 1773095. 2009;5-44.
[No Author Listed], Z-Pack HM-Zd: Connector Noise Analysis for XAUI Applications. Tyco Electronics. Jul. 9, 2001. 19 pages.
Atkinson et al., High Frequency Electrical Connector, U.S. Appl. No. 15/645,931, filed Jul. 10, 2017.
Beaman, High Performance Mainframe Computer Cables. 1997 Electronic Components and Technology Conference. 1997;911-7.
Chung, Electrical applications of carbon materials. J. of Materials Science. 2004;39:2645-61.
Dahman, Recent Innovations of Inherently Conducting Polymers for Optimal (106-109 Ohm/Sq) ESD Protection Materials. RTD Company. 2001. 8 pages.
Do et al., A Novel Concept Utilizing Conductive Polymers on Power Connectors During Hot Swapping in Live Modular Electronic Systems. IEEE Xplore 2005; downloaded Feb. 18, 2021;340-345.
Eckardt, Co-Injection Charting New Territory and Opening New Markets. Battenfeld GmbH. Journal of Cellular Plastics. 1987;23:555-92.
Elco, Metral® High Bandwidth—A Differential Pair Connector for Applications up to 6 GHz. FCI. Apr. 26, 1999;1-5.
Feller et al., Conductive polymer composites: comparative study of poly(ester)-short carbon fibres and poly(epoxy)-short carbon fibres mechanical and electrical properties. Materials Letters. Feb. 21, 2002;57:64-71.
Fjelstad, Flexible Circuit Technology. Third Edition. BR Publishing, Inc. Sep. 2006. 226 pages. ISBN 0-9667075-0-8.
Getz et al., Understanding and Eliminating EMI in Microcontroller Applications. National Semiconductor Corporation. Aug. 1996. 30 pages.
Grimes et al., A Brief Discussion of EMI Shielding Materials. IEEE. 1993:217-26.
Housden et al., Moulded Interconnect Devices. Prime Faraday Technology Watch. Feb. 2002. 34 pages.
Kirk et al., Connector Configurable for High Performance, U.S. Appl. No. 18/085,093, filed Dec. 20, 2022.
Mcalexander, CV of Joseph C. McAlexander III. Exhibit 1009. 2021. 31 pages.
Mcalexander, Declaration of Joseph C. McAlexander III in Support of Petition for Inter Partes Review of U.S. Pat. No. 10,381,767. Exhibit 1002. Nov. 4, 2021. 85 pages.
Nadolny et al., Optimizing Connector Selection for Gigabit Signal Speeds. Sep. 2000. 5 pages.
Neelakanta, Handbook of Electromagnetic Materials: Monolithic and Composite Versions and Their Applications. CRC. 1995. 246 pages.
Okinaka, Significance of Inclusions in Electroplated Gold Films for Electronics Applications. Gold Bulletin. Aug. 2000;33(4):117-127.
Ott, Noise Reduction Techniques In Electronic Systems. Wiley. Second Edition. 1988. 124 pages.
Patel et al., Designing 3.125 Gbps Backplane System. Teradyne. 2002. 58 pages.
Preusse, Insert Molding vs. Post Molding Assembly Operations. Society of Manufacturing Engineers. 1998. 8 pages.
Reich et al., Microwave Theory and Techniques. Boston Technical Publishers, Inc. 1965;182-91.
Ross, Focus on Interconnect: Backplanes Get Reference Designs. EE Times. Oct. 27, 2003 [last accessed Apr. 30, 2021]. 4 pages.
Ross, GbX Backplane Demonstrator Helps System Designers Test High-Speed Backplanes. EE Times. Jan. 27, 2004 [last accessed May 5, 2021]. 3 pages.
Shi et al, Improving Signal Integrity In Circuit Boards By Incorporating Absorbing Materials. 2001 Proceedings. 51st Electronic Components and Technology Conference, Orlando FL. 2001:1451-56.
Silva et al., Conducting Materials Based on Epoxy/Graphene Nanoplatelet Composites With Microwave Absorbing Properties: Effect of the Processing Conditions and Ionic Liquid. Frontiers in Materials. Jul. 2019;6(156):1-9. doi: 10.3389/fmats.2019.00156.
Tracy, Rev. 3.0 Specification IP (Intellectual Property). Mar. 20, 2020. 8 pages.
Violette et al., Electromagnetic Compatibility Handbook. Van Nostrand Reinhold Company Inc. 1987. 229 pages.
Wagner et al., Recommended Engineering Practice to Enhance the EMI/EMP Immunity of Electric Power Systems. Electric Research and Management, Inc. Dec. 1992. 209 pages.
Weishalla, Smart Plastic for Bluetooth. RTP Imagineering Plastics. Apr. 2001. 7 pages.
White, A Handbook on Electromagnetic Shielding Materials and Performance. Don Whie Consultants. 1998. Second Edition. 77 pages.
White, EMI Control Methodology and Procedures. Don White Consultants, Inc. Third Edition 1982. 22 pages.
Williams et al., Measurement of Transmission and Reflection of Conductive Lossy Polymers at Millimeter-Wave Frequencies. IEEE Transactions on Electromagnetic Compatibility. Aug. 1990;32(3):236-240.

* cited by examiner

HIGH-FREQUENCY ELECTRICAL CONNECTOR

CROSS-REFERENCE TO RELATED APPLICATIONS

This application is a continuation claiming the benefit under 35 U.S.C. § 120 of U.S. patent application Ser. No. 17/181,639, filed on Feb. 22, 2021, entitled "HIGH-FREQUENCY ELECTRICAL CONNECTOR," which is a continuation claiming the benefit under 35 U.S.C. § 120 of U.S. patent application Ser. No. 15/823,494, filed on Nov. 27, 2017, entitled "HIGH-FREQUENCY ELECTRICAL CONNECTOR," which is a continuation claiming the benefit under 35 U.S.C. § 120 of U.S. patent application Ser. No. 13/973,921, filed on Aug. 22, 2013, entitled "HIGH-FREQUENCY ELECTRICAL CONNECTOR," which claims the benefit under 35 U.S.C. § 119(e) to U.S. Provisional Application No. 61/691,901, filed on Aug. 22, 2012, entitled "HIGH-FREQUENCY ELECTRICAL CONNECTOR," each of which is hereby incorporated in its entirety by reference herein.

BACKGROUND

This disclosure relates generally to electrical interconnection systems and more specifically to improved signal integrity in interconnection systems, particularly in high speed electrical connectors.

Electrical connectors are used in many electronic systems. It is generally easier and more cost effective to manufacture a system on several printed circuit boards ("PCBs") that are connected to one another by electrical connectors than to manufacture a system as a single assembly. A traditional arrangement for interconnecting several PCBs is to have one PCB serve as a backplane. Other PCBs, which are called daughter boards or daughter cards, are then connected through the backplane by electrical connectors.

Electronic systems have generally become smaller, faster, and functionally more complex. These changes mean that the number of circuits in a given area of an electronic system, along with the frequencies at which the circuits operate, have increased significantly in recent years. Current systems pass more data between printed circuit boards and require electrical connectors that are electrically capable of handling more data at higher speeds than connectors of even a few years ago.

One of the difficulties in making a high density, high speed connector is that electrical conductors in the connector can be so close that there can be electrical interference between adjacent signal conductors. To reduce interference, and to otherwise provide desirable electrical properties, shield members are often placed between or around adjacent signal conductors. The shields prevent signals carried on one conductor from creating "crosstalk" on another conductor. The shield also impacts the impedance of each conductor, which can further contribute to desirable electrical properties. Shields can be in the form of grounded metal structures or may be in the form of electrically lossy material.

Other techniques may be used to control the performance of a connector. Transmitting signals differentially can also reduce crosstalk. Differential signals are carried on a pair of conducting paths, called a "differential pair." The voltage difference between the conductive paths represents the signal. In general, a differential pair is designed with preferential coupling between the conducting paths of the pair. For example, the two conducting paths of a differential pair may be arranged to run closer to each other than to adjacent signal paths in the connector. No shielding is desired between the conducting paths of the pair, but shielding may be used between differential pairs. Electrical connectors can be designed for differential signals as well as for single-ended signals.

Differential connectors are generally regarded as "edge coupled" or "broadside coupled." In both types of connectors the conductive members that carry signals are generally rectangular in cross section. Two opposing sides of the rectangle are wider than the other sides, forming the broad sides of the conductive member. When pairs of conductive members are positioned with broad sides of the members of the pair closer to each other than to adjacent conductive members, the connector is regarded as being broadside coupled. Conversely, if pairs of conductive members are positioned with the narrower edges joining the broad sides closer to each other than to adjacent conductive members, the connector is regarded as being edge coupled.

Maintaining signal integrity can be a particular challenge in the mating interface of the connector. At the mating interface, force must be generated to press conductive elements from the separable connectors together so that a reliable electrical connection is made between the two conductive elements. Frequently, this force is generated by spring characteristics of the mating contact portions in one of the connectors. For example, the mating contact portions of one connector may contain one or more members shaped as beams. As the connectors are pressed together, each beam is deflected by a mating contact, shaped as a post or pin, in the other connector. The spring force generated by the beam as it is deflected provides a contact force.

For mechanical reliability, contacts may have multiple beams. In some implementations, the beams are opposing, pressing on opposite sides of a mating contact portion of a conductive element from another connector. In some alternative implementations, the beams may be parallel, pressing on the same side of a mating contact portion.

Regardless of the specific contact structure, the need to generate mechanical force imposes requirements on the shape of the mating contact portions. For example, the mating contact portions must be large enough to generate sufficient force to make a reliable electrical connection. These mechanical requirements may preclude the use of shielding, or may dictate the use of conductive material in places that alters the impedance of the conductive elements in the vicinity of the mating interface. Because abrupt changes in impedance may alter the signal integrity of a signal conductor, mating contact portions are often accepted as being noisier portions of a connector.

SUMMARY

Aspects of the present disclosure relate to improved high speed, high density interconnection systems. The inventors have recognized and appreciated techniques for configuring connector mating interfaces and other connector components to improve signal integrity. These techniques may be used together, separately, or in any suitable combination.

In some embodiments, relate to providing mating contact structures that support multiple points of contact distributed along an elongated dimension of a conductive elements of a connector. Different contact structures may be used for signal conductors and ground conductors, but, in some embodiments, multiple points of contact may be provided for each.

Accordingly, in some aspects, the invention may be embodied as an electrical connector comprising a plurality of conductive elements disposed in a column, each of the plurality of conductive members comprising a mating contact portion, a contact tail, and an intermediate portion between the mating contact portion and the contact tail. The electrical connector may be a first electrical connector. A first mating contact portion of a first conductive element of the plurality of conductive elements may comprise a first beam, a second beam and a third beam, the first beam being shorter than the second beam and the third beam. The first beam of the first mating contact portion may comprise a first contact region adapted to make electrical contact with a second mating contact portion of a second conductive element of a second electrical connector at a first point of contact. The second beam of the first mating contact portion may comprise a second contact region adapted to make electrical contact with the second mating contact portion of the second conductive element of the second electrical connector at a second point of contact, the second point of contact being farther from a distal end of the second mating contact portion than the first point of contact. The third beam of the first mating contact portion may comprise a third contact region adapted to make electrical contact with the second mating contact portion of the second conductive element of the second electrical connector at a third point of contact, the third point of contact being farther away from a distal end of the second mating contact portion than the first point of contact.

In some embodiments, the conductive elements may be ground conductors, which may separate signal conductors within the column.

In some embodiments, the first beam may be disposed between the second beam and the third beam.

In some embodiments, the first contact region may comprise a first protruding portion, and the second contact region may comprise a second protruding portion that protrudes to a greater extent than the first protruding portion.

In some embodiments, the first mating contact portion of the first conductive element may be adapted to apply a spring force to the second mating contact portion of the second conductive element when the first electrical connector is mated with the second electrical connector. In some embodiments, the first mating contact portion of the first conductive element may be adapted to be deflected by the second mating contact portion of the second conductive element by about 1/1000 inch when the first electrical connector is mated with the second electrical connector.

In some embodiments, the second beam may be about twice as long as the first beam.

In some embodiments, the plurality of conductive elements may comprise a third conductive element disposed adjacent to the first conductive element, and a third mating contact portion of the third conductive element may comprise a fourth beam and a fifth beam, the fourth and fifth beams being roughly equal in length. In some embodiments, a first combined width of the first, second, and third beams may be greater than a second combined width of the fourth and fifth beams. In some embodiments, the fourth beam of the third mating contact portion may comprise a fourth contact region adapted to make electrical contact with a fourth mating contact portion of a fourth conductive element of the second electrical connector, and the fifth beam of the third mating contact portion may comprise a fifth contact region adapted to make electrical contact with the fourth mating contact portion of the fourth conductive element of the second electrical connector. In some embodiments, the fourth beam of the third mating contact portion may be disposed closer to the first mating contact portion than the fifth beam of the third mating contact portion, and the fourth beam may further comprise a sixth contact region adapted to make electrical contact with the fourth mating contact portion of the fourth conductive element of the second electrical connector, the sixth contact region being farther away from a distal end of the fourth mating contact portion than the fourth contact region.

In another aspect, an electrical connector may comprise a plurality of conductive elements disposed in a column of conductive elements. Each of the plurality of conductive elements may comprise at least one beam. The plurality of conductive elements may be arranged in a plurality of pairs of conductive elements, each of the conductive elements in each pair having a first width. The plurality of conductive elements may comprise a plurality of wide conductive elements, each of the wide conductive elements being disposed between adjacent pairs of the plurality of pairs. Each of the wide conductive elements may comprise a plurality of beams, the plurality of beams comprising at least one longer beam and at least one shorter beam, the shorter beam being disposed separate from the longer beam and positioned such that when the electrical connector is mated to a mating electrical connector and the wide conductive element makes contact with a corresponding conductive element in mating connector, the shorter beam terminates a stub of the corresponding conductive element comprising a wipe region for the longer beam on the corresponding conductive element.

In some embodiments, the plurality of conductive elements disposed on the column may form a plurality of coplanar waveguides, each of the coplanar waveguides comprising a pair or the plurality of pairs and at least one adjacent wide conductive element of the plurality of wide conductive elements.

In some embodiments, the electrical connector may comprise a wafer, the wafer comprising a housing, the plurality of conductive elements being at least partially enclosed in the housing. In some embodiments, the housing may comprise insulative material and lossy material.

In some embodiments, each beam of the plurality of beams may comprise a contact region on a distal portion of the beam, and the contact regions of the beams of each pair of the plurality of pairs and the contact regions of each longer beam of the wide conductive elements may be disposed in a line adjacent a mating face of the connector.

In some embodiments, the plurality of beams for each of the wide conductive elements may comprise two longer beams and one shorter beam disposed between the two longer beams, the two longer beams being disposed along adjacent edges of the wide conductive elements. In some embodiments, each of the plurality of conductive elements in each of the plurality of pairs may comprise two beams. In some embodiments, the electrical connector may comprise a housing, each of the plurality of conductive elements may comprise an intermediate portion within the housing and a contact portion extending from the housing, the contact portion comprising a corresponding beam, the intermediate portions of the plurality of conductive elements may be configured with a first spacing between an edge of a wide conductive element and an edge of a conductive element of an adjacent pair of conductive elements, and the beams of the plurality of conductive elements may be configured such that the beams of conductive elements of the pairs have first regions and second regions, the first regions providing a spacing between a conductive element of a pair and an adjacent wide conductive element that approximates the first spacing and the second regions providing a spacing between the conductive element of the pair and the adjacent wide conductive element that is greater than the first spacing. In some embodiments, the spacing that is greater than the first spacing may provide a uniform spacing of contact regions along a mating interface of the connector. In some embodiments, each of the at least one beams of each of the pairs may comprise two beams.

In other aspects, the conductive elements in the connector may be shaped to provide desirable electrical and mechanical properties. Accordingly, in some embodiments, an electrical connector may comprise a housing and a plurality of conductive elements disposed in a column. Each of the plurality of conductive members may comprise a mating contact portion, a contact tail, and an intermediate portion between the mating contact portion and the contact tail. The intermediate portions of the plurality of conductive elements may be disposed within the housing and the mating contact portions of the plurality of conductive elements may extend from the housing. The plurality of conductive elements may comprise a first conductive element and a second conductive element disposed adjacent the first conductive element. A first proximal end of a first mating contact portion of the first conductive element may be spaced apart from a second proximal end of a second mating contact portion of the second conductive element by a first distance. A first distal end of the first mating contact portion of the first conductive element may be spaced apart from a second distal end of the second mating contact portion of the second conductive element by a second distance that is greater than the first distance.

In some embodiments, the first and second conductive elements may form an edge-coupled pair of conductive elements adapted to carry a differential signal.

In some embodiments, the electrical connector may be a first electrical connector, the first mating contact portion may comprise a first contact region adapted to make electrical contact with a third mating contact portion of a third conductive element of a second electrical connector at a first point of contact, and the first mating contact portion may further comprise a second contact region adapted to make electrical contact with the third mating contact portion of the third conductive element of the second electrical connector at a second point of contact, the second point of contact being closer to a third distal end of the third mating contact portion than the first point of contact. In some embodiments, the first contact region may be near the first distal end of the first mating contact portion, and the second contact region may be near a midpoint between the first proximal end and the first distal end of the first mating contact portion.

In some embodiments, the first mating contact portion of the first conductive element may comprise a first beam and a second beam, and the second mating contact portion of the second conductive element may comprise a third beam and a fourth beam. In some embodiments, the first, second, third, and fourth beams may be disposed adjacent to each other in a sequence, the first beam may comprise a first contact region near the first distal end, the second beam may comprise a second contact region near the first distal end, the third beam may comprise a third contact region near the second distal end, the fourth beam may comprise a fourth contact region near the second distal end, the first beam may further comprise a fifth contact region that is farther away from the first distal end than the first contact region, the fourth beam may further comprise a sixth contact region that is farther away from the second distal end than the fourth contact region, and each mating contact portion may comprise two beams.

In another aspect, an electrical connector may comprise a housing and a plurality of conductive elements disposed in a plurality of columns, each of the plurality of conductive members comprising a mating contact portion, a contact tail, and an intermediate portion between the mating contact portion and the contact tail. The intermediate portions of the plurality of conductive elements may be disposed within the housing and the mating contact portions of the plurality of conductive elements may extend from the housing. Within each of the plurality of columns the intermediate portions of the conductive elements may comprise a plurality of pairs of conductive elements, the conductive elements of the pairs having a first width. The intermediate portions may also comprise a plurality of wider conductive elements, the wider conductive elements having a second width, wider than the first width. Adjacent pairs of the plurality of pairs may be separated by a wider conductive element. Each of the pairs may have a first edge-to-edge spacing from an adjacent wider conductor. The mating contact portions of the conductive elements of each of the pairs may be jogged to provide the first edge-to-edge spacing from the adjacent wider conductor adjacent the housing and a second edge-to-edge spacing at the distal ends of the mating contact portions.

In some embodiments, the plurality of pairs of conductive elements may comprise differential signal pairs and the plurality of wider conductive elements may comprise ground conductors.

In some embodiments, the mating contact portions of the conductive elements of each pair may comprise at least one first beam and at least one second beam; and the at least one first beam and the at least one second beam may both jog away from a center line between the at least one first beam and the at least one second beam. In some embodiments, the at least one first beam may comprise two beams and the at least one second beam may comprise two beams.

In some aspects, an improved ground structure maybe provided. The structure may include features that controls the electromagnetic energy within and/or radiating from a connector.

In some embodiments, an electrical connector may comprise a plurality of conductive elements disposed in a plurality of parallel columns, each of the plurality of conductive members comprising a mating contact portion, a contact tail, and an intermediate portion between the mating contact portion and the contact tail. The plurality of conductive elements may comprise at least a first conductive element and a second conductive element. The connector may also comprise a conductive insert adapted to make electrical connection with at least the first conductive element and second conductive element when the conductive insert is disposed in a plane that is transverse to a direction along which each of the first and second conductive elements is elongated. Such an insert may be integrated into the connector at any suitable time, including as a separable member added after the connector is manufactured as a retrofit for improved performance or as an integral portion of another component formed during connector manufacture.

In some embodiments, the first and second conductive elements may be adapted to be ground conductors, the plurality of conductive elements may further comprise at least one third conductive element that is adapted to be a signal conductor, and the conductive insert may be adapted to avoid making an electrical connection with the third conductive element when the conductive insert is disposed in the plane transverse to the direction along which each of the first and second conductive elements is elongated. In some embodiments, the conductive insert may comprise a sheet of conductive material having at least one cutout such that the third conductive element extends through the at least one cutout without making electrical contact with the conductive insert when the conductive insert is disposed in the plane transverse to the direction along which each of the first and second conductive elements is elongated.

In some embodiments, the first and second conductive elements may have a first width, the plurality of conductive elements may further comprise at least one third conductive element having a second width that is less than the first width, and the conductive insert may comprise an opening providing a clearance around the third conductive element when the conductive insert is disposed in the plane transverse to the direction along which each of the first and second conductive elements is elongated.

In some embodiments, the electrical connector may be a first electrical connector, and the conductive insert may be disposed at a mating interface between the first electrical connector and a second electrical connector and may be in physical contact with mating contact portions of the first and second conductive elements.

In some embodiments, the electrical connector may further comprise a conductive support member, the first conductive element may be disposed in a first wafer of the electrical connector and may comprise a first engaging feature extending from the first wafer in a position to engage the conductive support member, the second conductive element may be disposed in a second wafer of the electrical connector and may comprise a second engaging feature extending from the second wafer in a position to engage the conductive support member, and when the first and second engaging features engage the conductive support member, the first and second conductive elements may be electrically connected to each other via the conductive support member.

In yet other aspects, the positioning of conductive elements within different columns may be different.

In some embodiments, an electrical connector may comprise: a plurality of wafers comprising a housing having first edge and a second edge. The wafers may also comprise a plurality of conductive elements, each of the conductive elements comprising a contact tail extending through the first edge and a mating contact portion extending through the second edge and an intermediate portion joining the contact tail and the mating contact portion. The conductive elements may be arranged in an order such that the contact tails extend from the first edge at a distance from a first end of the first edge that increases in accordance with the order and the mating contact portions extend from the second edge at a distance from a first end of the second edge that increases in accordance with the order. The plurality of wafers may comprise wafers of a first type and wafers of a second type arranged in an alternating pattern of a wafer of the first type and a wafer of the second type. The plurality of conductive elements in each of the plurality of wafers of the first type may be arranged to form at least one pair. The plurality of conductive elements in each of the plurality of wafers of the second type also may be arranged to form at least one pair, corresponding to the at least one pair of wafers of the first type. The contact tails of each pair of the first type wafer may be closer to the first end of the first edge than the contact tails of the corresponding pair of the second type wafer; and the mating contact portions of each pair of the first type wafer may be further from the first end of the second edge than the mating contact portions of the corresponding pair of the second type wafer.

In some embodiments, the plurality of conductive elements in each of the plurality of wafers of the first type may be arranged to form a plurality of pairs, and the plurality of conductive elements in each of the plurality of wafers of the first type may further comprise ground conductors disposed between adjacent pairs of the plurality of pairs.

In some embodiments, the second edge may be perpendicular to the first edge.

In some embodiments, the plurality of conductive elements comprise a first plurality of conductive elements, the connector may further comprise a second plurality of conductive elements, and conductive elements of the second plurality of conductive elements may be wider than the conductive elements of the first plurality of conductive elements.

In some embodiments, the plurality of conductive elements may comprise a first plurality of conductive elements, the connector may further comprise a second plurality of conductive elements. In some embodiments, for each of the at least one pair, the conductive elements of the pair may be separated by a first distance, and a conductive element of the pair may be adjacent a conductive element of the second plurality of conductive elements and separated from the conductive element of the second plurality of conductive elements by a second distance that is greater than a first distance.

In yet other embodiments, an electrical connector may comprise a plurality of conductive elements, the plurality of conductive elements being disposed in at least a first column and a second column parallel to the first column. Each of the first column and the second column may comprise at least one pair comprising a first conductive element and a second conductive element. Each of the plurality of conductive elements may have a first end and a second end. The plurality of conductive elements may be configured such that at the first end, a first conductive element of each pair of the at least one pair in the first column electrically couples more strongly to the first conductive element of a corresponding pair of the at least one pair in the second column, and at the second end, a second conductive element of each pair of the at least one pair in the first column electrically couples more strongly to the second conductive element of the corresponding pair of the at least one pair in the second column.

In some embodiments, the first end of each of the plurality of conductive elements may comprise a contact tail, and the second end of each of the plurality of conductive elements may comprise a mating contact portion.

In some embodiments, each of the plurality of conductive elements may comprise an intermediate portion between the contact tail and the mating contact portion, and for each of the at least one pair in each of the first column and the second column, the first conductive element and the second conductive elements of the pair may be uniformly spaced over the intermediate portions of the first conductive element and the second conductive element.

In some embodiments, an electrical connector may comprise a plurality of conductive elements disposed in a column, each of the plurality of conductive members comprising a mating contact portion, a contact tail, and an intermediate portion between the mating contact portion and the contact tail, wherein the mating contact portion of at least a portion of the plurality of conductive elements may comprise a beam, the beam comprising a first contact region and a second contact region, the first contact region may comprise a first curved portion of a first depth, the second contact region may comprise a second curved portion of a second depth, and the first depth may be greater than the second depth.

In some embodiments, for each mating contact portion of the at least the portion of the plurality of conductive elements, the beam may comprise a first beam, and the mating contact portion may further comprise a second beam. In some embodiments, each second beam may comprise a single contact region.

In some embodiments, the first curved portion may have a shape providing a contact resistance of less than 1 Ohm, and the second curved portion may have a shape providing a contact resistance in excess of 1 Ohm.

In some embodiments, the plurality of conductive elements may comprise first-type conductive elements, and the column may further comprise second-type conductive elements, the first-type conductive elements being disposed in pairs with a second-type conductive element between each pair. In some embodiments, the first-type conductive elements may be signal conductors and the second type conductive elements may be ground conductors.

Other advantages and novel features will become apparent from the following detailed description of various non-limiting embodiments of the present disclosure when considered in conjunction with the accompanying figures and from the claims.

DETAILED DESCRIPTION

Figure 1:
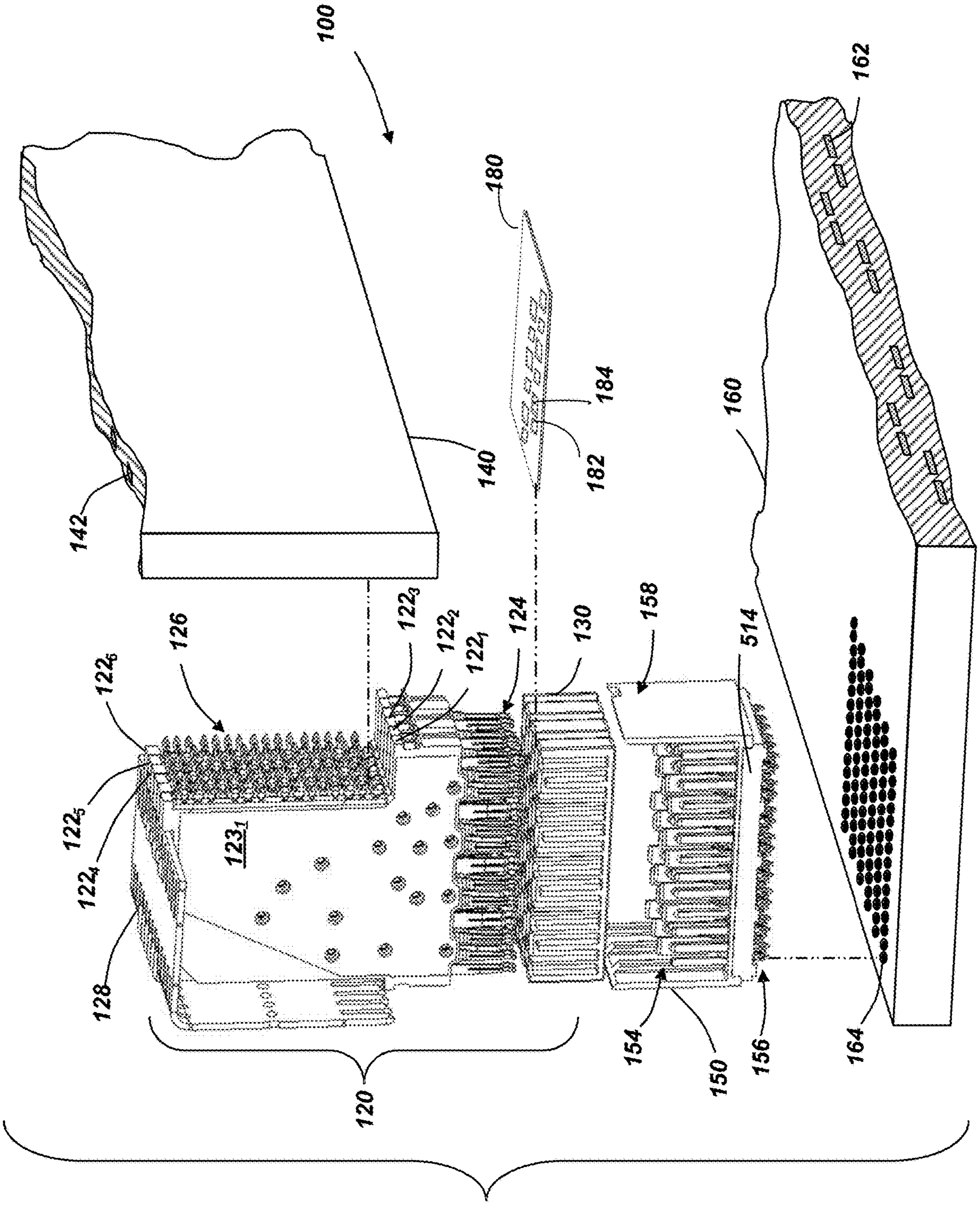
FIG. 1 is a perspective view of an illustrative electrical interconnection system comprising a backplane connector and a daughter card connector, in accordance with some embodiments.

The inventors have recognized and appreciated that various techniques may be used, either separately or in any suitable combination, to improve the performance of a high speed interconnection system.

One such technique for improving performance of a high speed electrical connector may entail configuring mating contact portions of a first connector in such a manner that, when the first connector is mated with a second connector, a first mating contact portion of the first connector is in electrical contact with an intended contact region of a second mating contact portion of the second connector, where the intended contact region is at least a certain distance away from a distal end of the second mating contact portion. The portion of the second mating contact portion between the distal end and the intended contact region is sometimes referred to as a “wipe” region. Providing sufficient wipe may help to ensure that adequate electrical connection is made between the mating contact portions even if the first mating contact portion does not reach the intended contact region of the second mating contact portion due to manufacturing or assembly variances.

However, the inventors have also recognized and appreciated that a wipe region may form an unterminated stub when electrical currents flow between mating contact portions of two mated connectors. The presence of such an unterminated stub may lead to unwanted resonances, which may lower the quality of the signals carried through the mated connectors. Therefore, it may be desirable to provide a simple, yet reliable, structure to reduce such an unterminated stub while still providing sufficient wipe to ensure adequate electrical connection.

Accordingly, in some embodiments, multiple contact regions may be provided on a first mating contact portion in a first connector so that the first mating contact portion may have at least an larger contact region and a smaller contact region, with the larger contact region being closer to a distal end of the first mating contact portion than the smaller contact region. The larger region may be adapted to reach an intended contact region on a second mating contact portion of a second connector. The smaller contact region may be adapted to make electrical contact with the second mating contact portion at a location between the intended contact region and a distal end of the second mating contact portion. In this manner, a stub length is reduced when the first and second connectors are mated with each other, for example, to include only the portion of the second mating contact portion between the distal end and the location in electrical contact with the upper contact region of the first mating contact portion. However, the smaller contact region may entail a relatively low risk of separating the larger contact region from the mating contact, which could create an unintended stub.

In some embodiments, contact regions of a first mating contact portion of a first connector may each be provided by a protruding portion, such as a "ripple" formed in the first mating contact portion. The inventors have recognized and appreciated that the dimensions and/or locations of such ripples may affect whether adequate electrical connection is made when the first connector is mating with a second connector. The inventors also have recognized and appreciated that it may simplify manufacture, and/or more increase reliability, if the contact regions are designed to have different sizes and/or contact resistances. For example, if a proximal ripple (e.g. a ripple located farther away from a distal end of the first mating contact portion) is too large relative to a distal ripple (e.g. a ripple located closer to the distal end of the first mating contact portion), the distal ripple may not make sufficient electrical contact with a second mating contact portion of the second connector because the proximal ripple may, when pressed against the second mating contract portion, cause excessive deflection of the first mating contract portion, which may lift the distal ripple away from the second mating contact portion.

Accordingly, in some embodiments, contact regions of a mating contact portion of a first connector may be configured such that a distal contact region (e.g., a contact region closer to a distal end of the mating contact portion) may protrude to a greater extent than an proximal contact region (e.g., a contact region farther away from the distal end of the mating contact portion). The difference in the extents of protrusion may depend on a distance between the distal and proximal contact regions and a desired angle of deflection of the mating contact portion when the first connector is mated with a second connector.

The inventors have further recognized and appreciated that, in a connector with one or more conductive elements adapted to be ground conductors the performance of an electrical connector system may be impacted by connections to ground conductors in the connector. Such connections may shape the electromagnetic fields inside or outside, but in the vicinity of, the electrical connector, which may in turn improve performance.

Accordingly, in some embodiments, a feature is provided to short together one or more conductive elements adapted to be ground conductors in a connector. In one implementation, such a feature comprises a conductive insert made by forming one or more cutouts in a sheet of conductive material. The cutouts may be arranged such that, when the conductive insert is disposed across a mating interface of the connector, the conductive insert is in electrical contact with at least some of the ground conductors, but not with any signal conductor. For example, the cutouts may be aligned with the signal conductors at the mating interface so that each signal conductor extends through a corresponding cutout without making electrical contact with the conductive insert. Though, alternatively or additionally, such an insert may be integrated into the connector near the contact tails.

In some connector systems, "wafers" or other subassemblies of a connector may be held together with a conductive member, sometimes called a "stiffener." In some embodiments, a lead frame used in forming the wafers may be formed with a conductive portion extending outside of the wafer in a position in which it will contact the stiffener when the wafer is attached to the stiffener. That portion may be shaped as a compliant member such that electrical contact is formed between the conductive member and the stiffener. In some embodiments, the conductive element with the projecting portion may be designed for use as a ground conductor such that the stiffener is grounded. Such a configuration may also tie together some ground conductors in different wafers, such that performance of the connector is improved.

The inventors have also recognized and appreciated that incorporating jogs into the beams of the mating contact portions of conductive elements may also lead to desirable electrical and mechanical properties of the connector system. Such a configuration may allow close spacing between signal conductors within a subassembly, with a desirable impact on performance parameters of the connector, such as crosstalk or impedance, while providing desired mechanical properties, such as mating contact portions on a small pitch, which in some embodiments may be uniform.

Such techniques may be used alone or in any suitable combination, examples of which are provided in the exemplary embodiments described below.

FIG. 1 shows an illustrative electrical interconnection system 100 having two connectors, in accordance with some embodiments. In this example, the electrical interconnection system 100 includes a daughter card connector 120 and a backplane connector 150 adapted to mate with each other to create electrically conducting paths between a backplane 160 and a daughter card 140. Though not expressly shown, the interconnection system 100 may interconnect multiple daughter cards having similar daughter card connectors that mate to similar backplane connectors on the backplane 160. Accordingly, aspects of the present disclosure are not limited to any particular number or types of subassemblies connected through an interconnection system. Furthermore, although the illustrative daughter card connector 120 and the illustrative backplane connector 150 form a right-angle connector, it should be appreciated that aspects of the present disclosure are not limited to the use of right-angle connectors. In other embodiments, an electrical interconnection system may include other types and combinations of connectors, as the inventive concepts disclosed herein may be broadly applied in many types of electrical connectors, including, but not limited to, right angle connectors, orthogonal connectors, mezzanine connectors, card edge connectors, cable connectors and chip sockets.

In the example shown in FIG. 1, the backplane connector 150 and the daughter connector 120 each contain conductive elements. The conductive elements of the daughter card connector 120 may be coupled to traces (of which a trace 142 is numbered), ground planes, and/or other conductive elements within the daughter card 140. The traces may carry electrical signals, while the ground planes may provide reference levels for components on the daughter card 140. Such a ground plane may have a voltage that is at earth ground, or positive or negative with respect to earth ground, as any voltage level maybe used as a reference level.

Similarly, conductive elements in the backplane connector 150 may be coupled to traces (of which trace 162 is numbered), ground planes, and/or other conductive elements within the backplane 160. When the daughter card connector 120 and the backplane connector 150 mate, the conductive elements in the two connectors complete electrically conducting paths between the conductive elements within the backplane 160 and the daughter card 140.

In the example of FIG. 1, the backplane connector 150 includes a backplane shroud 158 and a plurality of conductive elements that extend through a floor 514 of the backplane shroud 158 with portions both above and below the floor 514. The portions of the conductive elements that extend above the floor 514 form mating contacts, shown collectively as mating contact portions 154, which are adapted to mate with corresponding conductive elements of the daughter card connector 120. In the illustrated embodiment, the mating contacts portions 154 are in the form of blades, although other suitable contact configurations may also be employed, as aspects of the present disclosure are not limited in this regard.

The portions of the conductive elements that extend below the floor 514 form contact tails, shown collectively as contact tails 156, which are adapted to be attached to backplane 160. In the example shown in FIG. 1, the contact tails 156 are in the form of press fit, "eye of the needle," compliant sections that fit within via holes, shown collectively as via holes 164, on the backplane 160. However, other configurations may also be suitable, including, but not limited to, surface mount elements, spring contacts, and solderable pins, as aspects of the present disclosure are not limited in this regard.

In the embodiment illustrated in FIG. 1, the daughter card connector 120 includes a plurality of wafers $\mathbf{122}_1$, $\mathbf{122}_1$, . . . $\mathbf{122}_6$ coupled together, each wafer having a housing (e.g., a housing $\mathbf{123}_1$ of the wafer $\mathbf{122}_1$) and a column of conductive elements disposed within the housing. The housings may be partially or totally formed of an insulative material. Portions of the conductive elements in the column may be held within the insulative portions of the housing for a wafer, Such a wafer may be formed by insert molding insulative material around the conductive elements. If conductive or lossy material is to be included in the housing, a multi-shot molding operation may be used, with the conductive or lossy material being applied in a second or subsequent shot.

As explained in greater detail below in connection with FIG. 2, some conductive elements in the column may be adapted for use as signal conductors, while some other conductive elements may be adapted for use as ground conductors. The ground conductors may be employed to reduce crosstalk between signal conductors or to otherwise control one or more electrical properties of the connector. The ground conductors may perform these functions based on their shape and/or position within the column of conductive elements within a wafer or position within an array of conductive elements formed when multiple wafers are arranged side-by-side.

The signal conductors may be shaped and positioned to carry high speed signals. The signal conductors may have characteristics over the frequency range of the high speed signals to be carried by the conductor. For example, some high speed signals may include frequency components of up to 12.5 GHz, and a signal conductor designed for such signals may present a substantially uniform impedance of 50 Ohms+/−10% at frequencies up to 12.5 GHz. Though, it should be appreciated that these values are illustrative rather than limiting. In some embodiments, signal conductors may have an impedance of 85 Ohms or 100 Ohms. Also, it should be appreciated that other electrical parameters may impact signal integrity for high speed signals. For example, uniformity of insertion loss over the same frequency ranges may also be desirable for signal conductors.

The different performance requirements may result in different shapes of the signal and ground conductors. In some embodiments, ground conductors may be wider than signal conductors. In some embodiments, a ground conductor may be coupled to one or more other ground conductors while each signal conductor may be electrically insulated from other signal conductors and the ground conductors. Also, in some embodiments, the signal conductors may be positioned in pairs to carry differential signals whereas the ground conductors may be positioned to separate adjacent pairs.

In the illustrated embodiment, the daughter card connector 120 is a right angle connector and has conductive elements that traverse a right angle. As a result, opposing ends of the conductive elements extend from perpendicular edges of the wafers $\mathbf{122}_1$, $\mathbf{122}_1$, . . . $\mathbf{122}_6$. For example, contact tails of the conductive elements of the wafers $\mathbf{122}_1$, $\mathbf{122}_1$, . . . $\mathbf{122}_6$, shown collectively as contact tails 126, extend from side edges of the wafers $\mathbf{122}_1$, $\mathbf{122}_1$, . . . $\mathbf{122}_6$ and are adapted to be connected to the daughter card 140. Opposite from the contact tails 126, mating contacts of the conductive elements, shown collectively as mating contact portions 124, extend from bottom edges of the wafers $\mathbf{122}_1$, $\mathbf{122}_1$, . . . $\mathbf{122}_6$ and are adapted to be connected corresponding conductive elements in the backplane connector 150. Each conductive element also has an intermediate portion between the mating contact portion and the contact tail, which may be enclosed by, embedded within or otherwise held by the housing of the wafer (e.g., the housing $\mathbf{123}_1$ of the wafer $\mathbf{122}_1$).

The contact tails 126 may be adapted to electrically connect the conductive elements within the daughter card connector 120 to conductive elements (e.g., the trace 142) in the daughter card 140. In the embodiment illustrated in FIG. 1, contact tails 126 are press fit, "eye of the needle" contacts adapted to make an electrical connection through via holes in the daughter card 140. However, any suitable attachment mechanism may be used instead of, or in addition to, via holes and press fit contact tails.

In the example illustrated in FIG. 1, each of the mating contact portions 124 has a dual beam structure configured to mate with a corresponding one of the mating contact portions 154 of the backplane connector 150. However, it should be appreciated that aspects of the present disclosure are not limited to the use of dual beam structures. For example, as discussed in greater detail below in connection with FIG. 2, some or all of the mating contact portions 124 may have a triple beam structure. Other types of structures, such as single beam structures, may also be suitable. Furthermore, as discussed in greater detail below in connection with FIGS. 7A-B and 9A-B, a mating contact portion may have a wavy shape adapted to improve one or more electrical and/or mechanical properties and thereby improve the quality of a signal coupled through the mating contact portion.

In the example of FIG. 1, some conductive elements of the daughter card connector 120 are intended for use as signal conductors, while some other conductive elements of the daughter card connector 120 are intended for use as ground conductors. The signal conductors may be grouped in pairs that are separated by the ground conductors, in a configuration suitable for carrying differential signals. Such pairs may be designated as "differential pairs", as understood by one of skill in the art. For example, though other uses of the conductive elements may be possible, a differential pair may be identified based on preferential coupling between the conductive elements that make up the pair. Electrical characteristics of a pair of conductive elements, such as impedance, that make the pair suitable for carrying differential signals may provide an alternative or additional method of identifying the pair as a differential pair. Furthermore, in a connector with differential pairs, ground conductors may be identified by their positions relative to the differential pairs. In other instances, ground conductors may be identified by shape and/or electrical characteristics. For example, ground conductors may be relatively wide to provide low inductance, which may be desirable for providing a stable reference potential, but may provide an impedance that is undesirable for carrying a high speed signal.

While a connector with differential pairs is shown in FIG. 1 for purposes of illustration, it should be appreciated that embodiments are possible for single-ended use in which conductive elements are evenly spaced without designated ground conductors separating designated differential pairs, or with designated ground conductors between adjacent designated signal conductors.

In the embodiment illustrated in FIG. 1, the daughter card connector 120 includes six wafers $122_1$, $122_1$, . . . $122_6$, each of which has a plurality of pairs of signal conductors and a plurality ground conductors arranged in a column in an alternating fashion. Each of the wafers $122_1$, $122_2$, . . . $122_6$ is inserted into a front housing 130 such that the mating contact portions 124 are inserted into and held within openings in the front housing 130. The openings in the front housing 130 are positioned so as to allow the mating contacts portions 154 of the backplane connector 150 to enter the openings in the front housing 130 and make electrical connections with the mating contact portions 124 when the daughter card connector 120 is mated with the backplane connector 150.

In some embodiments, the daughter card connector 120 may include a support member instead of, or in addition to, the front housing 130 to hold the wafers $122_1$, $122_2$, . . . $122_6$. In the embodiment shown in FIG. 1, a stiffener 128 is used to support the wafers $122_1$, $122_2$, . . . $122_6$. In some embodiments, stiffener 128 may be formed of a conductive material. The stiffener 128 may be made of stamped metal, or any other suitable material, and may be stamped with slots, holes, grooves and/or any other features for engaging a plurality of wafers to support the wafers in a desired orientation. However, it should be appreciated that aspects of the present disclosure are not limited to the use of a stiffener. Furthermore, although the stiffener 128 in the example of FIG. 1 is attached to upper and side portions of the plurality of wafers, aspects of the present disclosure are not limited to this particular configuration, as other suitable configurations may also be employed. Also, it should be appreciated that FIG. 1 represents a portion of an interconnection system. For example, front housing 130 and wafers $122_1$, $122_2$, . . . $122_6$ may be regarded as a module, and multiple such modules may be used to form a connector. In embodiments in which multiple modules are used, stiffener 128 may serve as a support member for multiple such modules, holding them together as one connector.

In some further embodiments, each of the wafers $122_1$, $122_2$, . . . $122_6$ may include one or more features for engaging the stiffener 128. Such features may function to attach the wafers $122_1$, $122_2$, . . . $122_6$ to the stiffener 128, to locate the wafers with respect to one another, and/or to prevent rotation of the wafers. For instance, a wafer may include an attachment feature in the form of a protruding portion adapted to be inserted into a corresponding slot, hole, or groove formed in the stiffener 128. Other types of attachment features may also be suitable, as aspects of the present disclosure are not limited in this regard.

In some embodiments, stiffener 128 may, instead of or in addition to providing mechanical support, may be used to alter the electrical performance of a connector. For example, a feature of a wafer may also be adapted to make an electrical connection with the stiffener 128. Examples of such connection are discussed in greater detail below in connection with FIGS. 2-3. For instance, a wafer may include one or more shorting features for electrically connecting one or more ground conductors in the wafer to the stiffener 128. In this manner, the ground conductors of the wafers $122_1$, $122_1$, . . . $122_6$ may be electrically connected to each other via the stiffener 128.

Such a connection may impact the signal integrity of the connector by changing a resonant frequency of the connector. A resonant frequency may be increased, for example, such that it occurs at a frequency outside of a desired operating range of the connector. As an example, coupling between ground conductors and the stiffener 128 may, alone or in combination with other design features, raise the frequency of a resonance to be in excess of 12.5 GHz, 15 GHz or some other frequency selected based on the desired speed of signals to pass through the connector.

Any suitable features may be used instead of or in addition to connecting ground conductors to the stiffener 128. As an example, in the embodiment shown in FIG. 1, the daughter card connector 120 further includes an insert 180 disposed at a mating interface between the daughter card connector 120 and the backplane connector 150. For instance, the insert 180 may be disposed across a top surface of the front housing 130 and may include one or more openings (e.g., openings 182 and 184) adapted to receive corresponding ones of the mating contact portions 124 of the daughter card connector 120. The openings may be shaped and positioned such that the insert 180 is in electrical contact with mating contact portions of ground conductors, but not with mating contact portions of signal conductors. In this manner, the ground conductors of the wafers $122_1$, $122_1$, . . . $122_6$ may be electrically connected to each other via the insert 180 (in addition to, or instead of, being connected via the stiffener 128).

While examples of specific arrangements and configurations are shown in FIG. 1 and discussed above, it should be appreciated that such examples are provided solely for purposes of illustration, as various inventive concepts of the present disclosure are not limited to any particular manner of implementation. For example, aspects of the present disclosure are not limited to any particular number of wafers in a connector, nor to any particular number or arrangement of signal conductors and ground conductors in each wafer of the connector. Moreover, though it has been described that ground conductors may be connected through conductive members, such as stiffener 128 or insert 180, which may be metal components, the interconnection need not be through metal structures nor is it a requirement that the electrical coupling between ground conductors be fully conductive. Partially conductive or lossy members may be used instead or in addition to metal members. Either or both of stiffener 128 and insert 180 may be made of metal with a coating of lossy material thereon or may be made entirely from lossy material.

Any suitable lossy material may be used. Materials that conduct, but with some loss, over the frequency range of interest are referred to herein generally as "lossy" materials. Electrically lossy materials can be formed from lossy dielectric and/or lossy conductive materials. The frequency range of interest depends on the operating parameters of the system in which such a connector is used, but will generally have an upper limit between about 1 GHz and 25 GHz, though higher frequencies or lower frequencies may be of interest in some applications. Some connector designs may have frequency ranges of interest that span only a portion of this range, such as 1 to 10 GHz or 3 to 15 GHz or 3 to 6 GHz.

Electrically lossy material can be formed from material traditionally regarded as dielectric materials, such as those that have an electric loss tangent greater than approximately 0.003 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain particles or regions that are sufficiently dispersed that they do not provide high conductivity or otherwise are prepared with properties that lead to a relatively weak bulk conductivity over the frequency range of interest. Electrically lossy materials typically have a conductivity of about 1 siemens/meter to about $6.1\times10^7$ siemens/meter, preferably about 1 siemens/meter to about $1\times10^7$ siemens/meter and most preferably about 1 siemens/meter to about 30,000 siemens/meter. In some embodiments material with a bulk conductivity of between about 10 siemens/meter and about 100 siemens/meter may be used. As a specific example, material with a conductivity of about 50 siemens/meter may be used. Though, it should be appreciated that the conductivity of the material may be selected empirically or through electrical simulation using known simulation tools to determine a suitable conductivity that provides both a suitably low cross talk with a suitably low insertion loss.

Electrically lossy materials may be partially conductive materials, such as those that have a surface resistivity between 1 Ω/square and 106 Ω/square. In some embodiments, the electrically lossy material has a surface resistivity between 1 Ω/square and 103 Ω/square. In some embodiments, the electrically lossy material has a surface resistivity between 10 Ω/square and 100 Ω/square. As a specific example, the material may have a surface resistivity of between about 20 Ω/square and 40 Ω/square.

In some embodiments, electrically lossy material is formed by adding to a binder a filler that contains conductive particles. In such an embodiment, a lossy member may be formed by molding or otherwise shaping the binder into a desired form. Examples of conductive particles that may be used as a filler to form an electrically lossy material include carbon or graphite formed as fibers, flakes or other particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure or can otherwise be used to position the filler material. In some embodiments, the binder may be a thermoplastic material such as is traditionally used in the manufacture of electrical connectors to facilitate the molding of the electrically lossy material into the desired shapes and locations as part of the manufacture of the electrical connector. Examples of such materials include LCP and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Ticona. A lossy material, such as lossy conductive carbon filled adhesive preform, such as those sold by Techfilm of Billerica, Massachusetts, US may also be used. This preform can include an epoxy binder filled with carbon particles. The binder surrounds carbon particles, which acts as a reinforcement for the preform. Such a preform may be inserted in a wafer to form all or part of the housing. In some embodiments, the preform may adhere through the adhesive in the preform, which may be cured in a heat treating process. In some embodiments, the adhesive in the preform alternatively or additionally may be used to secure one or more conductive elements, such as foil strips, to the lossy material.

Various forms of reinforcing fiber, in woven or nonwoven form, coated or non-coated may be used. Non-woven carbon fiber is one suitable material. Other suitable materials, such as custom blends as sold by RTP Company, can be employed, as the present invention is not limited in this respect.

In some embodiments, a lossy member may be manufactured by stamping a preform or sheet of lossy material. For example, insert 180 may be formed by stamping a preform as described above with an appropriate patterns of openings. Though, other materials may be used instead of or in addition to such a preform. A sheet of ferromagnetic material, for example, may be used.

Though, lossy members also may be formed in other ways. In some embodiments, a lossy member may be formed by interleaving layers of lossy and conductive material, such as metal foil. These layers may be rigidly attached to one another, such as through the use of epoxy or other adhesive, or may be held together in any other suitable way. The layers may be of the desired shape before being secured to one another or may be stamped or otherwise shaped after they are held together.

Figure 2:
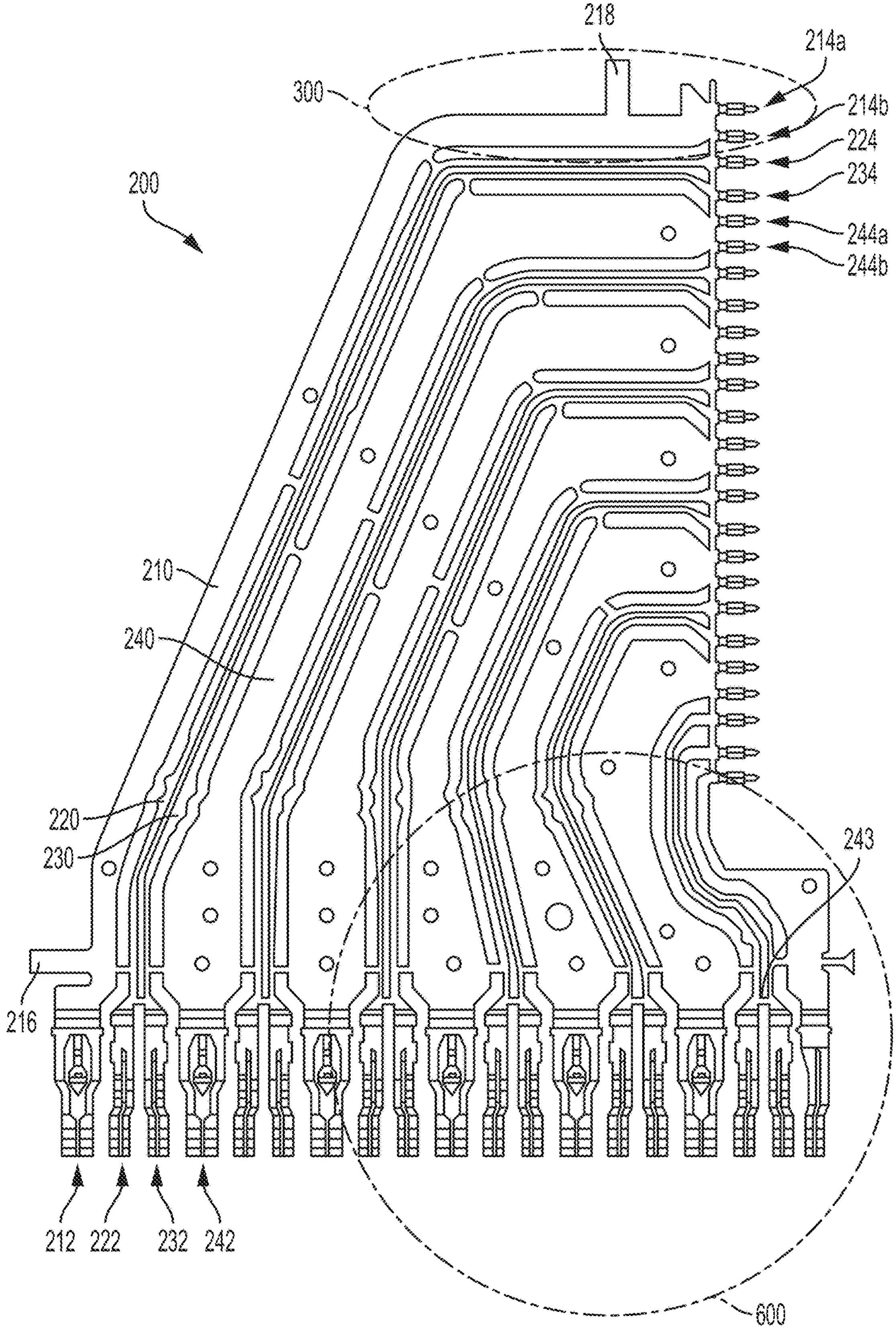
FIG. 2 is a plan view of an illustrative lead frame suitable for use in a wafer of the daughter card connector of FIG. 1, in accordance with some embodiments.

FIG. 2 shows a plan view of an illustrative lead frame 200 suitable for use in a wafer of a daughter card connector (e.g., the wafer $\mathbf{122}_1$ of the daughter card connector 120 shown in FIG. 1), in accordance with some embodiments. In this example, the lead frame 200 includes a plurality of conductive elements arranged in a column, such as conductive elements 210, 220, 230, and 240. In some embodiments, such a lead frame may be made by stamping a single sheet of metal to form the column of conductive elements, and may be enclosed in an insulative housing (not shown) to form a wafer (e.g., the wafer $122_1$ shown in FIG. 1) suitable for use in a daughter card connector.

In some embodiments, separate conductive elements may be formed in a multi-step process. For example, it is known in the art to stamp multiple lead frames from a strip of metal and then mold an insulative material forming a housing around portions of the conductive elements, thus formed. To facilitate handling, though, the lead frame may be stamped in a way that leaves tie bars between adjacent conductive elements to hold those conductive elements in place. Additionally, the lead frame may be stamped with a carrier strip, and tie bars between the carrier strip and conductive elements. After the housing is molded around the conductive elements, locking them in place, a punch may be used to sever the tie bars. However, initially stamping the lead frame with tie bars facilitates handling. FIG. 2 illustrates a lead frame 200 with tie bars, such as tie bar 243, but a carrier strip is not shown.

Each conductive element of the illustrative lead frame 200 may have one or more contact tails at one end and a mating contact portion at the other end. As discussed above in connection with FIG. 1, the contact tails may be adapted to be attached to a printed circuit board or other substrate (e.g., the daughter card 140 shown in FIG. 1) to make electrical connections with corresponding conductive elements of the substrate. The mating contact portions may be adapted to make electrical connections to corresponding mating contact portions of a mating connector (e.g., the backplane connector 150 shown in FIG. 1)

In the embodiment shown in FIG. 2, some conductive elements, such as conductive elements 210 and 240, are adapted for use as ground conductors and are relatively wide. As such, it may be desirable to provide multiple contact tails for each of the conductive elements 210 and 240, such as contact tails 214*a* and 214*b* for the conductive element 210, and contact tails 244*a* and 244*b* for the conductive element 240.

In some embodiments, it may be desirable to provide signal and/or ground conductors with mating contact portions with multiple points of contact spaced apart in a direction that corresponds to an elongated dimension of the conductive element. In some embodiments, such multiple points of contact may be provided by a multi-beam structure using beams of different length. Such a contact structure may be provided in any suitable way, including by shaping beams forming the mating contact portions to each provide multiple points of contact at different distances from a distal end of the beam or by providing a mating contact portion with multiple beams of different length. In some embodiments, different techniques may be used in the same connector. As a specific example, in some embodiments, signal conductors may be configured to provide points of contact by forming at least two contact regions on the same beam and ground conductors may be configured to provide points of contact using beams of different length.

In the example of FIG. 2 a triple beam mating contact portion for each of the conductive elements 210 and 240, such as mating contact portion 212 for the conductive element 210, and mating contact portion 242 for the conductive element 240, is used to provide multiple points of contact for ground conductors. However, it should be appreciated that other types of mating contact portion structures (e.g., a single beam structure or a dual beam structure) may also be suitable for each ground conductor.

In the embodiment shown in FIG. 2, other conductive elements, such as conductive elements 220 and 230, are adapted for use as signal conductors and are relatively narrow. As such, the conductive elements 220 and 230 may have only one contact tail each, respectively, contact tail 224 and contact tail 234. In this example, the signal conductors are configured as an edge coupled differential pair. Also, each of the conductive elements 220 and 230 has a dual beam mating contact portion, such as mating contact portion 222 for the conductive element 220, and mating contact portion 232 for the conductive element 230. Multiple points of contact separated along the elongated dimension of the mating contact portion may be achieved by shaping one or more of the beams with two or more contact regions. Such a structure is shown in greater detail, for example, in FIGS. 7A, 7B, 8A, 8B, 8C, and 8D. Again, it should be appreciated that other numbers of contact tails and other types of mating contact portion structures may also be suitable for signal conductors.

Other conductive elements in lead frame 200, though not numbered, may similarly be shaped as signal conductors or ground conductors. Various inventive features relating to mating contact portions are described in greater detail below in connection with FIG. 6, which shows an enlarged view of the region of the lead frame 200 indicated by the dashed circle in FIG. 2.

In the embodiment shown in FIG. 2, the lead frame 200 further includes two features, 216 and 218, either or both of which may be used for engaging one or more other members of a connector. For instance, as discussed above in connection with FIG. 1, such a feature may be provided to electrically couple a conductive element of the lead frame 200 to the stiffener 128. In this example, each of the features 216 and 218 is in the form of a metal tab protruding from a ground conductor 210, and is capable of making an electrical connection between the ground conductor 210 and the stiffener 128. Though, the features may be bent or otherwise formed to create a compliant structure that presses against stiffener 128 when a wafer encompassing lead from 200 is attached to the stiffener.

Figure 3:
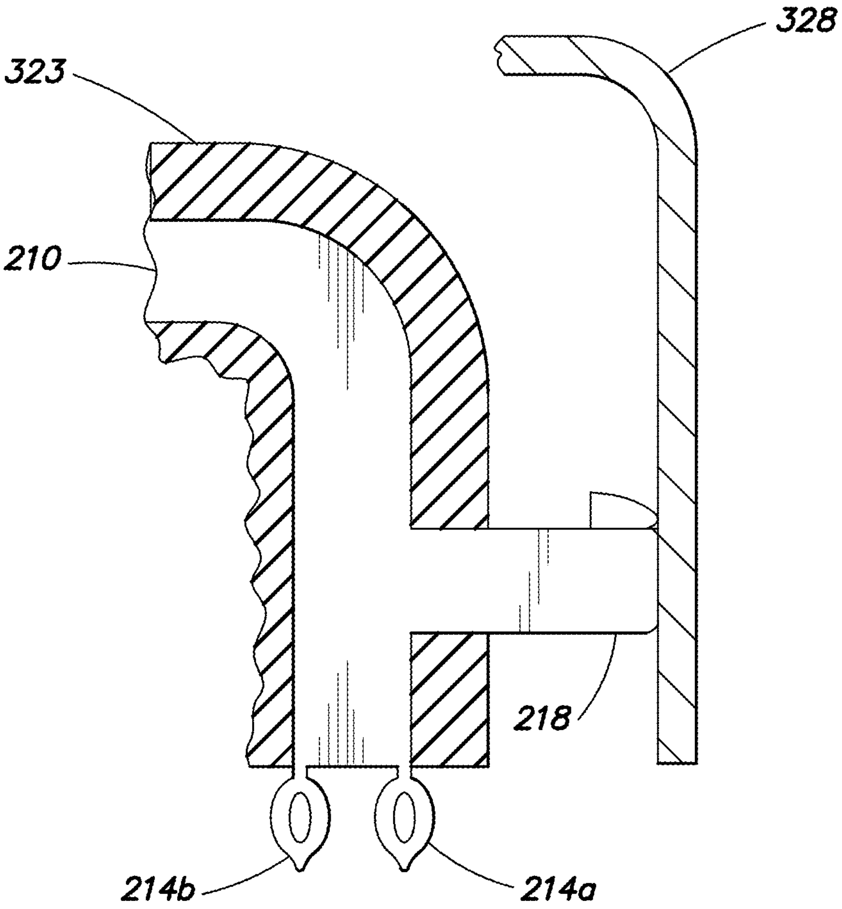
FIG. 3 is an enlarged view of region 300 of the illustrative lead frame shown in FIG. 2, showing a feature for shorting a ground conductor with a support member of a connector, in accordance with some embodiments.

FIG. 3 shows an enlarged view, partially cut away, of the region of the lead frame 200 indicated by the dashed oval 300 in FIG. 2, in accordance with some embodiments. In this view, the lead frame 200 is enclosed by a wafer housing 323 made of a suitable insulative material. The resulting wafer is installed in a connector having a stiffener 328, a cross section of which is also shown in FIG. 3. The stiffener 328 may be similar to the stiffener 128 in the example shown in FIG. 1.

In the embodiment shown in FIG. 3, the feature 218 of the lead frame 200 is in the form of a bent-over spring tab adapted to press against the stiffener 328. As discussed above in connection with FIG. 1, such a feature may allow ground conductors of different wafers to be electrically connected to each other via a stiffener, thereby impacting resonances with can change electrical characteristics of the connector, such as insertion loss, at frequencies within a desired operating range of the connector. Alternatively or additionally, coupling the stiffener to a conductive element that is in turn grounded may reduce radiation from or through the stiffener, which may in turn improve performance of the connector system, The spring force exerted by the feature 218 may facilitate electrical connection between the ground conductor 210 and the stiffener 328. However, it should be appreciated that the feature 218 may take any other suitable form, as aspects of the present disclosure are not limited to the use of a spring tab for electrically connecting a ground conductor and a stiffener. For example, the feature may be a tab inserted into a portion of stiffener 328. A connection may be formed through interference fit. In some embodiments, stiffener 328 may be molded of or contain portions formed of a lossy polymer material, and an interference fit may be created between feature 218 and the lossy polymer. Though, in other embodiments, it is not a requirement that feature 218 make a mechanical connection to stiffener 328. In some embodiments, capacitive or other type of coupling may be used.

In the embodiment illustrated in FIG. 3, ground conductors in multiple wafers within a connector module are shown connected to a common ground structure, here stiffener 328, The common ground structure may similarly be coupled to ground conductors in other connector modules (not shown), Using the technique illustrated in FIG. 3, these connections are made adjacent one end of the conductor. In this example, the contact is made near contact tails of the conductor. In some embodiments, ground conductors within a connector alternatively or additionally may be coupled to a common ground structure at other locations along the length of the ground conductors.

In some embodiments, connection at other locations may be made by features extending from the ground conductor, such as feature 216 (FIG. 2). In other embodiments, other types of connection to a common ground structure may be made, such as by using an insert 180 (FIG. 1).

Figure 4:
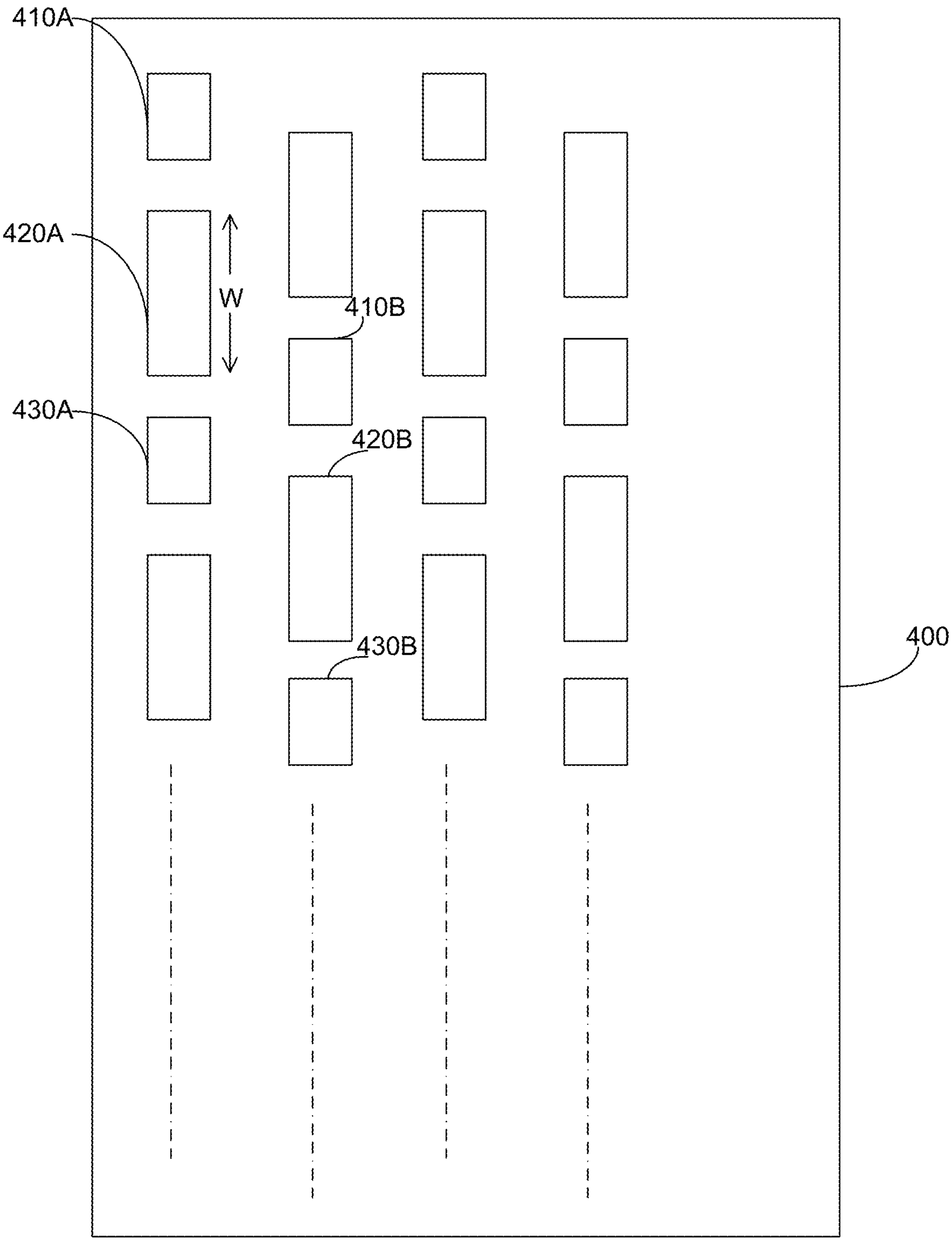
FIG. 4 is a plan view of an illustrative insert suitable for use at a mating interface of a daughter card connector to short together one or more ground conductors, in accordance with some embodiments.

FIG. 4 shows an illustrative insert 400 suitable for use at or near an end of the conductive elements within a connector to electrically connect ground conductors. In this example, insert 400 is adapted for use near a mating interface of a daughter card connector to short together one or more ground conductors of the daughter card connector, in accordance with some embodiments. For instance, with reference to the example shown in FIG. 1, the insert 400 may be used as the insert 180 and may be disposed across the top surface of the front housing 130 of the daughter card connector 120. Insert 400 may be made of any suitable material. For example, in some embodiments, insert 400 may be stamped from a metal sheet, but in other embodiments, insert 400 may include lossy material.

In the embodiment shown in FIG. 4, the insert 400 includes a plurality of openings adapted to receive corresponding mating contact portions of a daughter card connector. For example, the plurality of openings may be arranged in a plurality of columns, each column corresponding to a wafer in the daughter card connector. As a more specific example, the insert 400 may include openings 410A, 420A, 430A, . . . , which are arranged in a column and adapted to receive mating contact portions 212, 222, 232, . . . of the illustrative lead frame 200 shown in FIG. 2.

In some embodiments, the openings of the insert 400 may be shaped and positioned such that the insert 400 is in electrical contact with mating contact portions of ground conductors, but not with mating contact portions of signal conductors. For instance, the openings 410A and 430A may be adapted to receive and make electrical connection with, respectively, the mating contact portions 212 and 242 shown in FIG. 2. On the other hand, the opening 420A may be adapted to receive both of the mating contact portions 222 and 232 shown in FIG. 2, but without making electrical connection with either of the mating contact portions 222 and 232. For instance, the opening 420A may have a width w that is selected to accommodate both of the mating contact portions 222 and 232 with sufficient clearance to avoid any contact between the insert 400 and either of the contact portions 222 and 232.

Similarly, openings 410B and 430B of the insert 400 may be adapted to receive and make electrical connection with mating contact portions of ground conductors in an anther wafer, and opening 420B of the insert 400 may be adapted to receive mating contact portions of signal conductors in that wafer. The connections, in some embodiments, may be made by sizing openings adapted to receive ground conductors to be approximately the same size as the ground conductors in one or more dimensions. The openings may be the same as or slightly smaller than the ground conductors, creating an interference fit. Though, in some embodiments, the openings may be slightly larger than the ground conductors. In such embodiments, one side of the ground conductors may contact the insert. Though, even if no contact is made, the ground conductor may be sufficiently close to the insert for capacitive or other indirect coupling. In yet other embodiments, insert 400 may be formed with projections or other features that extend into the openings adapted to receive ground conductors. In this way, the openings may have nominal dimensions larger than those of the ground conductors, facilitating easy insertion, yet contact may be made between the ground conductor and the insert. Regardless of the specific contact mechanism, ground conductors in different wafers may be electrically connected to each other via the insert 400, thereby providing a more uniform reference level across the different wafers.

Although FIG. 4 shows an illustrative insert having a specific arrangement of openings, it should be appreciated that aspects of the present disclosure are not limited in this respect, as other arrangements of openings having other shapes and/or dimensions may also be used to short together ground conductors in a connector.

Moreover, it should be appreciated that insert 400 may be integrated into a connector at any suitable time. Such an insert may, for example, be integrated into the connector as part of its manufacture. For example, if insert 400 is used like insert 180 (FIG. 1), the insert may be placed over front housing 130 before wafers are inserted into the front housing. Such an approach facilitates retrofit of a connector system for higher performance without changing the design of existing components of the connector system. Accordingly, a user of electrical connectors may alter the performance characteristics of connectors by incorporating an insert. This modification may be done either before or after the connectors are attached to a printed circuit board or otherwise put into use.

Though, a manufacturer of electrical connectors may incorporate such an insert into connectors before they are shipped to customers. Such an approach may allow existing manufacturing tools to be used in the production of connectors that support higher data speeds. Though, in other embodiments, an insert 400 may be integrated into another component of a connector. For example, front housing 130 (FIG. 1) may be molded around an insert.

Figure 5:
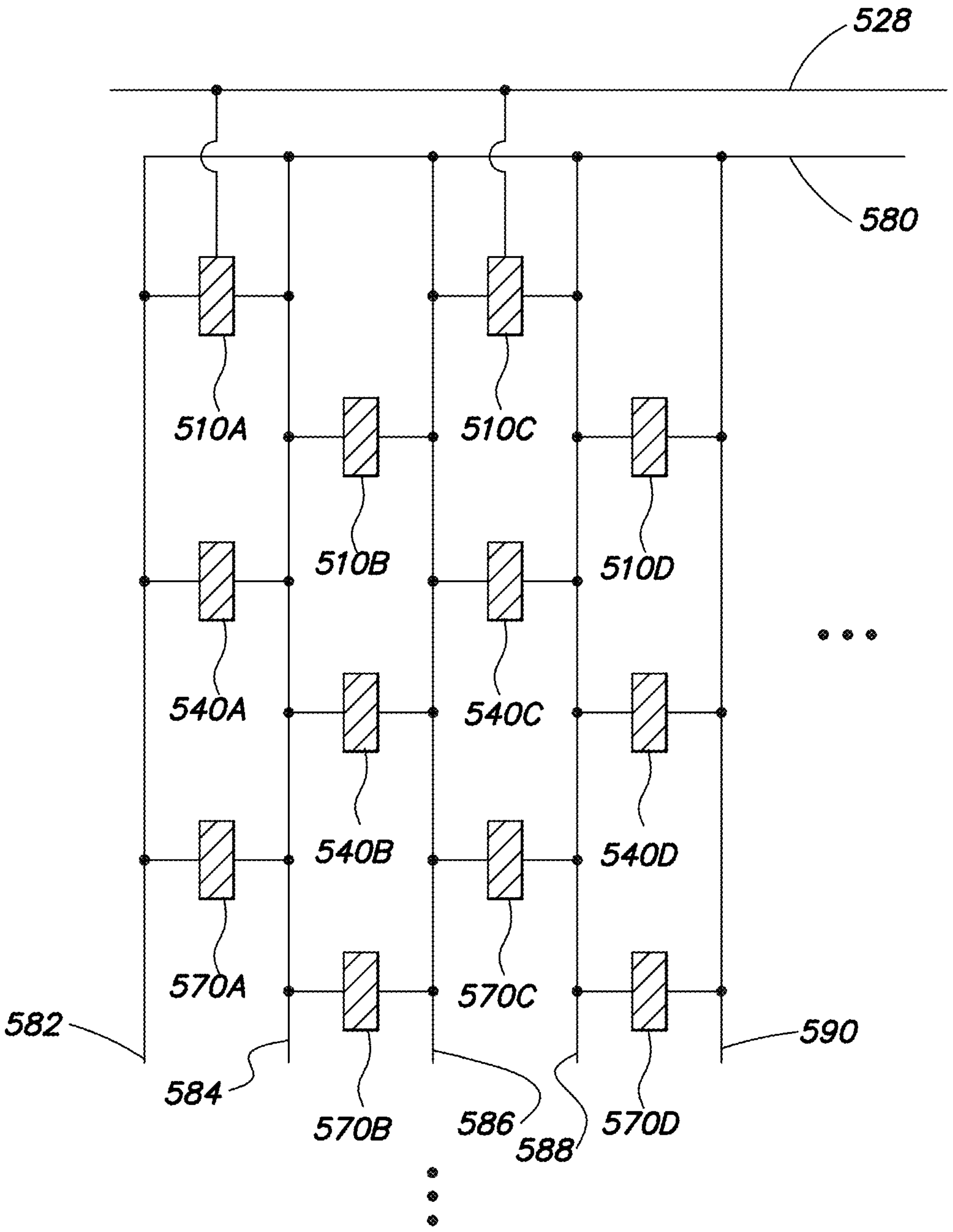
FIG. 5 is a schematic diagram illustrating electrical connections between ground conductors and other conductive members of a connector, in accordance with some embodiments.

Regardless of when and how an insert is integrated into a connector, the presence of an insert may improve the performance of the connector for carrying high speed signals. FIG. 5 is a schematic diagram illustrating electrical connections between ground conductors and other conductive members of a connector, in accordance with some embodiments. For example, the connector may be the illustrative daughter card connector 120 shown in FIG. 1, where the ground conductors may be electrically connected to the stiffener 128 and insert 180.

In the embodiment shown in FIG. 5, the connector includes a plurality of conductive elements arranged in a plurality of parallel columns. Each column may correspond to a wafer installed in the connector (e.g., the wafers $\mathbf{122}_1$, $\mathbf{122}_2$, . . . , $\mathbf{122}_6$ shown in FIG. 1). Each column may include pairs of signal conductors separated by ground conductors. However, for clarity, only ground conductors are shown in FIG. 5. For instance, the connector may include ground conductors 510A, 540A, 570A, . . . arranged in a first column, ground conductors 510B, 540B, 570B, . . . arranged in a second column, ground conductors 510C, 540C, 570C, . . . arranged in a third column, ground conductors 510D, 540D, 570D, . . . arranged in a fourth column, and so on.

In some embodiments, ground conductors of the connector may be electrically connected to various other conductive members, which are represented as lines in FIG. 5. For example, a stiffener (e.g., the stiffener 128 shown in FIG. 1), represented as line 528, may be electrically connected to an outer ground conductor of every other wafer, such as the ground conductors 510A and 510C. As another example, an insert (e.g., the insert 180 shown in FIG. 1), represented as a collection of lines 580, 582, 584, 586, 588, 590, . . . , may be electrically connected to all ground conductors of the connector. Thus, in this embodiment, all ground conductors may be shorted together, which may provide desirable electrical properties, such as reduced insertion loss over an intended operating frequency range for a high speed conductor. However, it should be appreciated that aspects of the present disclosure are not limited to use of conductive members for shorting together ground conductors.

Figure 6:
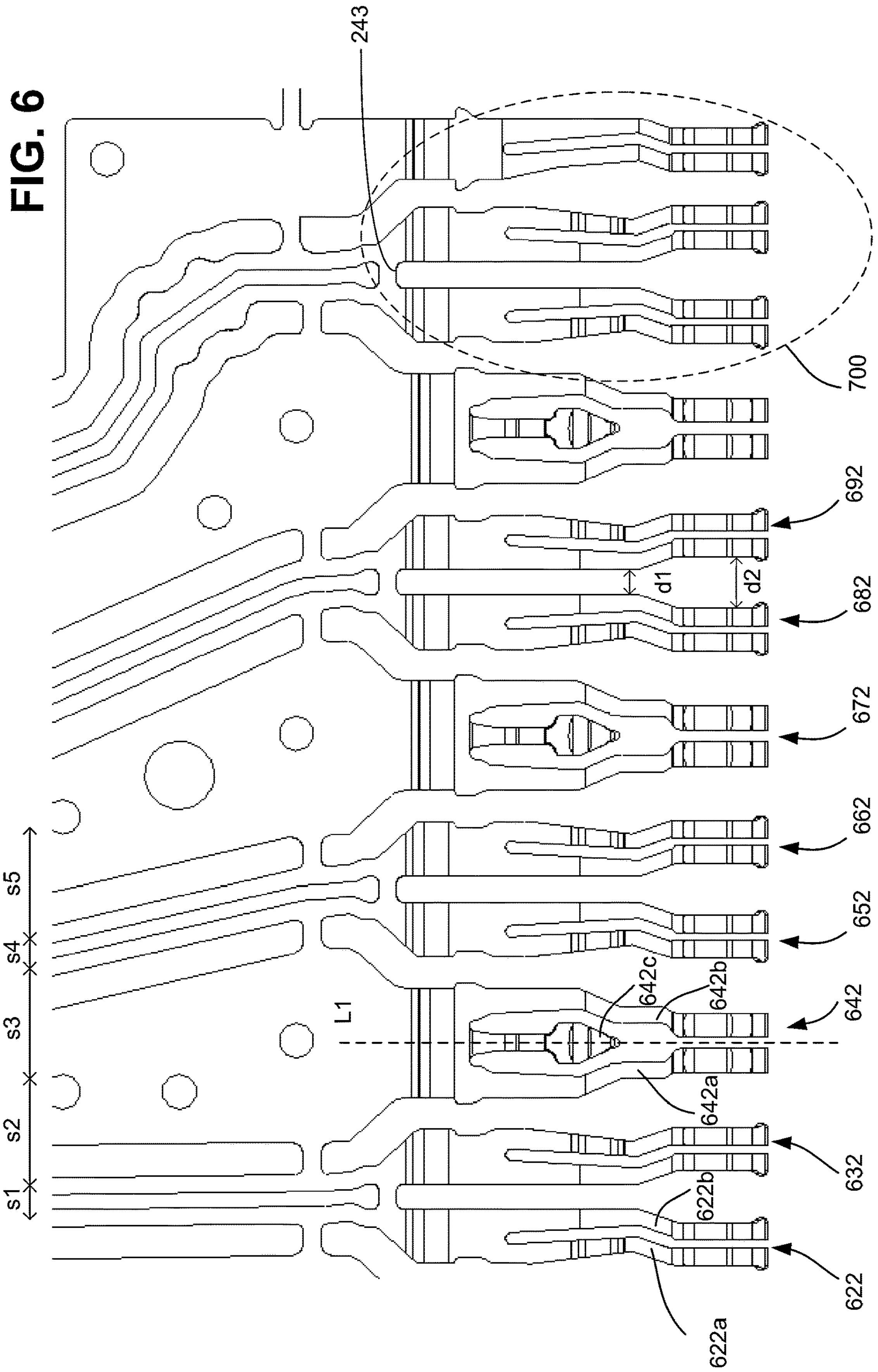
FIG. 6 is an enlarged plan view of region 600 of the illustrative lead frame shown in FIG. 2, showing mating contact portions of conductive elements, in accordance with some embodiments.

Turning now to FIG. 6, further detail of the features described above and additional features that may improve performance of a high speed connector are illustrated. FIG. 6 shows an enlarged view of the region of the illustrative lead frame 200 indicated by dashed circle 600 in FIG. 2, in accordance with some embodiments. As discussed above in connection with FIG. 2, the lead frame 200 may be suitable for use in a wafer of a daughter card connector (e.g., the wafer $\mathbf{122}_1$ of the daughter card connector 120 shown in FIG. 1). Though, similar construction techniques may be used in connectors of any suitable type. The region of the lead frame 200 shown in FIG. 6 includes a plurality of mating contact portions adapted to mate with corresponding mating contact portions in a backplane connector (e.g., the backplane connector 150 shown in FIG. 1). Some of these mating contact portions (e.g., mating contact portions 622, 632, 652, 662, 682, and 692) may be associated with conductive elements designated as signal conductors, while some other mating contact portions (e.g., mating contact portions 642 and 672) may be associated with conductive elements designated as ground conductors.

In the embodiment shown in FIG. 6, some or all of the mating contact portions associated with signal conductors may have a dual beam structure. For example, the mating contact portion 622 may include two beams 622*a* and 622*b* running substantially parallel to each other. In some embodiments, some or all of the mating contact portions associated with ground conductors may have a triple beam structure. For example, the mating contact portion 642 may include two longer beams 642*a* and 642*b*, with a shorter beam 642 disposed therebetween.

As discussed above, it may be desirable to have ground conductors that are relatively wide and signal conductors that are relatively narrow. Furthermore, it may be desirable to keep signal conductors of a pair that is designated as a differential pair running close to each other so as to improve coupling and/or establish a desired impedance. Therefore, in some embodiments, substantial portions of a column of conductive elements may have non-uniform pitch between conductive elements. These portions of non-uniform pitch may encompass all or portions of the intermediate portion of the conductive elements and/or all or portions of the conductive elements within the conductive elements within the wafer housing. For instance, in the example FIG. of 6, in the region 601 of the intermediate portions, distances between centerlines of adjacent conductive elements may differ, where a distance between centerlines of two adjacent signal conductors (e.g., distance s1 or s4) may be smaller than a distance between centerlines of a ground conductor and an adjacent signal conductor (e.g., distance s2, s3, or s5).

However, at a mating interface, it may be desirable to have a more uniform pitch between adjacent conductive elements, for example, to more readily facilitate construction of a housing to guide and avoid shorting of mating contact portions of a daughter card connector and corresponding mating contact portions of a backplane connector. Accordingly, in the embodiment shown in FIG. 6, the distances between adjacent mating contact portions (e.g., between the mating contact portions 622 and 632, between the mating contact portions 632 and 642, etc.) may be substantially similar.

This change in pitch from intermediate portions of conductive elements to mating contact portions may be achieved with a jog in the beams themselves in the region 603 of the mating interface. Jogs may be included in signal conductors as well as in ground conductors, and the jogs may be shaped differently for different types of conductors. In some embodiments, a ground conductor may have a mating contact portion that is wider at a proximal end and narrower at a distal end. Such a configuration may be achieved by the beams of the same ground conductor jogging toward each other. For example, in the embodiment shown in FIG. 6, the two longer beams 642*a* and 642*b* of the mating contact portion 642 curve around the shorter beam 642 and approach each other near the distal end of the mating contact portion 642, so that the mating contact portion 642 has a smaller overall width at the distal end than at the proximal end. In the embodiment illustrated in FIG. 6, the beams of the same signal conductor jog in the same direction. Though, within a pair, the beams jog in opposite directions such that the signal conductors can be closer together over a portion of their length than they are at the mating interface.

Accordingly, mating contact portions of a differential pair of signal conductors may be configured to be closer to each other near the proximal end and farther apart near the distal end. For example, in the embodiment shown in FIG. 6, the mating contact portions 682 and 692 are spaced apart by a smaller distance d1 near the proximal end, but jog away from each other so as to be spaced apart by a larger distance d2 near the distal end. This may be advantageous because the differential edges of the conductors of the pair remain close to each other until the mating contact portions 682 and 692 jog apart. Moreover, this spacing and the coupling may remain relatively constant over the intermediate portions of the signal conductors and into the mating contact portions.

Although FIG. 6 illustrates specific techniques for maintaining the spacing of conductive elements from intermediate portions into the mating contact portions, it should be appreciated that aspects of the present disclosure are not limited to any particular spacing, nor to the use of any particular technique for changing the spacing.

Figure 7A:
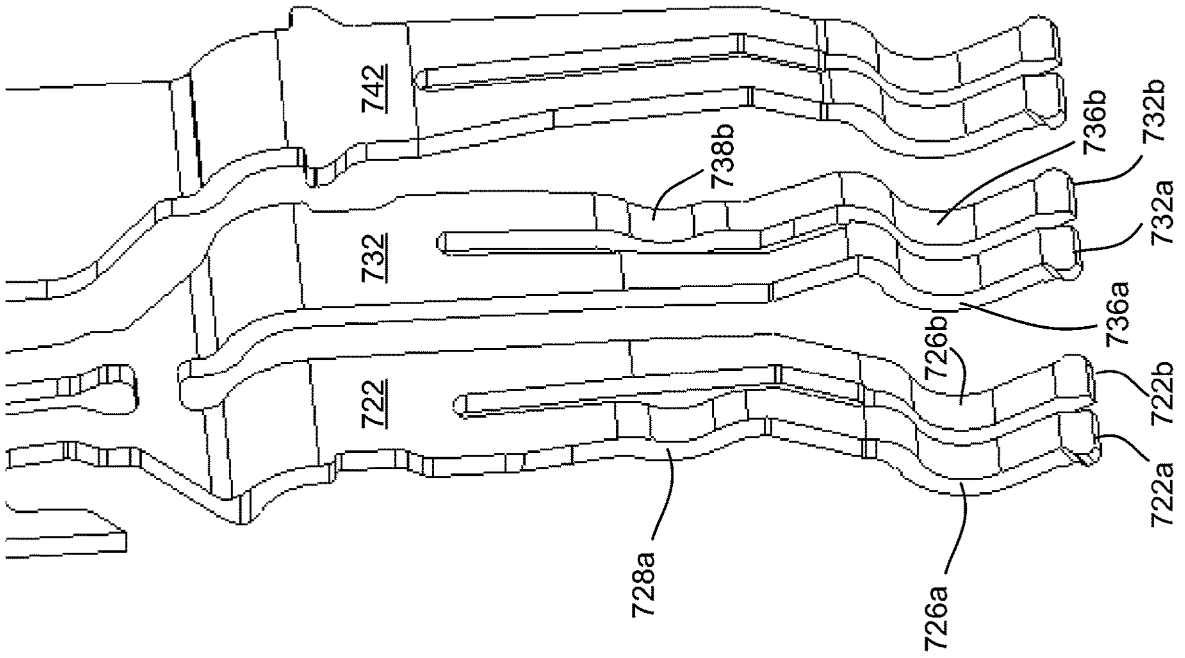
FIG. 7A is an enlarged, perspective view of region 700 of the illustrative lead frame shown in FIGS. 6, showing a dual-beam structure for a mating contact portion, in accordance with some embodiments.

FIGS. 7A, 7B, 8A, 8B, 8C and 8D provide additional details of a beam design for providing multiple points of contact along an elongated dimension of the beam. FIG. 7A shows an enlarged, perspective view of the region of the illustrative lead frame 200 indicated by the dashed oval 700 in FIG. 6, in accordance with some embodiments. The region of the lead frame shown in FIG. 7A includes a plurality of mating contact portions adapted to mate with corresponding mating contact portions in a another connector (e.g., the backplane connector 150 shown in FIG. 1). Some of these mating contact portions (e.g., mating contact portions 722 and 732) may be associated with conductive elements designated as signal conductors, while some other mating contact portions (e.g., mating contact portion 742) may be associated with conductive elements designated as ground conductors.

In the example shown in FIG. 7A, each of the mating contact portions 722 and 732 has a dual-beam structure. For instance, the mating contact portion 722 includes two elongated beams 722*a* and 722*b*, and the mating contact portion 732 includes two elongated beams 732*a* and 732*b*. Furthermore, each of the mating contact portions 722 and 732 may include at least one contact region adapted to be in electrical contact with a corresponding mating contact portion in a backplane connector. For example, in the embodiment shown in FIG. 7A, the mating contact portion 722 has two contact regions near the distal end, namely, contact region 726*a* of the beam 722*a* and contact region 726*b* of the beam 722*b*. In this example, these contact regions are formed on convex surfaces of the beam and may be coated with gold or other malleable metal or conductive material resistant to oxidation. Additionally, the mating contact portion 722 has a third contact region 728*a*, which is located on the beam 722*a* away from the distal end (e.g., roughly at a midpoint along the length of the beam 722*a*). As explained in greater detail below in connection with FIGS. 8A-D, such an additional contact region may be used to short an unterminated stub of a corresponding mating contact portion in a backplane connector when the mating contact portion 772 is mated with the corresponding mating contact portion.

Figure 7B:
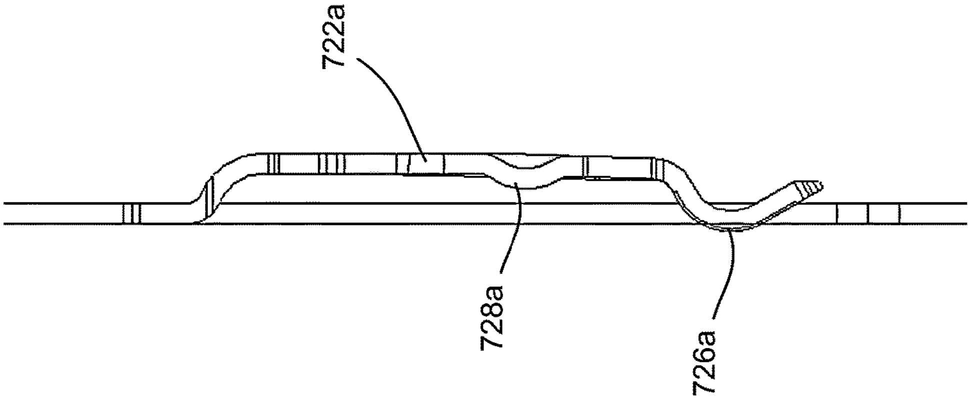
FIG. 7B is a side view of a beam of the mating contact portion shown in FIG. 7A, in accordance with some embodiments.

FIG. 7B shows a side view of the beam 722*a* of the mating contact portion 722 of FIG. 7A, in accordance with some embodiments. In this example, the contact regions 726*a* and 728*a* are in the form of protruding portions (e.g., "bumps" or "ripples") on the respective beams, creating a convex surface to press against a mating contact. However, other types of contact regions may also be used, as aspects of the present disclosure are not limited in this regard.

Returning to FIG. 7A, the illustrative mating contact portion 732 may also have three contact regions: contact region 736*a* of the beam 732*a* and contact region 736*b* of the beam 732*b*, and contact region 738*b* located on the beam 732*b* roughly midway between the distal end and the proximal end of the beam 732*b*. In the embodiment shown in FIG. 7, the mating contact portions 722 and 732 may be mirror images of each other, with a third contact region on an outer beam (e.g., a beam farther away from the other signal conductor in the differential pair) but not on an inner beam (e.g., a beam closer to the other signal conductor in the differential pair).

Though not a requirement, such a configuration may be used on connection with the "jogged" contact structure described above in connection with FIG. 6. In the example, the beam of the pair on the side toward which the pair of beams jogs contains a second contact region. As can be seen in FIG. 6, this second, more proximal contact region (e.g. 728*a* and 738*b*), aligns with distal contact regions (e.g. 726*a*, 726*b*, 736*a* and 736*b*). In this way, mating contacts that slide along distal contact regions (e.g. 726*a*, 726*b*, 736*a* and 736*b*) during mating will also make contact with proximal contact region (e.g. 728*a* and 738*b*). Because of the jogs, a corresponding proximal contact region on beams 722*b* or 732*a* might not align with the mating contacts from another connector (such as backplane connector 150, FIG. 1).

In the embodiment illustrated, each of the contact regions is formed by a bend in the beam. As shown in FIG. 7B, these bends create curved portions in the beam of different dimensions. The inventors have recognized and appreciated that, when multiple contact regions are formed in a beam, the shape of the contact regions may impact the effectiveness of the contact structure. A desirable contact structure will reliably make a low resistance contact with a low chance of a stub of a length sufficient to impact performance.

Accordingly, in the example illustrated, contact region 728*a* has a shallower arc than contact region 726*a*. The specific dimensions of each contact may be selected to provide a desired force at each contact region. In the configuration illustrated, contact region 728*a* exerts less force on a mating contact than contract region 726*b*. Such a configuration provides a low risk that contact region 726*a* will be forced away from a mating contact of another connector which might result if contact region 728*a* was designed with approximately the same dimensions as contact region 726*a*, but imprecisions in manufacturing, misalignment during mating or other factors caused deviations from the designed positions. Such a force on contact region 726*a* could cause contact region 726*a* to form an unreliable contact, possibly even separating from the mating contact. Were that to occur, contact formed at contact region 726*a* might be inadequate or a stub might form from the portion of the beam distal to contact region 728*a*.

Though contact region 728 may have a smaller size, contact region 728*a* may nonetheless exert sufficient force to short out a stub that might otherwise be caused by a mating contact of a mating connector extending past contact region 726*a*, The difference in force may lead to a difference in contact resistance. For example, the large contact region, which in the illustrated example is distal contact region 726*a*, when mated with a contact region from a corresponding connector, may have a contact resistance in the milliohm range, such as less than 1 Ohm. In some embodiments, the contact resistance may be less than 100 milliOhms. In yet other embodiments, the contact resistance may be less than 50 milliOhms. As a specific example, the contact resistance may be in the range of 5 to 10 milliOhms. On the other hand, the smaller contact, when mated with a contact region from a corresponding connector, may have a contact resistance in on the order of an Ohm or more, In some embodiments, the contact resistance may be greater than 5 Ohms or 10 Ohms. The contact resistance, for example, may be in the range of 10 to 20 Ohms. Despite this higher resistance, a contact sufficient to eliminate a stub may be formed. However, any suitable dimensions may be used to achieve any suitable force or other parameters.

Although specific examples of contact regions and arrangements thereof are shown in FIGS. 7A-B and described above, it should be appreciated that aspects of the present disclosure are not limited to any particular types or arrangements of contact regions. For example, more or fewer contact regions may be used on each mating contact portion, and the location of each contact region may be varied depending on a number of factors, such as desired mechanical and electrical properties, and manufacturing variances. As a more specific example, the beam 722*b* of the mating contact portion 722 may be have two contact regions, instead of just one contact region, which may be located at any suitable locations along the beam 722*b* (e.g., the first contact region at the distal end of the beam 722*b* and the second contact region at about one third of the length of the beam 722*b* away from the distal end).

Figure 8A:
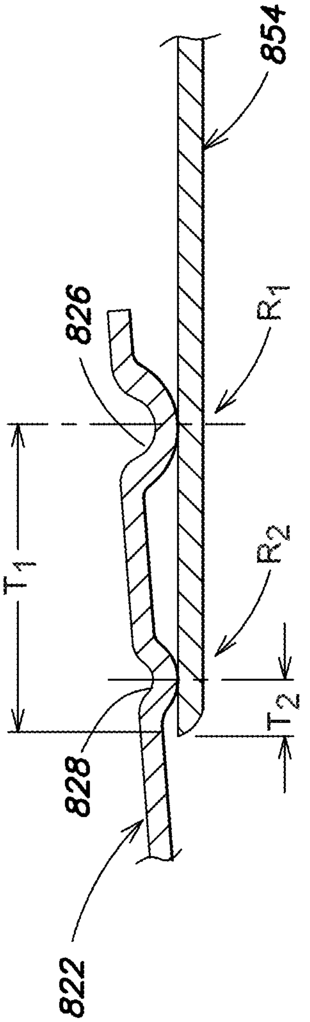
FIG. 8A is a side view of a mating contact portion of a conductive element of a daughter card connector and a mating contact portion of a conductive element of a backplane connector, when the mating contact portions are fully mated with each other, in accordance with some embodiments.

FIGS. 8A . . . 8D illustrate how, despite differences in sizes of the contact regions on a beam, desirable mating characteristics may be achieved. FIG. 8A shows a side view of a mating contact portion 822 of a daughter card connector fully mated with a corresponding mating contact portion 854 of a backplane connector, in accordance with some embodiments. For example, the mating contact portion 822 may be the mating contact portion 622 shown in FIG. 6, while the mating contact portion 854 may be one of the contact blades 154 of the backplane connector 150 shown in FIG. 1. The direction of relative motion of the mating portions during mating is illustrated by arrows, which is in the elongated dimension of the mating contacts.

In the illustrative configuration shown in FIG. 8A, a contact region 826 of the mating contact portion 822 is in electrical contact with a contact region R1 of the mating contact portion 854. The portion of the mating contact portion 854 between the distal end and the contact region R1 is sometimes referred to as a "wipe" region.

In some embodiments, the contact region R1 may be at least a selected distance T1 away from the distal end of the mating contact portion 854, so as to provide a sufficiently large wipe region. This may help to ensure that adequate electrical connection is made between the mating contact portions 822 and 854 even if the mating contact portion 822 does not reach the contact region R1 due to manufacturing or assembly variances.

However, a wipe region may form an unterminated stub when electrical currents flow between the mating contact portions 822 and 854. The presence of such an unterminated stub may lead to unwanted resonances, which may lower the quality of the signals carried through the mating contact portions 822 and 854. Therefore, it may be desirable to reduce such an unterminated stub while still providing sufficient wipe to ensure adequate electrical connection.

Accordingly, in the embodiment shown in FIG. 8A, an additional contact region 828 is provided on the mating contact portion 822 to make electrical contact with the mating contact portion 854 at a location (e.g., contact region R2) between the contact region R1 and the distal end of the mating contact portion 854. In this manner, a stub length is reduced from T1 (i.e., the distance between the contact region R1 and the distal end of the mating contact portion 854) to T2 (i.e., the distance between the contact region R2 and the distal end of the mating contact portion 854). This may reduce unwanted resonances and thereby improve signal quality.

Figure 8B:
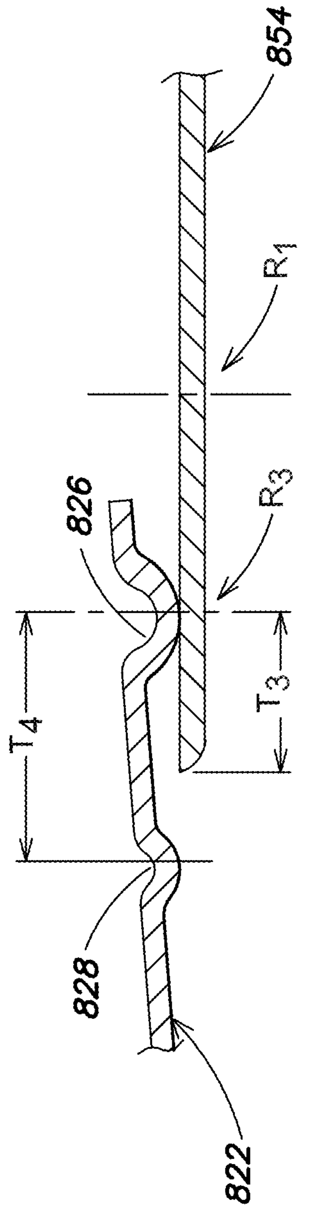
FIG. 8B is a side view of a mating contact portion of a conductive element of a daughter card connector and a mating contact portion of a conductive element of a backplane connector, when the mating contact portions are partially mated with each other, in accordance with some embodiments.

FIG. 8B shows a side view of the mating contact portions 822 and 854 shown in FIG. 8A, but only partially mated with each other, in accordance with some embodiments. In this example, the contact region 826 of the mating contact portion 822 does not reach the contact region R1 of the mating contact portion 854. This may happen, for instance, due to manufacturing or assembly variances. As a result, the contact region 826 of the mating contact portion 822 only reaches a contact region R3 of the mating contact portion 854, resulting in an unterminated stub of length T3 (i.e., the distance between the contact region R3 and the distal end of the mating contact portion 854). However, the length T3 is at most the distance T4 between the contact regions 826 and 828 of the mating contact portion 822. This is because, if T3 were great than T4, the contact region 828 would have made electrical contact with the mating contact portion 854, thereby shorting the unterminated stub. Therefore, a stub length may be limited by positioning the contact regions 826 and 828 at appropriate locations along the mating contact portion 822 so that the contact regions 826 and 828 are no more than a selected distance apart.

As discussed above, a contact force may be desirable to press together two conductive elements at a mating interface so as to form a reliable electrical connection. Accordingly, in some embodiments, mating contact portions of a daughter card connector (e.g., the mating contact portion 822 shown in FIGS. 8A-B) may be relatively compliant, whereas corresponding mating contact portions of a backplane connector (e.g., the mating contact portion 854 shown in FIGS. 8A-B) may be relatively rigid. When the daughter card connector and the backplane connector are mated with each other, a mating contact portion of the daughter card connector may be deflected by the corresponding mating contact portion of the backplane connector, thereby generating a spring force that presses the mating contact portions together to form a reliable electrical connection.

Figure 8C:
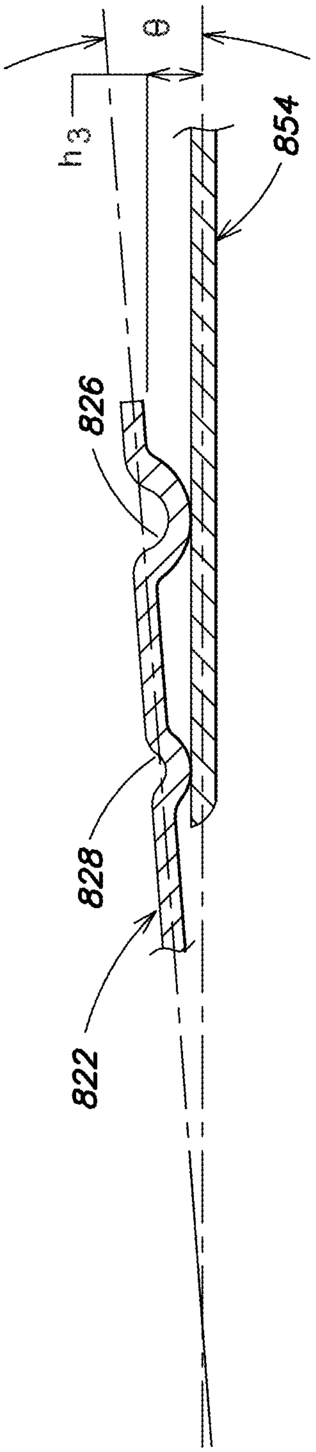
FIG. 8C is a side view of a mating contact portion of a conductive element of a daughter card connector, the mating contact portion being in a biased position and applying a spring force to a conductive element of a backplane connector, in accordance with some embodiments.
Figure 8D:
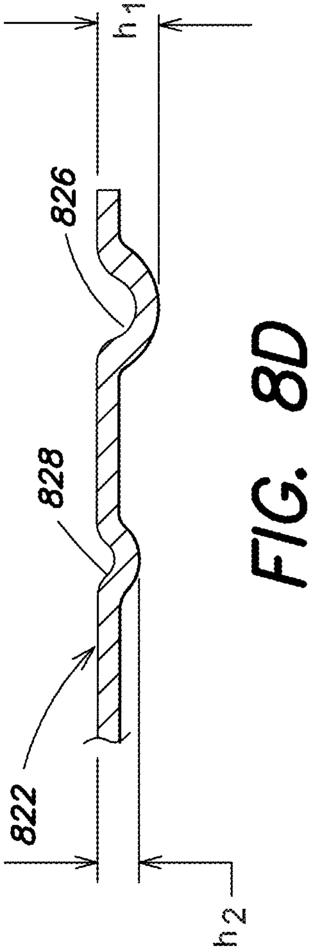
FIG. 8D is a side view of a mating contact portion of a conductive element of a daughter card connector, the mating contact portion being in an unbiased position, in accordance with some embodiments.

FIG. 8C shows another side view of the mating contact portions 822 and 854 of FIG. 8A, in accordance with some embodiments. In this view, the mating contact portions 822 and 854 are fully mated with each other, and the mating contact portion 822 is deflected by the mating contact portion 854. Due to this deflection, the distal end of the mating contact portion 822 may be at a distance h3 away from the mating contact portion 854. The distance h3 may be roughly 1/1000 of an inch, although other values may also be possible.

Furthermore, due to the deflection, the mating contact portion 822 may be at an angle θ from the mating contact portion 854. Because of this angle, it may be desirable to form the contact regions 826 and 828 such that the contact region 828 protrudes to a lesser extent compared to the contact region 826. For instance, in the embodiment shown in FIG. 8D, the contact regions 826 and 828 are in the form of ripples formed on the mating contact portion 822, and the ripple of the contact region 828 has a height h2 that is smaller than a height h1 of the ripple of the contact region 826. If the contact region 828 is too big (e.g., if h2 is the same as h1), the contact region 826 may be lifted away from the mating contact portion 854 when the mating contact portion 822 is mated with the mating contact portion 854, which may prevent formation of a reliable electrical connection.

The heights h1 and h2 may have any suitable dimension and may be in any suitable ratio. For example, in some embodiments, the height h2 may be between 25% and 75% of h1. Though, in other embodiments, the h2 may be between 45% and 75% or 25% and 55% of h1.

It should be appreciated that FIG. 8C illustrates how a contact structure may be used to eliminate a stub in a signal conductor Eliminating stubs may avoid reflections that may contribute to near end cross talk, increase insertion loss or otherwise impact propagation of high speed signals through a connector system.

Figure 9A:
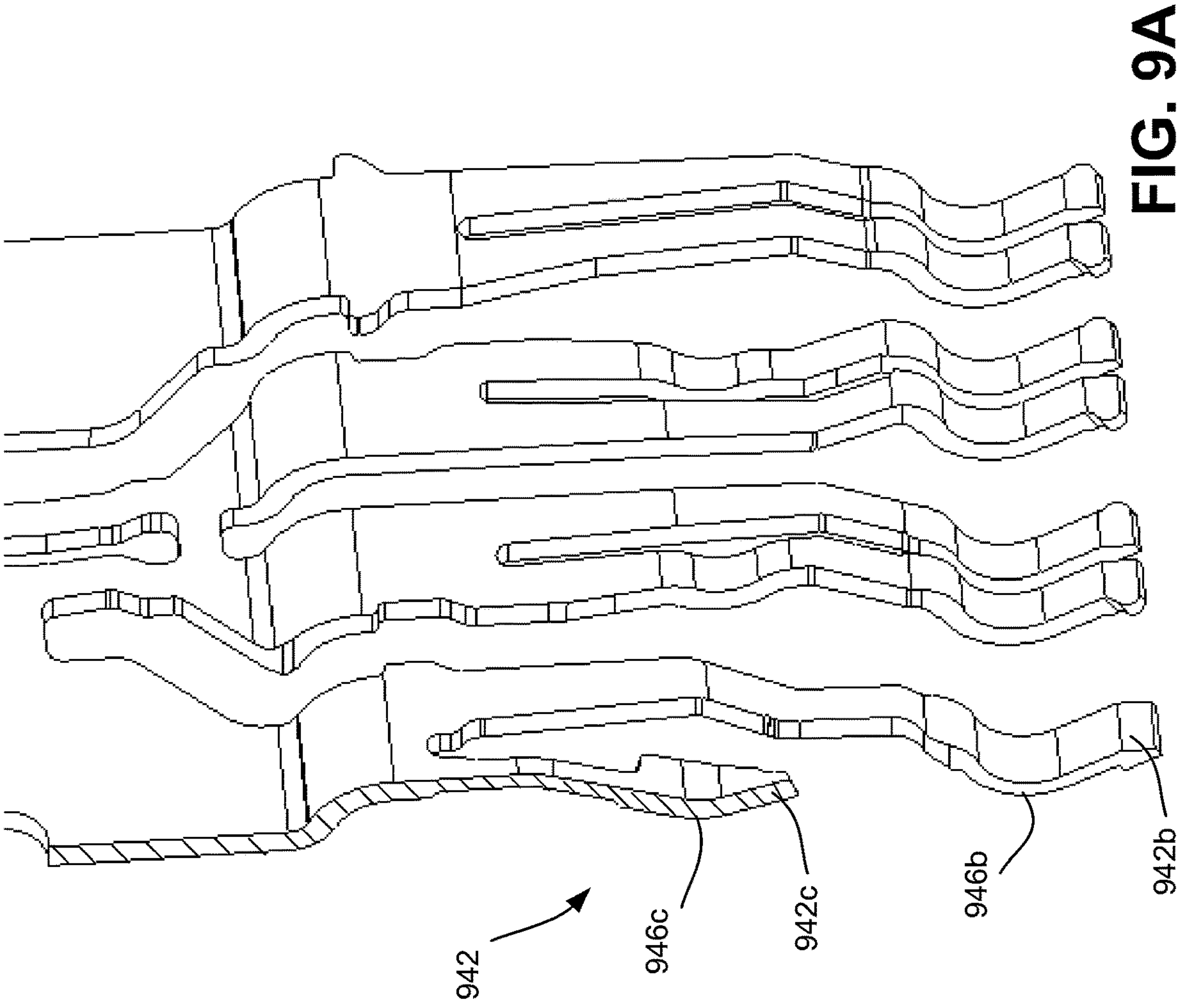
FIG. 9A is a perspective view of a mating contact portion of a ground conductor, showing a triple-beam structure, in accordance with some embodiments.

The inventors have recognized and appreciated that avoiding unterminated portions of ground conductors, even though ground conductors are not intended for carrying high frequency signals, may also improve signal integrity. Techniques for avoiding stubs in signal as described above may be applied to ground conductors as well. FIG. 9A shows a perspective view, partially cut away, of a cross section of a mating contact portion 942 of a ground conductor, in accordance with some embodiments. For example, the mating contact portion 942 may be the mating contact portion 642 of FIG. 6, and the cross section may be taken along the line L1 shown in FIG. 6.

In the embodiment shown in FIG. 9A, the mating contact portion 942 has a triple-beam structure, including two longer beams, of which beam 942*b* is shown, and a shorter beam 942*c* disposed between the two longer beams. Each of these beams may include at least one contact region adapted to be in electrical contact with a corresponding mating contact portion in a backplane connector (e.g., the backplane connector 150 shown in FIG. 1), so that the mating contact portion 942 may have at least three contact regions. These contact regions may create points of contact at different locations relative to the distal end of the mating contact portion.

For example, in the embodiment shown in FIG. 9A, a contact region 946*b* is located near the distal end of the longer beam 942*b*, and a contact region 946*c* is located near the distal end of the shorter beam 942*c*. Similar to the contact region 728*a* of the beam 722*a* shown in FIG. 7A and discussed above, the contact region 946*c* may be used to short an unterminated stub of a corresponding mating contact portion in a backplane connector when the mating contact portion 942 is mated with the corresponding mating contact portion.

Figure 9B:
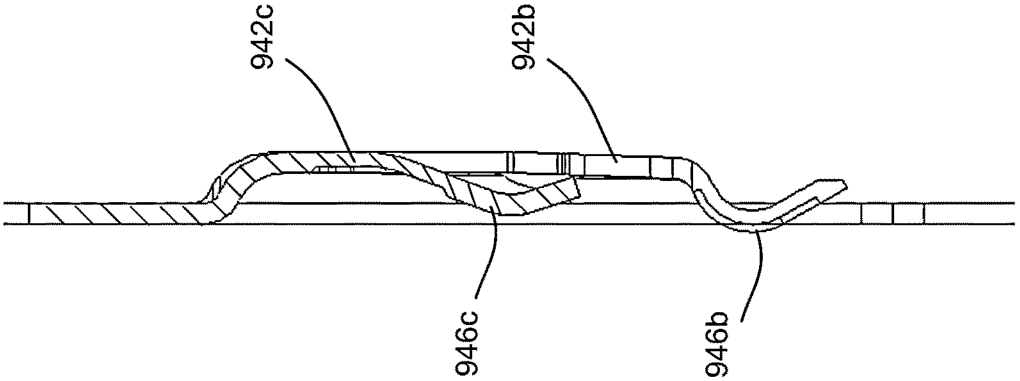
FIG. 9B is a side view of two beams of the mating contact portion shown in FIG. 9A, in accordance with some embodiments.

FIG. 9B shows a side view of the beams 942*b* and 942*c* of the mating contact portion 942 of FIG. 9A, in accordance with some embodiments. In this example, the contact regions 946*b* and 946*c* are in the form of protruding portions (e.g., "bumps" or "ripples") on the respective beams, with a contact surface on a convex side of these bumps.

Other techniques may be used instead of or in addition to the techniques as described above for improving signal integrity in a high speed connector. In some embodiments, relative positioning of adjacent pairs of signal conductors may be established to improve signal integrity, In some embodiments, the positioning may be established to improve signal integrity, for example, by reducing cross talk.

Figure 10:
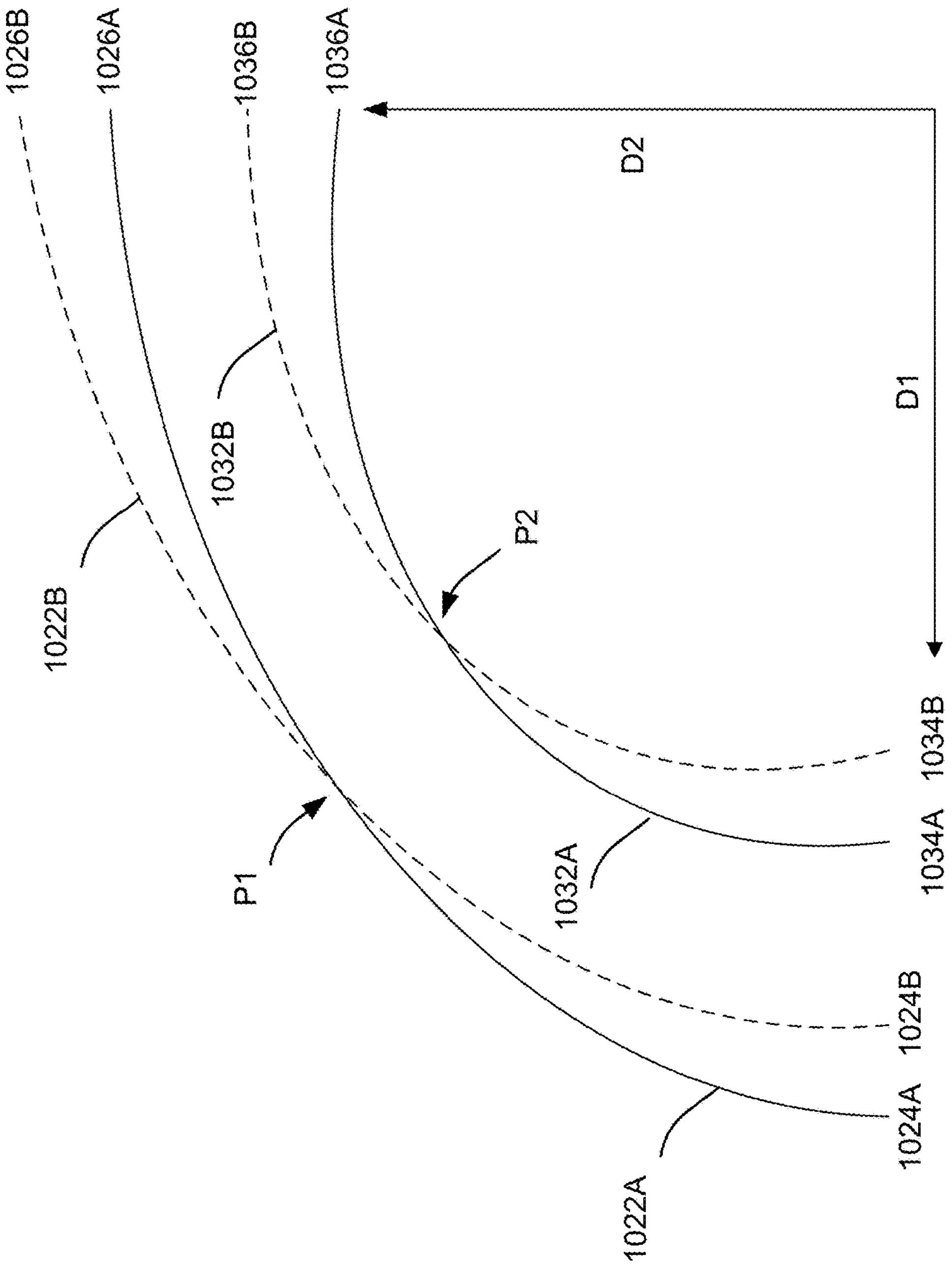
FIG. 10 is a schematic diagram of two differential pairs of signal conductors crossing over each other, in accordance with some embodiments.

FIG. 10 shows a schematic diagram of a first differential pair of signal conductors 1022A and 1032A (shown in solid lines), and a second differential pair of signal conductors 1022B and 1032B (shown in dashed lines), in accordance with some embodiments. The signal conductors 1022A and 1032A may be part of a first wafer (e.g., the wafer $\mathbf{122}_1$ shown in FIG. 1) of a daughter card connector (e.g., the daughter card connector 120 shown in FIG. 1), while the signal conductors 1022B and 1032B may be part of a second wafer (e.g., the wafer $\mathbf{122}_2$ shown in FIG. 1) that is installed adjacent to the first wafer.

In the embodiment shown in FIG. 10, the signal conductors 1022A and 1032A have respective starting points 1024A and 1034A and respective endpoints 1026A and 1036A. Similarly, the signal conductors 1022B and 1032B have respective starting points 1024B and 1034B and respective endpoints 1026B and 1036B. These starting points and ending points may represent a contact tail or a mating contact portion of a conductive element. Between the starting point and the endpoint, each signal conductor may follow a generally arcuate path.

In the example of FIG. 10, the signal conductors 1022A and 1022B cross each other at an intermediate point P1, and the signal conductors 1032A and 1032B cross each other at an intermediate point P2. As a result, the starting points 1024A and 1034A may be "ahead of" the starting points 1024B and 1034B, but the endpoints 1026A and 1036A may be "behind" the endpoints 1026B and 1036B.

In this case, ahead and behind act as an indication of distance from an end of the column of conductive elements. The starting points 1024A, 1024B, 1034A and 1034B are positioned along an edge of a connector and are a different distance from the end of the column, which in this case is indicated by a distance along the axis labeled D1. At the end points, these signal conductors have distances from the end of the column measured as a distance along the axis labeled D2. As can be seen, conductor 1022B starts out "ahead" of a corresponding conductor 1022A, but ends behind. Likewise, conductor 1032B starts out ahead of 1032A and ends behind. One pair thus crosses over the other to go from being ahead to being behind.

Without being bound by any theory of operation, this configuration is believed to be advantageous for reducing cross talk. Cross talk may occur when a signal couples to a signal conductor from other nearby signal conductors. For a differential pair, one conductor of the pair will carry a positive-going signal at the same time that the other conductor of the pair is carrying a similar, but negative-going, signal. In a differential connector, crosstalk on a signal conductor can be avoided by having that signal conductor equal distance from the positive-going and negative-going signal conductors of any adjacent signal carrying pair over the entire length of the signal conductor.

However, such a configuration may be difficult to achieve in a dense connector. In some connectors, for example, different wafer styles are used to form the connectors. The wafers of different style may be arranged in an alternating arrangement. Using different wafer styles may allow signal pairs in each wafer to more closely align with a ground conductor in an adjacent wafer than a signal pair. Such a configuration may also limit crosstalk because a signal from a pair in one wafer may couple more to a ground conductor in adjacent wafers than to signal conductors in the adjacent wafer.

However, the inventors have recognized and appreciated that crosstalk may also be reduced by routing signal conductors such that the spacing between a signal conductor and the positive and negative-going signal conductors in an adjacent pair changes over the length of the signal conductor. The spacing may be such that the amount of coupling to the positive and negative-going signal conductors in the adjacent pair changes over the length of the signal.

One approach to achieving such cancellation may be, near the midpoint of a signal conductor, to change the position of the position of the positive and negative-going signal conductors of the adjacent pair. Accordingly, in some embodiments, a connector may be made of at least two types of wafers. In at least one type of wafer, for each pair, one signal conductor may start ahead of the other signal conductor and end behind it. When such a wafer is placed adjacent a wafer with another signal conductor routed generally along a corresponding path as the pair in a parallel plane, that signal conductor will be, over half of its length closer to the positive-going signal conductor of the pair and over half of its length closer to the negative-going signal conductor. Such a configuration may result in, on average over the length of the signal conductor, equal separation between the signal conductor and the positive and negative-going conductors of the adjacent pair. Such a configuration may provide on average, the same coupling between the signal conductor and the positive and negative-going signal conductors of the adjacent pair, which can provide a desirable low level of crosstalk.

By reversing the position of the signal conductors of each pair in every other wafer, each pair will have a relatively low level of crosstalk with its adjacent pairs. However, reversing the position of the signal conductors in the same pair, if the pairs are formed by conductive elements in the same column, may require non-standard manufacturing techniques in order to allow the conductors of the pair to cross over each other.

In some embodiments, a similar cross-talk canceling effect may be achieved by crossing over the pairs in adjacent wafers, as illustrated in FIG. 10. For example, FIG. 10, shows a pair 1022A and 1032A, which may be in a first wafer, and another pair 1022B and 1032B, which may be in a second, adjacent wafer. In this example, conductor 1022B is ahead of conductor 1022A at ends 1024B and 1024A, but behind at ends 1026A and 1026B. This configuration is believed to also reduce crosstalk.

Without being bound by any theory of operation, it can be seen that the coupling between the pair formed by conductors 1022A and 1032A to pair 1022B and 1032B changes over the length of the pair in a way that tends to cancel out crosstalk. For illustration, conductors 1022A and 1022B may be regarded as the positive-going conductors of the pairs, with conductors 1032A and 1032B being the negative-going conductors. Near ends 1024A and 1024B, positive going conductor 1024B is between positive and negative-going conductors 1024A and 1034A of the adjacent pair, thus coupling a positive-going signal to both the positive and negative-going conductors of the adjacent pair. Because of the differential nature of conductors 1024A and 1034A, equal coupling of the positive-going signal does not create crosstalk.

However, negative-going conductor 1034B, is, near ends 1034A and 1034B, closer to conductor 1034A than it is to 1024A. This asymmetric positioning could tend to create negative-going cross-talk. However, the relative positioning the positive and negative-gong conductors are reversed at the other end, which tends to cancel out that crosstalk.

For example, near ends 1036A and 1026A, negative-going conductor 1032B is more evenly spaced relative to conductors 1024A and 1034A. Positive going conductor 1024B is asymmetrically positioned with respect to conductors 1022A and 1032A of the adjacent pair. Such a positioning could tend to create positive-going cross-talk. However, such positive going cross-talk would tend to cancel the negatives-going cross talk arising near ends 1024A and 1034A. In this way, by introducing a crossover, as illustrated in FIG. 10, overall crosstalk between adjacent pairs.

Figure 11:
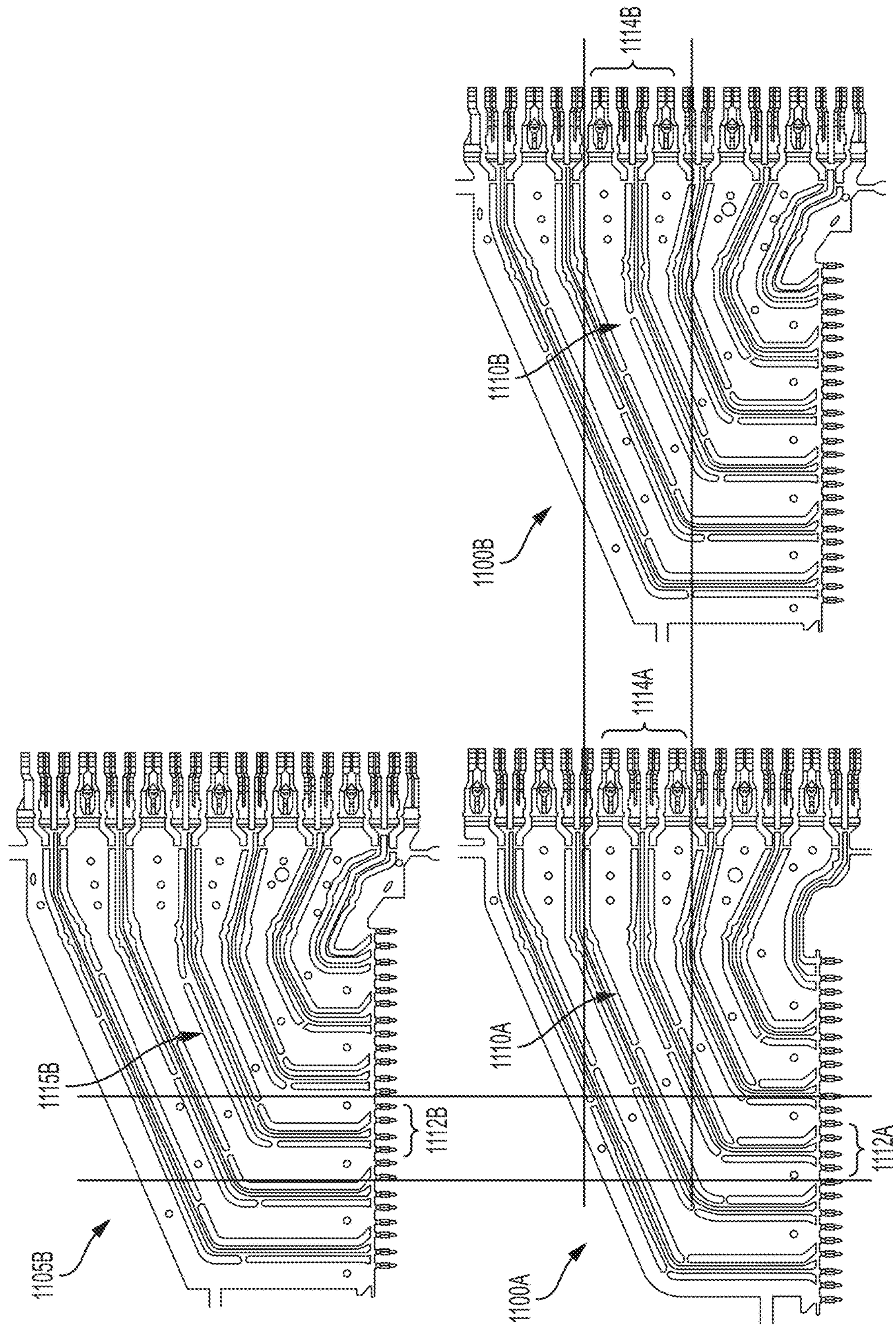
FIG. 11 shows two illustrative types of wafers embodying the “crossover” concept illustrated in FIG. 10, in accordance with some embodiments.

FIG. 11 shows lead frames from two illustrative types of wafers embodying the "crossover" concept discussed above in connection with FIG. 10, in accordance with some embodiments. To show the crossover, a type "A" wafer 1100A is shown aligned horizontally with a type "B" wafer 1100B and vertically with another type "B" wafer 1105B that is identical to the type "B" wafer 1100B. The wafer 1100A includes a group of four conductive elements, identified collectively as conductive elements 1110A. Two of these conductive elements may be adapted for use as a differential pair of signal conductors, while the other two may be adapted for use as ground conductors and may be disposed on either side of the differential pair. Contact tails of the conductive elements 1110A are identified collectively as contact tails 1112A, while mating contact portions of the conductive elements 1110A are identified collectively as mating contact portions 1114A.

Similarly, the wafer 1100B includes a group of four conductive elements identified collectively as conductive elements 1110B, whose mating contact portions are identified collectively as mating contact portions 1114B, and the wafer 1105B includes a group of four conductive elements identified collectively as conductive elements 1115B, whose contact tails are identified collectively as contact tails 1112B.

These groups, 1110A and 1110B may represent corresponding signal conductor pairs in adjacent wafers. Though, just one signal conductor pairs is described, it should be appreciated that the same relative positioning of other pairs may be provided for other pairs in the wafers.

As emphasized by the vertical and horizontal bands shown in FIG. 11, the contact tails 1112A of the type "A" wafer 1100A are "ahead of" the contact tails 1112B of the type "B" wafer 1105B, but the mating contact portions 1114A of the type "A" wafer 1100A are "behind" the mating contact portions 1114B of the type "B" wafer 1100B. Thus, when a type "A" wafer is installed adjacent a type "B" wafer in a connector, a "crossover" configuration similar to that shown in FIG. 10 would occur, which may reduce crosstalk in comparison to a connector in which no such crossover occurs.

In this example, it can be seen that the crossover may be created based on the configuration of the conductive elements in the lead frames 1100A and 1100B. Because the configuration of the conductive elements is formed by a conventional stamping operation, a connector configuration with desirable crosstalk properties may be simply created as illustrated in FIG. 11.

Various inventive concepts disclosed herein are not limited in their applications to the details of construction and the arrangements of components set forth in the following description or illustrated in the drawings. Such concepts are capable of other embodiments and of being practiced or of being carried out in various ways. Also, the phraseology and terminology used herein is for the purpose of description and should not be regarded as limiting. The use of "including," "comprising," "having," "containing," and "involving," and variations thereof, is meant to encompass the items listed thereafter and equivalents thereof as well as possible additional items.

Having thus described several inventive concepts of the present disclosure, it is to be appreciated that various alterations, modifications, and improvements will readily occur to those skilled in the art.

For example, portions of the connectors described above may be made of insulative material. Any suitable insulative material may be used, include those known in the art. Examples of suitable materials are liquid crystal polymer (LCP), polyphenyline sulfide (PPS), high temperature nylon or polypropylene (PPO). Other suitable materials may be employed, as the present invention is not limited in this regard. All of these are suitable for use as binder materials in manufacturing connectors according to some embodiments of the invention. One or more fillers may be included in some or all of the binder material used to form insulative housing portions of a connector. As a specific example, thermoplastic PPS filled to 30% by volume with glass fiber may be used.

Such alterations, modifications, and improvements are intended to be within the spirit of the inventive concepts of the present disclosure. Accordingly, the foregoing description and drawings are by way of example only.

What is claimed is:

1. An electrical connector configured to be mated with a complementary electrical connector along a mating direction, the electrical connector comprising:

a plurality of conductive elements disposed in a column, each of the plurality of conductive elements comprising a mating contact portion, a contact tail, and an intermediate portion between the mating contact portion and the contact tail, wherein:

a first mating contact portion of a first conductive element of the plurality of conductive elements comprises a first beam and a second beam;

the first beam comprises a first contact region adapted to make electrical contact with a surface of the complementary electrical connector at a first point of contact;

the second beam comprises a second contact region adapted to make electrical contact with the surface of the complementary electrical connector at a second point of contact, wherein the first point of contact and the second point of contact are offset relative to each other with respect to the mating direction, wherein the first point of contact is ahead of the second point of contact with respect to the mating direction;

the first beam is adapted to exert a first force normal to a plane defined by the surface of the second electrical connector when the electrical connector and the commentary electrical connectors are mated; and the second beam is adapted to exert a second force normal to the plane when the electrical connector and the commentary electrical connectors are mated, the first force being greater than the second force.

2. The electrical connector of claim 1, wherein the first conductive element is configured as a ground conductor.

3. The electrical connector of claim 1, wherein the first contact region comprises a first protruding portion, and the second contact region comprises a second protruding portion, wherein the first protruding portion protrudes to a greater extent than the second protruding portion.

4. The electrical connector of claim 1, wherein the second beam is shorter than the first beam.

5. The electrical connector of claim 4, wherein the second beam is about half as long as the first beam.

6. The electrical connector of claim 1, wherein both the first and second beams extend along the mating direction.

7. The electrical connector of claim 1, wherein the second beam terminates a stub of the complementary electrical connector when mated with the electrical connector.

8. The electrical connector of claim 1, wherein:

the electrical connector comprises a wafer, the wafer comprising a housing, the plurality of conductive elements being at least partially enclosed in the housing.

9. The electrical connector of claim 8, wherein the housing comprises insulative material and lossy material.

10. The electrical connector of claim 1, wherein the first beam and the second beam have different lengths.

11. The electrical connector of claim 1, wherein:

the first beam is adapted to contact the surface of the complementary electrical connector only at the first point of contact, and the second beam is adapted to contact the surface of the complementary electrical connector only at the second point of contact.

12. An electrical interconnection system comprising:

a first electrical connector and a second electrical connector, the first and second electrical connectors being configured to be mated with each other along a mating direction, the first electrical connector comprising:

a plurality of conductive elements disposed in a column, each of the plurality of conductive elements comprising a mating contact portion, a contact tail, and an intermediate portion between the mating contact portion and the contact tail, wherein:

the plurality of conductive elements comprise first conductive elements comprising intermediate portions of a first width and second conductive elements comprising intermediate portions of a second width, less than the first width;

for each of the first conductive elements:

a first mating contact portion of a first conductive element of the plurality of conductive elements comprises a first beam and a second beam;

the first beam comprises a first contact region adapted to make electrical contact with a surface of the second electrical connector at a first point of contact;

the second beam comprises a second contact region adapted to make electrical contact with the surface of the second electrical connector at a second point of contact, wherein the first point of contact and the second point of contact are offset relative to each other with respect to the mating direction;

the first beam is adapted to exert a first force normal to a plane defined by the surface of the second electrical connector when the first electrical connector and the second electrical connectors are mated;

the second beam is adapted to exert a second force normal to the plane when the first electrical connector and the second electrical connectors are mated, the first force being greater than the second force; and the first point of contact is ahead of the second point of contact with respect to the mating direction.

13. The electrical interconnection system of claim 12, wherein the first conductive elements are configured to be ground conductors.

14. The electrical interconnection system of claim 12, wherein a plurality of the first conductive elements are coupled through a common ground structure, the common ground structure comprising lossy material.

15. The electrical interconnection system of claim 12, wherein for each of the first conductive elements the second beam is shorter than the first beam.

16. The electrical interconnection system of claim 12, wherein the second beam terminates a stub of the second electrical connector when mated with the first electrical connector.

17. The method of claim 12, wherein the first plurality of conductive elements are configured to be ground conductors.

18. The electrical interconnection system of claim 12, wherein, for each of the first conductive elements, the first beam and the second beam have different lengths.

19. The electrical interconnection system of claim 12, wherein, for each of the first conductive elements:

the first beam is adapted to contact the surface of the second electrical connector only at the first point of contact, and the second beam is adapted to contact the surface of the second electrical connector only at the second point of contact.

20. A method for mating a first electrical connector with a second electrical connector along a mating direction, the first electrical connector comprising a first plurality of conductive elements, each of the first plurality of conductive elements comprising a mating contact portion, a contact tail, and an intermediate portion between the mating contact portion and the contact tail, a first mating contact portion of a first conductive element of the first plurality of conductive elements comprising a first beam and a second beam, and the second electrical connector comprising a second plurality of conductive elements, the method comprising:

placing the first plurality of conductive elements in electrical contact with respective conductive elements of the second plurality of conductive elements, at least in part by:

placing the first beam in electrical contact with a second conductive element of the second plurality of conductive elements at a first point of contact;

placing the second beam in electrical contact with the second conductive element of the second plurality of conductive elements at a second point of contact, wherein the first point of contact and the second point of contact are offset relative to each other with respect to the mating direction, wherein the first point of contact is ahead of the second point of contact with respect to the mating direction;

causing the first beam to exert a first force normal to a plane defined by a surface of the second electrical connector; and causing the second beam to exert a second force normal to the plane, wherein the first force is greater than the second force.

21. The method of claim 20, wherein placing the second beam in electrical contact with the second conductive element comprises terminating a stub of the second conductive element.

22. The method of claim 20, wherein the first beam and the second beam have different lengths.

23. The method of claim 20, wherein, when the first electrical connector is mated with the second electrical connector:

the first beam contacts the second conductive element only at the first point of contact, and the second beam contacts the second conductive element only at the second point of contact.

* * * * *